(12) United States Patent
Horwood

(10) Patent No.: US 8,909,586 B2
(45) Date of Patent: Dec. 9, 2014

(54) METHOD AND SYSTEM FOR DETERMINING A TRACK OF AN OBJECT THROUGH A MULTI-DIMENSIONAL SPACE

(75) Inventor: Joshua T. Horwood, Loveland, CO (US)

(73) Assignee: Numerica Corp., Loveland, CO (US)

(*) Notice: Subject to any disclaimer, the term of this patent is extended or adjusted under 35 U.S.C. 154(b) by 224 days.

(21) Appl. No.: 13/612,375

(22) Filed: Sep. 12, 2012

(65) Prior Publication Data

US 2014/0074768 A1    Mar. 13, 2014

(51) Int. Cl.
   *G06F 9/44*    (2006.01)
   *G06N 7/02*    (2006.01)
   *G06N 7/06*    (2006.01)
   *B64G 3/00*    (2006.01)

(52) U.S. Cl.
   CPC ... *G06N 7/02* (2013.01); *B64G 3/00* (2013.01)
   USPC .......................................................... 706/51

(58) Field of Classification Search
   USPC .......................................................... 706/52
   See application file for complete search history.

(56) References Cited

U.S. PATENT DOCUMENTS

| 2014/0072233 A1* | 3/2014 | Horwood | 382/201 |
| 2014/0074767 A1* | 3/2014 | Horwood | 706/52 |
| 2014/0074768 A1* | 3/2014 | Horwood | 706/52 |

* cited by examiner

*Primary Examiner* — Michael B Holmes
(74) *Attorney, Agent, or Firm* — Kilpatrick Townsend & Stockton LLP

(57) ABSTRACT

Embodiments of the present invention characterizing the uncertainty of the orbital state of an Earth-orbiting space object hereof using a Gauss von Mises probability density function defined on the n+1 dimensional cylindrical manifold $\mathbb{R}^n \times \mathbb{S}$. Additionally, embodiments of the present invention can include transforming a Gauss von Mises distribution under a diffeomorphism and approximating the output as a Gauss von Mises distribution. Embodiments of the present invention can also include fusing a prior state represented by a Gauss von Mises distribution with an update report, wherein the update can be either another Gauss von Mises distribution of the same dimension as the prior or an observation related to the prior by a stochastic measurement model. A Gauss von Mises distribution can be calculated from a plurality of reports, wherein the reports are either Gauss von Mises distributions or observations related to the state space by a stochastic measurement model.

51 Claims, 14 Drawing Sheets

METHOD AND SYSTEM FOR DETERMINING A TRACK OF AN OBJECT THROUGH A MULTI-DIMENSIONAL SPACE

STATEMENT AS TO RIGHTS TO INVENTIONS MADE UNDER FEDERALLY SPONSORED RESEARCH AND DEVELOPMENT

This invention was made with government support under Contract No. FA9550-12-C-0034 awarded by the Air Force Office of Scientific Research to Numerica Corporation. The government has certain rights in the invention.

FIELD OF THE INVENTION

The present invention relates generally to non-linear estimation and computerized techniques to characterize uncertainty on a cylindrical manifold and, more particularly, to characterizing the state uncertainty of Earth-orbiting space objects to support many functions in space situational awareness.

BACKGROUND OF THE INVENTION

Space Situational Awareness (SSA) includes knowledge of the near-Earth space environment which can be accomplished through the tracking and identification of Earth-orbiting space objects to protect space assets and maintain awareness of potentially adversarial space deployments. Although current operational systems have performed well, future needs will far exceed current capabilities. With the instantiation of more accurate sensors and the increased probability of future collisions between space objects, the potential number of newly discovered objects is likely to increase by an order of magnitude within the next decade, thereby placing an ever increasing burden on current operational systems. Moving forward, the implementation of new, innovative, rigorous, robust, and autonomous methods for space object identification and discrimination are required to enable the development and maintenance of the present and future space catalog and to support the overall SSA mission.

Fundamental to the success of the SSA mission is the rigorous inclusion of uncertainty in the space surveillance network (SSN). The proper characterization of uncertainty, sometimes called covariance realism, is a common requirement to many SSA functions including tracking and data association, resolution of uncorrelated tracks (UCTs), conjunction analysis and probability of collision, sensor resource management, and anomaly detection. While tracking environments, such as air and missile defense, make extensive use of Gaussian and local linearity assumptions within algorithms for uncertainty management, space surveillance is inherently different due to long time gaps between updates, high mis-detection rates, non-linear and non-conservative dynamics, and non-Gaussian phenomena. What is state-of-the-art and robust for air and missile defense need not be applicable to SSA.

The field of sequential state estimation has much of its origins in the pioneering work of R. E. Kalman. Considered to be one of the most simple dynamic Bayesian networks, the Kalman filter updates a system state recursively over time using incoming measurements and mathematical process models. The basic Kalman filter assumes linearity in the underlying dynamical and measurement models and that all error terms are Gaussian. At the other end of the spectrum is the general Bayesian non-linear filter which updates the full Probability Density Function (PDF) of the system recursively over time while permitting non-Gaussian error terms and non-linear process models. Between the Kalman filter and the general Bayesian framework are a host of sub-optimal methods for sequential filtering which have been developed over the past fifty years and tailored to specific applications. The most common extensions and generalizations of the Kalman filter include the extended Kalman filter (EKF) and the unscented Kalman filter (UKF) which both work on non-linear systems. A feature of the latter is its "derivative-free" nature. Within the filter prediction step, the propagated state estimate and covariance are reconstructed from a deterministically chosen set of "sigma points" propagated through the full non-linear dynamics. The equivalence between this reconstruction or "unscented transform" with Gauss-Hermite quadrature has been established. Variations and extensions of the UKF, including a more numerically stable "square-root" version and the higher-order Gauss-Hermite filters, have been formulated. In space surveillance, the state or orbital uncertainty can be highly non-Gaussian and filtering techniques beyond the EKF and UKF are sometimes required. Examples include Gaussian sum (mixture) filters, filters based on non-linear propagation of uncertainty using Taylor series expansions of the solution flow, particle filters, and the probability hypothesis density filter and its generalization, the cardinalized probability hypothesis density filter.

A drawback of many existing methods for non-linear filtering and uncertainty management, including the ones reviewed above, is the constraint that the state space be defined on an n-dimensional Cartesian space $\mathbb{R}^n$. Any statistically rigorous treatment of uncertainty uses PDFs defined on the underlying manifold on which the system state is defined. In the space surveillance tracking problem, the system state is often defined with respect to orbital element coordinates. In these coordinates, five of the six elements are approximated as unbounded Cartesian coordinates on $\mathbb{R}^5$ while the sixth element is an angular coordinate defined on the circle $\mathbb{S}$ with the angles $\theta$ and $\theta+2\pi k$ (where k is any integer) identified as equivalent (i.e., they describe the same location on the orbit). Thus, more rigorously, an orbital element state space is defined on the six-dimensional cylinder $\mathbb{R}^5 \times \mathbb{S}$. Indeed, the mistreatment of an angular coordinate as an unbounded Cartesian coordinate can lead to many unexpected software faults and other dire consequences.

BRIEF SUMMARY OF THE INVENTION

Embodiments of the present invention overcome the disadvantages and limitations of the prior art by providing methods and systems for properly characterizing the uncertainty of a state defined on a n+1 dimensional cylindrical manifold $\mathbb{R}^5 \times \mathbb{S}$, e.g., characterizing the uncertainty of the orbital state of an Earth-orbiting space object.

In order to provide a more statistically rigorous treatment of uncertainty in the space surveillance tracking environment and to better support the aforementioned SSA functions, embodiments of the present invention provide a new class of multivariate probability density functions (PDFs), called Gauss von Mises (GVM) distributions, formulated to more accurately characterize the uncertainty of a space object's state or orbit. Using the GVM distribution as input, extensions and improvements can be made to tracking algorithms including the Bayesian non-linear filter used for uncertainty propagation and data fusion, batch processing and orbit determination, multi-dimensional quadrature, and likelihood ratios and other scoring metrics used in data association. An exemplary Application of embodiments described herein is the use of the GVM distribution within a sequential nonlinear filter resulting in improved algorithms for uncertainty propagation and data fusion to support higher level SSA functions. Embodiments of the present invention provide a tractable implementation of the Bayesian non-linear filter using the GVM distribution to model state or orbital uncertainty while providing significant improvements, both in terms of accuracy and computational expense, over the aforementioned methods.

In accordance with an embodiment of the present invention characterizing the uncertainty of the orbital state of an Earth-orbiting space object hereof represents the uncertainty using the Gauss von Mises probability density function defined on the n+1 dimensional cylindrical manifold $\mathbb{R}^n \times \mathbb{S}$. Additionally, embodiments of the present invention can include transforming a Gauss von Mises distribution under a diffeomorphism and approximating the output as a Gauss von Mises distribution. Embodiments of the present invention can also include fusing a prior state represented by a Gauss von Mises distribution with an update report, wherein the update can be either another Gauss von Mises distribution of the same dimension as the prior or an observation related to the prior by a stochastic measurement model. A Gauss von Mises distribution can be calculated from a plurality of reports, wherein the reports are either Gauss von Mises distributions or observations related to the state space by a stochastic measurement model. Embodiments can include, but are not limited to, providing a suite of decision-making tools, based on a method for properly characterizing the uncertainty of the orbital state of an Earth-orbiting space object as described herein, that allow an operator to take an appropriate course of action such as maneuvering a satellite in order to avoid a potential collision or updating a catalog of space objects in order to improve the accuracy of the objects in the catalog.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

DETAILED DESCRIPTION OF THE INVENTION

Figure 1:
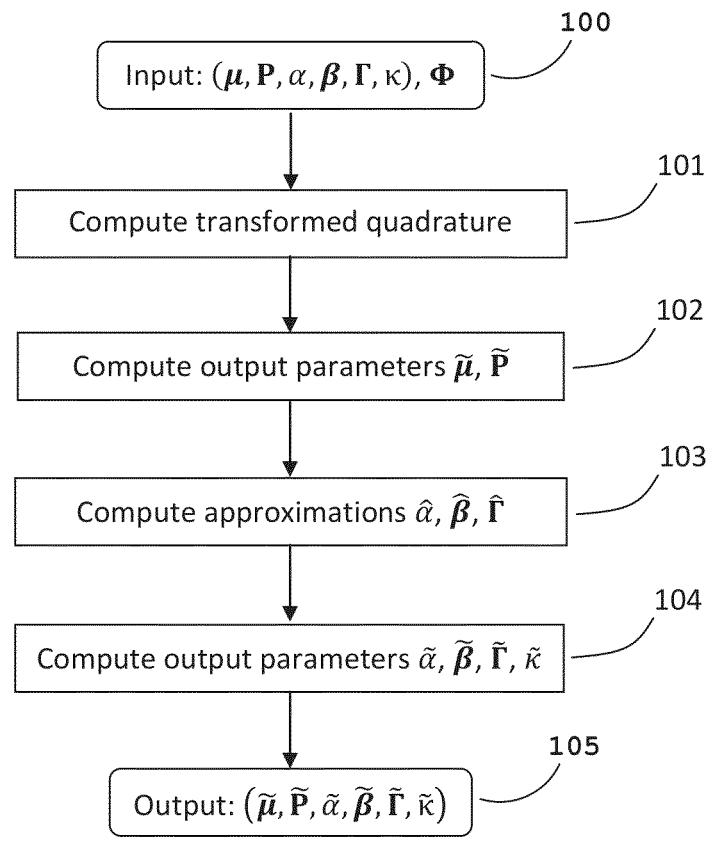
FIG. 1 is a flowchart illustrating an exemplary process for transforming a Gauss von Mises distribution under a diffeomorphism and approximating the output as a Gauss von Mises distribution according to one embodiment of the present invention.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The terms "machine-readable medium" and/or "computer-readable medium" include, but are not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for properly characterizing the uncertainty of a state defined on a n+1 dimensional cylindrical manifold $\mathbb{R}^n \times \mathbb{S}$, e.g., characterizing the uncertainty of the orbital state of an Earth-orbiting space object. More specifically, embodiments of the present invention provide a new class of multivariate probability density functions (PDFs), called Gauss von Mises (GVM) distributions, formulated to more accurately characterize the uncertainty of a space object's state or orbit. Using the GVM distribution as input, extensions and improvements can be made to tracking algorithms including the Bayesian non-linear filter used for uncertainty propagation and data fusion, batch processing and orbit determination, multi-dimensional quadrature, and likelihood ratios and other scoring metrics used in data association. An exemplary application of embodiments described herein is the use of the GVM distribution within a sequential non-linear filter resulting in improved algorithms for uncertainty propagation and data fusion to support higher level SSA functions. Embodiments of the present invention provide a tractable implementation of the Bayesian non-linear filter using the GVM distribution to model state or orbital uncertainty while providing significant improvements, both in terms of accuracy and computational expense, over the aforementioned methods.

One feature of the GVM distribution is its definition on a cylindrical state space $\mathbb{R}^n \times \mathbb{S}$ with the proper treatment of the angular coordinate within the general framework of directional statistics. Hence, the GVM distribution is robust for uncertainty quantification in orbital element space. The Gauss von Mises (GVM) distribution uses the von Mises distribution, the analogy of a Gaussian distribution defined on a circle, to robustly describe uncertainty in the angular coordinate. The marginal distribution in the Cartesian coordinates is Gaussian. Additionally, the GVM distribution can contain a parameter set controlling the correlation between the angular and Cartesian variables as well as the higher-order cumulants which gives the level sets of the GVM PDF a distinctive "banana" or "boomerang" shape.

By providing a statistically robust treatment of the uncertainty in a space object's orbital element state by rigorously defining the uncertainty on a cylindrical manifold, the GVM distribution can support a suite of next-generation algorithms for uncertainty propagation, data association, space catalog maintenance, and other SSA functions. When adapted to state PDFs modeled by GVM distributions, the general Bayesian non-linear filter can be tractable. The prediction step of the resulting GVM filter can be made derivative-free, like the UKF, by new quadrature rules for integrating a function multiplied by a GVM weight function, thereby extending the unscented transform. Moreover, prediction using the GVM filter uses the propagation of the same number of sigma points (quadrature nodes) as the standard UKF. Thus, the GVM filter prediction step (uncertainty propagation) has similar computational costs as the UKF and, as demonstrated in the EXAMPLE below, the former can maintain a proper characterization of the uncertainty much longer than the latter. In the most exceptional cases when the actual state uncertainty deviates from a GVM distribution, a mixture version of the GVM filter can be formulated (using GVM distributions as the mixture components) to provide proper uncertainty realism in analogy to the Gaussian sum (mixture) filter. Furthermore, the GVM filter can be applicable in various regimes of space and to both conservative (e.g., gravity) and non-conservative forces (e.g., atmospheric drag, solar radiation pressure). Stochastic process noise, uncertain model parameters, and residual biases can also be treated within the GVM filter using extensions of classical consider analysis and the Schmidt-Kalman filter. A maximum a posteriori batch processing capability for orbit determination (track initiation) can also be formulated which generates a GVM PDF characterizing the initial orbital state and uncertainty from a sequence of input reports such as radar, electro-optical, or infrared sensor observation data or even full track states. To support the data fusion problem of tracking, the correction step of the Bayesian non-linear filter can also be specialized to GVM distributions thereby enabling one to combine reports emanating from a common object to improve the state or understanding of that object. The filter correction step can also furnish a statistically rigorous prediction error which appears in the likelihood ratios for scoring the association of one report to another. Thus, the new GVM filter can be used to support multi-target tracking within a general multiple hypothesis tracking framework. Additionally, the GVM distribution admits a distance metric which extends the classical Mahalanobis distance ($\chi^2$ statistic). This new "Mahalanobis von Mises" metric provides a test for statistical significance and facilitates validation of the GVM filter. Another noteworthy feature of the GVM framework is its backwards compatibility with the space catalog and existing covariance-based algorithms. That is, the GVM distribution reduces to a Gaussian under suitable limits and the GVM filter reduces to the UKF in the case of linear dynamical and measurement models.

Figure 9B:
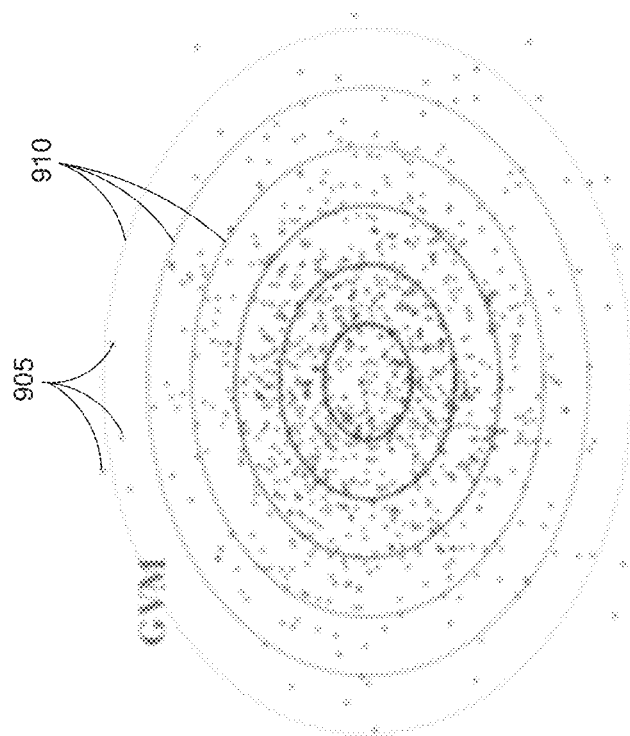
FIGS. 9a-9f are graphs illustrating the uncertainty of a space object's orbital state at different epochs $t-t_0$ computed from the prediction steps of the extended Kalman filter (EKF), unscented Kalman filter (UKF), Gauss von Mises (GVM) filter, and a particle filter and used in the accompanying EXAMPLE for demonstration according to one embodiment of the present invention.
Figure 9A:
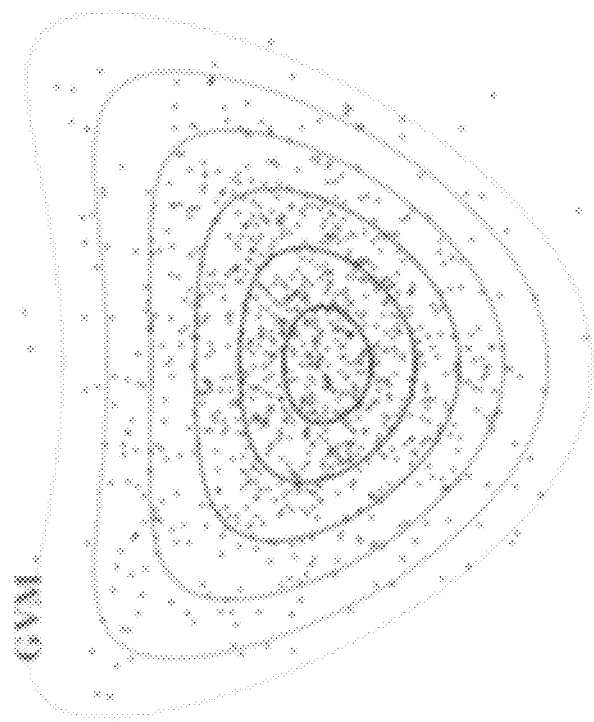
Figure 9C:
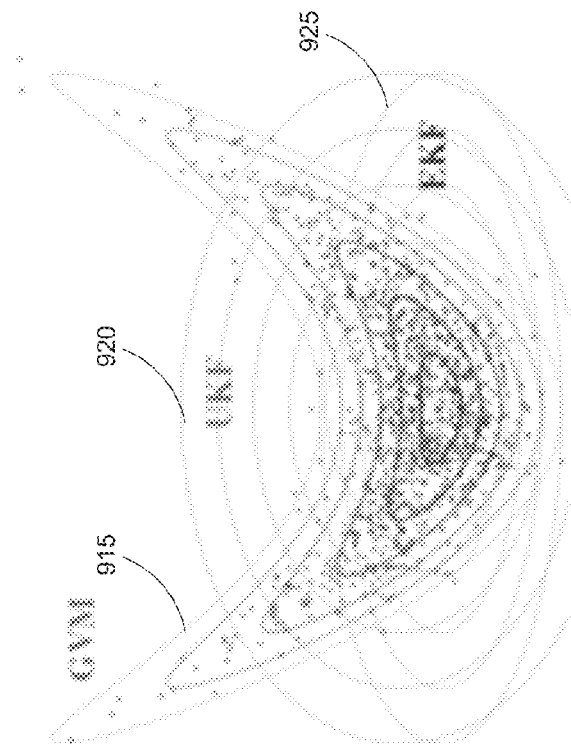
Figure 9D:
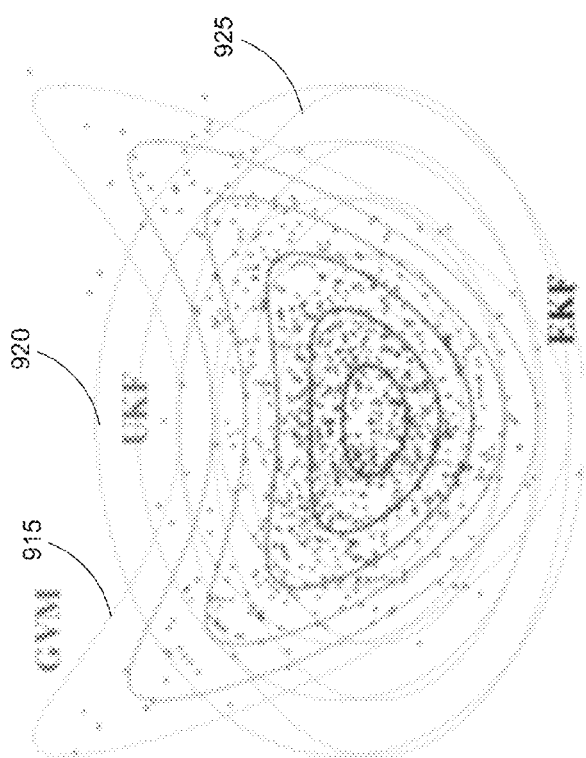
Figure 9F:
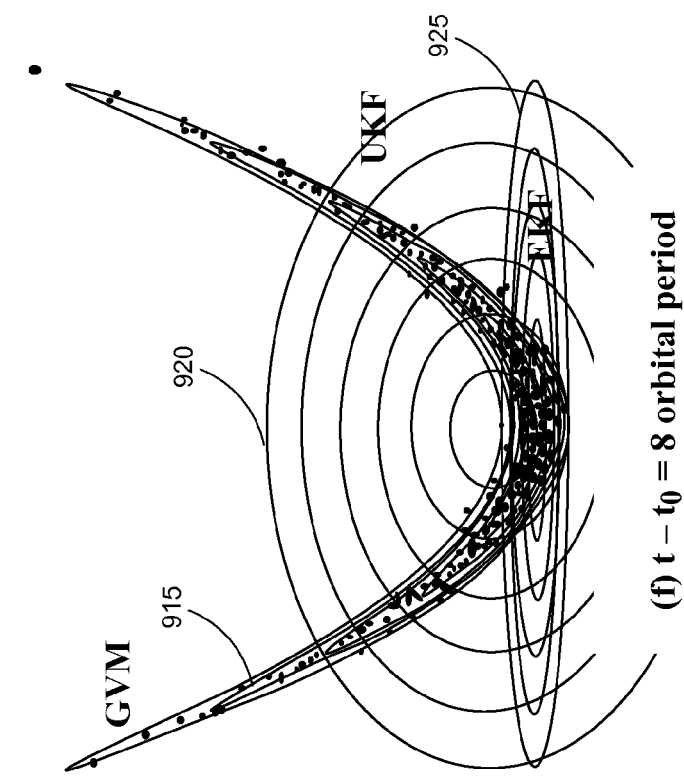
Figure 9E:
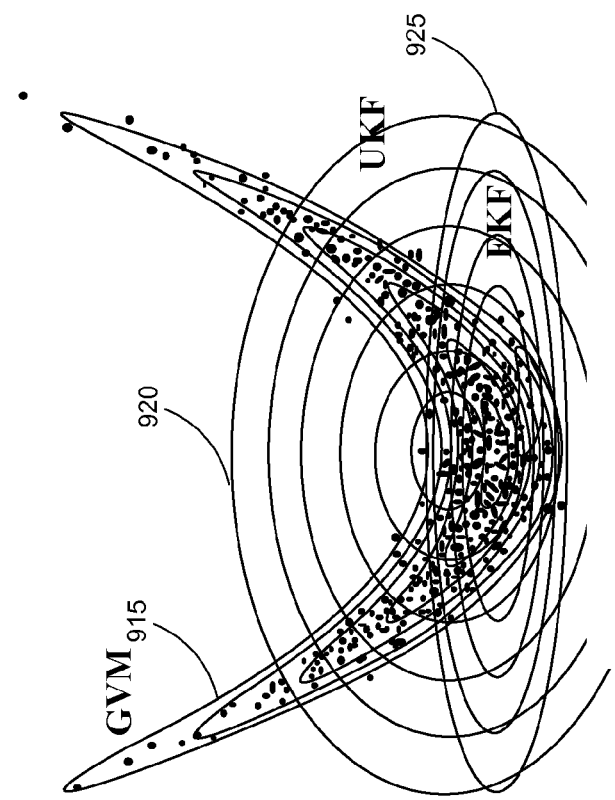

To briefly demonstrate the implication of mis-characterizing orbital uncertainty and the improvements obtained when using the GVM distribution, FIGS. 9a-9f provides a simple example comparing the uncertainty propagation algorithms implicit in the EKF, UKF, and new GVM filter. FIG. 9a shows a particle representation of an orbital state PDF in equinoctial orbital element space plotted on the plane of the semi-major axis and mean longitude coordinates. The particles 905 are dispersed according to the level curves 910 ranging from 0.5 to 3 sigmas in half sigma increments. FIG. 9f shows the results of propagating this initial uncertainty (for eight orbital periods in this example) using the EKF, UKF, and GVM filter. The respective level curves of the PDF computed from the EKF 925, UKF 920, and GVM 915 filter are superimposed on the figure. The level curves computed from the GVM filter can capture the actual uncertainty characterized by the particle ensemble. For the UKF, its covariance is indeed consistent (realistic) in the sense that it agrees with that computed from the definition of the covariance using the true PDF. Thus, in this example, the UKF provides "covariance realism" but does not support "uncertainty realism" since the covariance does not represent the actual banana-shaped uncertainty of the true PDF. Further, the state estimate produced from the UKF coincides with the mean of the true PDF. However, the mean is displaced from the mode of the true PDF. Consequently, the probability that the object is within a small neighborhood centered at the UKF state estimate (mean) is essentially zero. The EKF, on the other hand, provides a state estimate coinciding closely with the mode of the true PDF, but the covariance tends to collapse making inflation necessary to begin to cover the uncertainty. In neither the EKF nor UKF case does the covariance actually model the uncertainty. This example illustrates the problem of using a single Gaussian PDF (i.e., covariance) to represent uncertainty and suggests that the GVM distribution provides a better representation of the actual orbital state PDF which is important if one is to achieve statistically robust characterization of uncertainty, which again is fundamental to achieving a robust capability across the SSN.

The Gauss von Mises (GVM) distribution and its resulting applications can provide a new suite of algorithms to support the future needs of the SSA mission. The distribution can provide a mechanism for more accurately characterizing the uncertainty in a space object's orbit at little or no additional cost to existing methods in operation while providing backwards compatibility with legacy systems. The framework can support (i) orbit determination to generate a realistic characterization of an initial orbital state and uncertainty from a sequence of sensor observations, (ii) non-linear uncertainty propagation to predict the future location of a space object and properly characterize its orbital uncertainty at future times, (iii) conjunction analysis to estimate the probability that two space objects will collide, (iv) anomaly and maneuver detection to determine if an object deviates from its expected kinematic trajectory, and (v) data fusion, tracking, and space catalog maintenance to update a catalog of space objects, online, as new observations are received, in order to improve the accuracy of the objects in the catalog. These SSA tracking algorithms based on the GVM distribution can provide next-generation upgrades to the Astrodynamic Standards software suite maintained by AFSpC and support the overall objectives of the JSpOC Mission System. Various additional details of embodiments of the present invention will be described below with reference to the figures.

The organization of the invention description is described below.

Section I entitled "Uncertainty on Manifolds" gives an overview of uncertainty characterization in tracking and discusses coordinate systems used to describe a space object's orbital state and the pitfalls of mistreating an angular coordinate by an unbounded Cartesian coordinate. The von Mises distribution is then introduced as one possible distribution to rigorously treat the uncertainty of an angular variable.

Section II entitled "Construction of the Gauss von Mises Distribution" motivates and defines the Gauss von Mises (GVM) distribution.

Section III entitled "Elementary Properties" lists various mathematical and statistical properties of the GVM distribution.

Section IV entitled "Gauss von Mises Quadrature" extends the methodology of classical Gauss-Hermite quadrature to enable the computation of the expected value of a non-linear transformation of a GVM random variable, thereby providing a general framework for GVM quadrature. Such quadrature formulas play a key role in the derivation of the GVM filter prediction step.

Section V entitled "Uncertainty Propagation" develops the prediction step of the Bayesian non-linear filter using the GVM distribution as input thereby providing a method for approximating the non-linear transformation of a GVM distribution as another GVM distribution. Performance metrics used for validation and extensions to the propagation of mixtures of GVM distributions are also discussed.

Section VI entitled "Data Fusion" specializes the correction step of the Bayesian non-linear filter to the case when the prior state is a random vector represented by a GVM distribution and the update report is either another GVM random vector or an observation related to the prior by a stochastic measurement model. The corresponding prediction error term used to score the association of one report to another is also derived.

Section VII entitled "Batch Processing" treats the batch filtering problem which processes a sequence of reports simultaneously to produce a GVM distribution of the system state conditioned on the reports.

The reader of this document is assumed to be familiar with the standard notation of linear algebra, in particular, the notions of matrices, vectors, matrix vector product, matrix inverse, and systems of linear equations. The reader of this document is also assumed to be familiar with elementary probability theory, in particular, the notations of random variables, random vectors, probability density functions, and transformations of random variables and random vectors. The required background can be obtained by reading books associated with college courses in linear algebra, matrix analysis, and probability theory. It may also be useful to have familiarity with orbital mechanics.

I. Uncertainty on Manifolds

A permeating theme throughout space situational awareness is the achievement of the correct characterization and management of uncertainty, which in turn is used to support conjunction analysis, data association, anomaly detection, and sensor resource management. The success in achieving a proper characterization of the uncertainty in the state of a space object can depend greatly on the choice of coordinate system. Under Gaussian assumptions, the coordinates used to represent the state space can impact how long one can propagate the uncertainty under a non-linear dynamical system. A Gaussian random vector need not get mapped to a Gaussian under a non-linear transformation. The representation of a space object's kinematic state in orbital element coordinates, rather than Cartesian Earth-Centered-Inertial (ECI) position-velocity coordinates, is well-suited to the space surveillance tracking problem since such coordinates "absorb" the most dominant term in the non-linear gravitational force (i.e., the $1/r^2$ term) leading to "more linear" propagations. Thus, these special coordinates can mitigate the departure from "Gaussianity" under the non-linear propagation of an initial Gaussian state probability density function (PDF) with respect to orbital elements. Additional discussions are provided in Subsection I.A below. The benefits of the orbital element coordinates are also exploited in the propagation of a Gauss von Mises (GVM) PDF under the non-linear two-body dynamics. This framework is developed later in Section V.

The application of orbital element coordinates within traditional sequential filtering methods such as the extended Kalman filter (EKF), unscented Kalman filter (UKF), and even the highest fidelity Gaussian sum filters has one major disadvantage: the mean anomaly (or mean longitude) angular coordinate describing the location along the orbit is incorrectly treated as an unbounded Cartesian coordinate. Some side effects and pitfalls of such mistreatments within the problems of averaging and fusing angular quantities are described in Subsection I.B. Ultimately, what is helpful to rectify these shortcomings is a statistically rigorous treatment of the uncertainty on the underlying manifold on which the system state is defined. The theory of directional statistics provides one possible development path. Though the theory can treat uncertainty on very general manifolds (such as tori and hyper-spheres) possessing multiple directional quantities, this work focuses on distributions defined on the circle $\mathbb{S}$ and the n+1-dimensional cylinder $\mathbb{R}^n \times \mathbb{S}$. The latter is the manifold on which the orbital element coordinates are more accurately defined. As a starting point, the von Mises PDF is introduced in Subsection I.C as one possible distribution to rigorously treat the uncertainty of a single angular variable defined on the circle. The von Mises distribution paves the way for the next section concerning the development of the GVM distribution used to represent uncertainty on a cylinder.

I.A. Orbital Element Coordinate Systems

With respect to Cartesian ECI position-velocity coordinates $(r, \dot{r})$, the acceleration $\ddot{r}$ of a space object (e.g., satellite, debris) can be written in the form $$\ddot{r} = -\frac{\mu_\oplus}{r^3} r + a_{pert}(r, \dot{r}, t). \quad (1)$$

In this equation, $r=|r|$, $\mu_\oplus = GM_\oplus$ where G is the gravitational constant and $M_\oplus$ is the mass of the Earth, and $a_{pert}$ encapsulates all perturbing accelerations of the space object other than those due to the two-body point mass gravitational acceleration.

The equinoctial orbital elements (a, h, k, p, q, l) define a system of curvilinear coordinates with respect to six-dimensional position-velocity space. Physical and geometric interpretations of these coordinates as well as the transformation from equinoctial elements to ECI are known. Models for the perturbing acceleration $a_{pert}$ are also well known.

The representation of the dynamical model (1) in coordinate systems other than ECI can be obtained using the chain rule. Indeed, if $u=u(r, \dot{r})$ denotes a coordinate transformation from ECI position-velocity coordinates $(r, \dot{r})$ to a coordinate system $u \in \mathbb{R}^6$ (e.g., equinoctial orbital elements), then (1) is transformed to $$\dot{u} = \dot{u}_{unpert} + \frac{\partial u}{\partial \dot{r}} \cdot a_{pert}(r, \dot{r}, t), \quad (2)$$

where $$\dot{u}_{unpert} = \frac{\partial u}{\partial r} \cdot \dot{r} - \frac{\mu_\oplus}{r^3} \frac{\partial u}{\partial \dot{r}} \cdot r. \quad (3)$$

If u is the vector of equinoctial orbital elements, then (3) simplifies to $$\dot{u}_{nunpert} = (0,0,0,0,0,\sqrt{\mu_\oplus/a^3})^T. \quad (4)$$

Therefore, the time evolution of a space object's equinoctial orbital element state (a, h, k, p, q, l) under the assumption of unperturbed two-body dynamics is $$a(t)=a_0, h(t)=h_0, k(t)=k_0, p(t)=p_0, q(t)=q_0, l(t)=l_0+n_0(t-t_0), \quad (5)$$

where $n_0 = \sqrt{\mu_\oplus/a_0^3}$ is the mean motion at the initial epoch.

It is now argued that an equinoctial orbital element state can be regarded as a state defined on the six-dimensional cylinder $\mathbb{R}^5 \times \mathbb{S}$. The definition of the equinoctial orbital elements (a, h, k, p, q, l) implicitly assumes closed (e.g., elliptical) orbits which imposes the following constraints:

$$a>0, h^2+k^2<1, p,q \in \mathbb{R}, l \in \mathbb{S}.$$

Though any real value can be assigned to the mean longitude coordinate l, the angles l and l+2πk, for any integer $k \in \mathbb{Z}$, define the same location along the orbit. Hence, l can be regarded as an angular coordinate defined on the circle $\mathbb{S}$. Mathematically, the first five elements (a, h, k, p, q) are not defined everywhere on $\mathbb{R}^5$. Physically however, it can be argued that the sample space in these five coordinates can be extended to all of $\mathbb{R}^5$. Indeed, the elements (a, h, k, p, q) describe the geometry of the (elliptical) orbit and the orientation of the orbit relative to the equatorial plane. In practice, the uncertainties in the orbital geometry and orientation are sufficiently small so that the probability that an element is close to the constraint boundary is negligible. Moreover, under unperturbed dynamics, these five elements are conserved by Kepler's laws (see Equations (5)) and, consequently, their respective uncertainties do not grow. That said, under the above assumptions, the manifold on which the elements (a, h, k, p, q) are defined can be approximated as all of $\mathbb{R}^5$ and the full six-dimensional equinoctial orbital element state space can be defined on the cylinder $\mathbb{R}^5 \times \mathbb{S}$. With the inclusion of perturbations in the dynamics (e.g., higher-order gravity terms, drag, solar radiation, etc.), the first five elements evolve with small periodic variations in time and their uncertainties exhibit no long-term secular growth. Thus, the same cylindrical assumptions on the state space apply. These discussions also equally apply to other systems of orbital elements such as Poincaré orbital elements, modified equinoctial orbital elements, and alternate equinoctial orbital elements.

Though the uncertainties in the first five equinoctial elements exhibit only small periodic changes under two-body dynamics, it is the uncertainty along the semi-major axis coordinate a which causes the uncertainty along the mean longitude coordinate l to grow without bound. In other words, as time progresses, one can generally maintain a good understanding of the geometry and orientation of the orbit, but confidence is gradually lost in the exact location of the object along its orbit. The growth in the uncertainty in l can cause undesirable consequences if l is incorrectly treated as an unbounded Cartesian variable or the uncertainty in l is modeled as a Gaussian. With a Gaussian assumption imposed on the PDF in l, one would assign different likelihoods to l and l+2πk for different values of $k \in \mathbb{Z}$, even though the mean longitudes l and l+2πk define the same location on the circle. Additional insights are provided in the next subsection.

I.B. Examples of Improper Treatments of Angular Quantities

As described in the previous subsection, the mean longitude coordinate (i.e., the sixth equinoctial orbital element) is an angular coordinate in which the angles l and l+2πk are identified (equivalent) for any integer $k \in \mathbb{Z}$. In other words, the mean longitude is a circular variable and, as such, a rigorous treatment should not treat it as an unbounded real-valued Cartesian variable. In many cases (and with proper branch cuts defined), it is practical to treat the mean anomaly as real-valued, allowing for distributions to be represented as Gaussians, for example. The drawback of this approach is that the resulting statistics can depend on choice of the integer 'k'.

For example, suppose one wishes to compute the conventional average $\bar{\theta}$ of two angles $\theta_1 = \pi/6$ and $\theta_2 = -\pi/6$. On one hand, $\bar{\theta}=\frac{1}{2}(\theta_1+\theta_2)=0$. On the other hand, since $\theta_2=-\pi/6$ and $\theta_2=11\pi/6$ define the same location on the circle, then using this equivalent value of $\theta_2$ in the definition of the average would yield $\bar{\theta}=\pi$. Thus, in order for the conventional average to be well-defined, the statistic $$\bar{\theta}=\frac{1}{2}[(\theta_1+2\pi k_1)+(\theta_2+2\pi k_2)]=\frac{1}{2}(\theta_1+\theta_2)+\pi(k_1+k_2)$$

must be independent of the choice of $k_1, k_2 \in \mathbb{Z}$. Clearly this is not the case for the simple example studied above. Different values of $k_1$ and $k_2$ can define averages at opposite sides of the circle. The unscented transform used in the UKF can also exhibit similar side effects when used in equinoctial orbital element space (especially if the mean longitude components of the sigma points are sufficiently dispersed) because it requires one to compute a weighted average of angular (mean longitude) components.

Figure 6B:
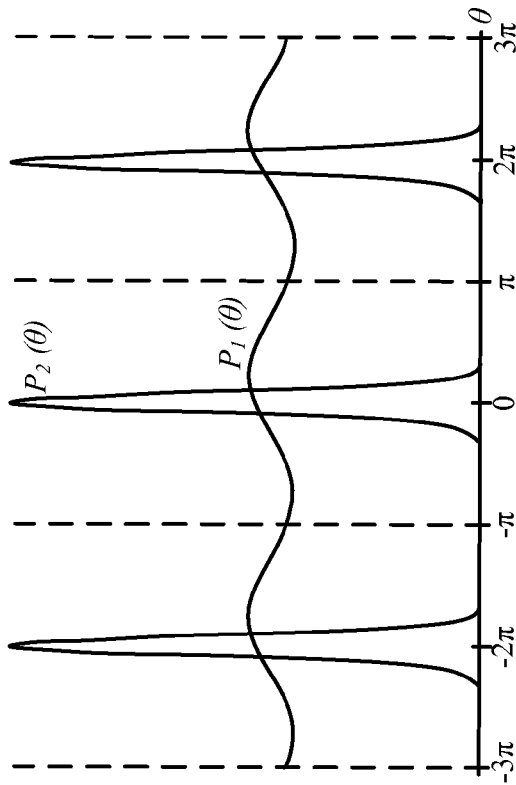
FIGS. 6a and 6b are graphs illustrating the fusion of a prior probability density function $p_1(\theta)$ with an update probability density function $p_2(\theta)$ wherein (a) the angle $\theta$ is mis-represented as a Cartesian variable and (b) the angle $\theta$ is represented correctly as a circular variable according to one embodiment of the present invention.
Figure 6A:
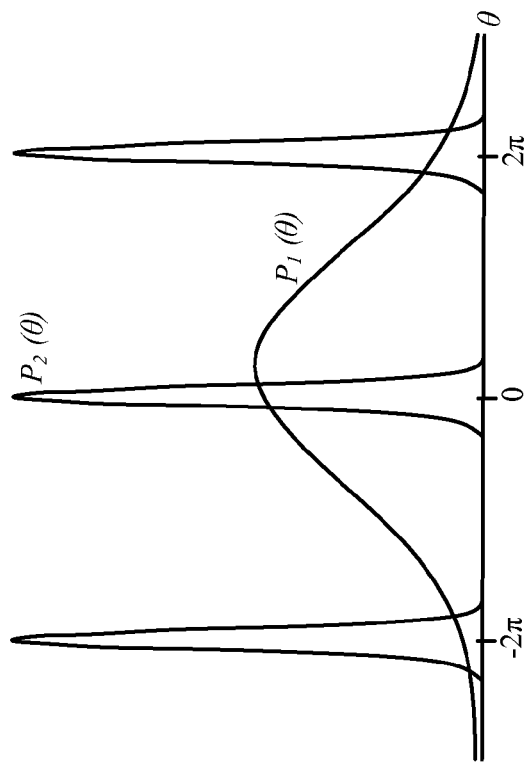

A more striking example of the mis-representation of a circular variable as an unbounded Cartesian variable is demonstrated in FIG. 6a. In this simple example, consider a one-dimensional angular state space with two independent states: a "prior" $\theta_1$ and an "update" $\theta_2$ with respective PDFs $P_1(\theta_1)$ and $p_2(\theta_2)$. The PDF in $\theta_1$ is diffuse (i.e., the uncertainty is large) and, further, $\theta_1$ is incorrectly modeled as an unbounded Cartesian variable. The update state $\theta_2$ has a mean of zero and a very small variance (uncertainty). Any one of these curves can represent the PDF of the update since they are all equivalent up to an integer $2\pi$ shift. The "correct" update is ambiguous. Within a non-linear filtering application, one might want to fuse the prior $\theta_1$ with the information from $\theta_2$. In such a case, the Bayesian filter correction step yields a "fused PDF" $p_f(\theta)$ in the fused state $\theta$ given by $$p_f(\theta) = \frac{1}{c} p_1(\theta) p_2(\theta), \qquad (6)$$

$$c = \int_I p_1(\theta) p_2(\theta) d\theta,$$

where $I=(-\infty, \infty)$. Thus, the expression obtained for the fused PDF as well as the normalization constant c depend on the choice (i.e., $2\pi$ shift) of the update PDF. In particular, a mis-computed normalization constant c can have severe consequences within a tracking system, as analogous expressions for c appear in the likelihood ratios for scoring the association of one report to another. FIG. 6b depicts how these ambiguity issues can be resolved by turning to the theory of directional statistics. Further analysis is provided in the next subsection.

I.C. von Mises Probability Density Function

The source of the ambiguity in computing the fused PDF (6) in the example of the previous subsection lies in the incorrect treatment of an angular variable as an unbounded Cartesian real-valued variable. These problems can be rectified by representing the state PDF not necessarily on a Cartesian space $\mathbb{R}^n$ but instead on the manifold that more accurately describes the global topology of the underlying state space. One change made for (equinoctial) orbital element states can be the representation of the uncertainty in the angular coordinate (mean longitude) as a PDF on the circle $\mathbb{S}$ so that the joint PDF in the six orbital elements defines a distribution on the cylinder $\mathbb{R}^5 \times \mathbb{S}$. In order to do so, PDFs defined on the circle are used.

A function $p: \mathbb{R} \to \mathbb{R}$ is a probability density function (PDF) on the circle $\mathbb{S}$ if
1. $p(\theta) \geq 0$ almost everywhere on $(-\infty, \infty)$,
2. $p(\theta+2\pi)=p(\theta)$ almost everywhere on $(-\infty, \infty)$,
3. $\int_{-\pi}^{\pi} p(\theta) d\theta = 1$.

Figure 7:
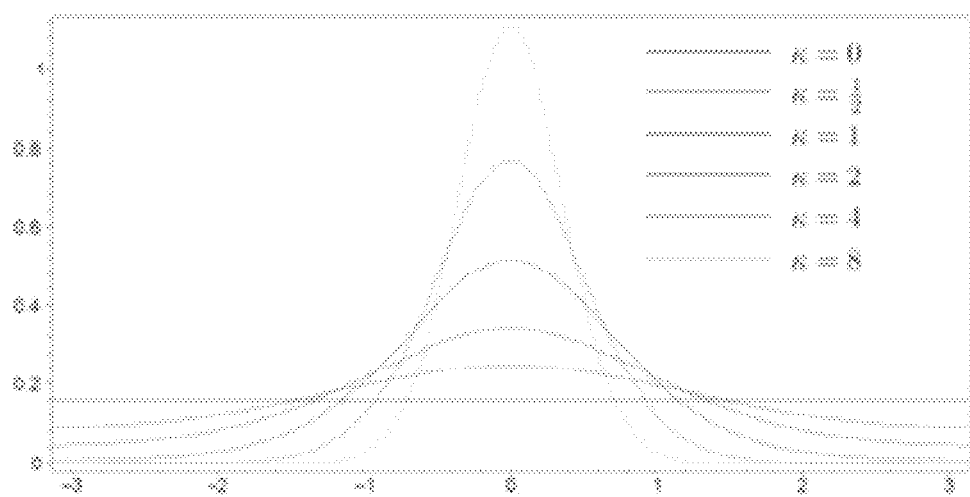
FIG. 7 is a graph showing plots of the von Mises probability density function with location parameter $\alpha=0$ and different values of the concentration parameter $\kappa$ according to one embodiment of the present invention.

One example satisfying the above conditions is the von Mises distribution which provides an analogy of a Gaussian distribution defined on a circle. The von Mises PDF in the angular variable $\theta$ is defined by $$\mathcal{VM}(\theta; \alpha, \kappa) = \frac{e^{\kappa \cos(\theta-\alpha)}}{2\pi I_0(\kappa)}, \qquad (7)$$

where $I_0$ is the modified Bessel function of the first kind of order 0. The parameters $\mu$ and $\kappa$ are measures of location and concentration. As $\kappa \to 0^+$, the von Mises distribution tends to a uniform distribution. For large $\kappa$, the von Mises distribution becomes concentrated about the angle $\alpha$ and approaches a Gaussian distribution in $\theta$ with mean $\mu$ and variance $1/\kappa$. Some example plots are shown in FIG. 7. An algebraically equivalent expression of (7) which is numerically stable for large values of $\kappa$ is $$\mathcal{VM}(\theta; \alpha, \kappa) = \frac{e^{2\kappa \sin^2 \frac{1}{2}(\theta-\alpha)}}{2\pi e^{-\kappa} I_0(\kappa)}. \qquad (8)$$

The von Mises distribution (8) can be used in the next section to construct the Gauss von Mises distribution defined on the cylinder $\mathbb{R}^n \times \mathbb{S}$.

This section concludes with a discussion on how the von Mises distribution can resolve the problems in the previous subsection concerning the averaging and fusion of angular quantities. Suppose $\theta_1, \ldots, \theta_N$ is a sample of independent observations coming from a von Mises distribution. Then, the maximum likelihood estimate of the location parameter $\alpha$ is $$\hat{\alpha} = \arg\left(\frac{1}{N} \sum_{j=1}^{N} e^{i\theta_j}\right). \qquad (9)$$

Unlike the conventional average $(\theta_1+\ldots+\theta_N)/N$, the "average" $\hat{\alpha}$ is independent of any $2\pi$ shift in the angles $\theta_j$. In the fusion example, if the prior and update PDFs are von Mises distributions, i.e., $$p_1(\theta_1) = \mathcal{VM}(\theta_1; \alpha_1, \kappa_1), p_2(\theta_2) = \mathcal{VM}(\theta_2; \alpha_2, \kappa_2),$$

then the fused PDF (6) can be formed unambiguously and $p_f(\theta) = p_f(\theta+2\pi k)$ for any $k \in \mathbb{Z}$. As seen in FIG. 6b, there is no longer any ambiguity in how to choose the "correct" update PDF $p_2(\theta)$, since both $p_1(\theta)$ and $p_2(\theta)$ are properly defined circular PDFs. The integration interval I in the computation of the normalization constant c in (6) is any interval of length $2\pi$, i.e., $I=(a, a+2\pi)$ for some $a \in \mathbb{R}$. In other words, the value of c is independent of the choice of a.

II. Construction of the Gauss von Mises Distribution

This section defines the Gauss von Mises (GVM) distribution used to characterize the uncertainty in a space object's orbital state. Later, in Subsection II.B, the connection between the GVM distribution and a related family of distributions is discussed.

The proposed GVM distribution is not defined as a function of other random variables with specified probability density functions (PDFs). Instead, its construction is based on satisfying the following conditions listed below.
1. The GVM family of multivariate PDFs can be defined on the n+1-dimensional cylindrical manifold $\mathbb{R}^n \times \mathbb{S}$.

2. The GVM distribution can have a sufficiently general parameter set which can model non-zero higher-order cumulants beyond a usual "mean" and "covariance."
3. The GVM distribution can account for correlation between the Cartesian random vector $x \in \mathbb{R}^n$ and the circular random variable $\theta \in \mathbb{S}$.
4. The level sets of the GVM distribution can be generally "banana" or "boomerang" shaped so that a more accurate characterization of the uncertainty in a space object's state in equinoctial orbital elements can be achieved.
5. The GVM distribution can reduce to a multivariate Gaussian PDF in a suitable limit.
6. The GVM distribution can permit a tractable implementation of the general Bayesian nonlinear filter and other applications to support advanced SSA.

In clarification of the first condition, a function p: $\mathbb{R}^n \times \mathbb{R} \to \mathbb{R}$ is a probability density function (PDF) on the cylinder $\mathbb{R}^n \times \mathbb{S}$ if
1. $p(x, \theta) \geq 0$ almost everywhere on $\mathbb{R}^n \times \mathbb{R}$,
2. $p(x, \theta+2\pi) = p(x, \theta)$ almost everywhere on $\mathbb{R}^n \times \mathbb{R}$,
3. $\int_{\mathbb{R}^n} \int_{-\pi}^{\pi} p(x, \theta) d\theta \, dx = 1$.

This definition extends the definition of a PDF defined on a circle. One example satisfying the above conditions is $$p(x,\theta) = \mathcal{N}(x; \mu, P) \mathcal{VM}(\theta; \alpha, \kappa),$$

where $\mathcal{VM}(\theta; \alpha, \kappa)$ is the von Mises PDF defined by (8) and $\mathcal{N}(x; \mu, P)$ is the multivariate Gaussian PDF given by $$\mathcal{N}(x; \mu, P) = \frac{1}{\sqrt{\det(2\pi P)}} \exp\left[-\frac{1}{2}(x-\mu)^T P^{-1} (x-\mu)\right], \quad (10)$$

where $\mu \in \mathbb{R}^n$ and P is an n×n symmetric positive-definite (covariance) matrix. This simple example, though used as a starting point in constructing the GVM distribution, does not satisfy all of the conditions listed earlier. In particular, the desired family of multivariate PDFs should model correlation between x and θ and have level sets possessing a distinctive banana or boomerang shape.

To motivate the construction of the GVM distribution, consider two random vectors $x \in \mathbb{R}^n$ and $y \in \mathbb{R}^m$ whose joint PDF is Gaussian:

$$p(x, y) = \mathcal{N}\left(\begin{bmatrix} x \\ y \end{bmatrix}; \begin{bmatrix} \mu_x \\ \mu_y \end{bmatrix}, \begin{bmatrix} P_{xx} & P_{yx}^T \\ P_{yx} & P_{yy} \end{bmatrix}\right). \quad (11)$$

Using the definition of conditional probability and the Schur complement decomposition, the joint PDF (11) can be expressed as $$p(x, y) = p(x)p(y \mid x) \quad (12)$$
$$= \mathcal{N}(x; \mu_x, P_{xx}) \mathcal{N}(y; \mu_y + P_{yx} P_{xx}^{-1}(x - \mu_x), P_{yy} - P_{yx} P_{xx}^{-1} P_{yx}^T)$$
$$\equiv \mathcal{N}(x; \mu_x, P_{xx}) \mathcal{N}(y; g(x), Q),$$

where
$$g(x) = \mu_y + P_{yx} P_{xx}^{-1}(x - \mu_x),$$
$$Q = P_{yy} - P_{yx} P_{xx}^{-1} P_{yx}^T.$$

One very powerful observation resulting from this Schur complement decomposition is that (12) defines a PDF in (x, y) for an (analytic) function g(x) and a symmetric positive-definite matrix Q. In particular, if y is univariate and relabelled as θ, then $$p(x,\theta) = \mathcal{N}(x; \mu_x, P_{xx}) \mathcal{N}(\theta; \Theta(x), \kappa),$$

defines a PDF on $\mathbb{R}^n \times \mathbb{R}$ for an analytic function $\Theta: \mathbb{R}^n \to \mathbb{R}$ and a positive scalar κ. To make it robust for a circular variable $\theta \in \mathbb{S}$ and hence define a PDF on the cylinder $\mathbb{R}^n \times \mathbb{S}$, the Gaussian PDF in θ can be replaced by the von Mises PDF in θ:

$$p(x,\theta) = \mathcal{N}(x; \mu_x, P_{xx}) \mathcal{VM}(\theta; \Theta(x), \kappa). \quad (13)$$

The definition of the Gauss von Mises distribution fixes the specific form of the function Θ(x) in (13) so that the PDF can model non-zero higher-order cumulants (i.e., the banana shape of the level sets) but is not overly complicated so as the make the resulting Bayesian filter prediction and correction steps intractable.

Definition [Gauss von Mises (GVM) Distribution]

The random variables $(x, \theta) \in \mathbb{R}^n \times \mathbb{S}$ are said to be jointly distributed as a Gauss von Mises (GVM) distribution if their joint probability density function has the form $$p(x, \theta) = \mathcal{GVM}(x, \theta; \mu, P, \alpha, \beta, \Gamma, \kappa)$$
$$\equiv \mathcal{N}(x; \mu, P) \mathcal{VM}(\theta; \Theta(x), \kappa),$$

where $$\mathcal{N}(x; \mu, P) = \frac{1}{\sqrt{\det(2\pi P)}} \exp\left[-\frac{1}{2}(x-\mu)^T P^{-1}(x-\mu)\right],$$

$$\mathcal{VM}(\theta; \Theta(x), \kappa) = \frac{1}{2\pi e^{-\kappa} I_0(\kappa)} \exp\left[-2\kappa \sin^2 \frac{1}{2}(\theta - \Theta(x))\right],$$

and $$\Theta(x) = \alpha + \beta^T z + \frac{1}{2} z^T \Gamma z,$$
$$z = A^{-1}(x - \mu),$$
$$P = AA^T.$$

The parameter set (μ, P, α, β, Γ, κ) can be subject to the following constraints: $\mu \in \mathbb{R}^n$, P can be an n×n symmetric positive-definite matrix, $\alpha \in \mathbb{R}$, $\beta \in \mathbb{R}^n$, Γ can be an n×n symmetric matrix, and $\kappa \geq 0$. The matrix A in the definition of the normalized variable z can be the lower-triangular Cholesky factor of the parameter matrix P. The notation $$(x,\theta) \sim \text{GVM}(\mu, P, \alpha, \beta, \Gamma, \kappa)$$

denotes that (x, θ) can be jointly distributed as a GVM distribution with the specified parameter set.

It is noted that the function Θ(x) appearing in the GVM distribution can be an inhomogeneous quadratic in x or, equivalently, the normalized variable z. The use of the normalized variable z in the definition can be made to simplify the ensuing mathematics and so that the parameters β and Γ are dimensionless. Additionally, the parameters β and Γ model correlation between x and θ. The parameter matrix Γ can be tuned to give the level sets of the GVM distribution their distinctive banana or boomerang shape. In subsequent sections, it is demonstrated that the definition of the GVM distribution satisfies the remaining conditions listed at the beginning of the section.

II.A. Relationship to Mardia and Sutton

A related distribution defined on a cylindrical manifold proposed by Mardia and Sutton can be recovered starting from Equation (12). If x is univariate and relabelled as θ, then $$p(y,\theta) = \mathcal{N}(y; g(\theta), Q) \mathcal{N}(\theta; \mu_\theta, P_{\theta\theta})$$

defines a PDF on $\mathbb{R}^m \times \mathbb{R}$ for any analytic function g: $\mathbb{R} \to \mathbb{R}^m$. A PDF defined on the cylinder $\mathbb{R}^m \times \mathbb{S}$ can be obtained by replacing the Gaussian PDF in θ by the von Mises PDF in θ (and relabelling the other parameters) to yield $$p(y,\theta) = \mathcal{N}(y;g(\theta),P) \, \mathcal{VM}(\theta;\alpha,\kappa). \tag{14}$$

One specific choice for the function g(θ) is $$g(\theta) = a_0 + a_1 \cos\theta + b_1 \sin\theta, \tag{15}$$

for some parameter vectors $a_0, a_1, b_1 \in \mathbb{R}^m$.

The PDF (14) with g(θ) specified by (15) can be a generalization of the bivariate distribution defined on the two-dimensional cylinder $\mathbb{R} \times \mathbb{S}$ proposed by Mardia and Sutton. Their derivation also differs from that presented here in the sense that the authors start with a trivariate Gaussian distribution and then "project it" onto the cylinder.

Though the Mardia-Sutton distribution can be used in place of the GVM distribution in estimation and other space situational awareness algorithms, it is noted that the parameter set in the former provides less control over the magnitude of the higher-order cumulants and the bending of the banana or boomerang shaped level sets. For these reasons, the GVM distribution is preferred since it overcomes these limitations.

III. Elementary Properties

This section lists mathematical and statistical properties of the Gauss von Mises (GVM) distribution based on the definition stated in Section II and provides an outline of the derivation of non-trivial properties. These elementary properties are applied in subsequent sections of the description.

III.A. Mode

The GVM distribution is unimodal on $\mathbb{R}^n \times \mathbb{S}$ with $$(\mu,\alpha) = \operatorname*{argmax}_{x,\theta} \mathcal{GVM}(x,\theta;\mu,P,\alpha,\beta,\Gamma,\kappa).$$

III.B. Characteristic Function

The characteristic function of the GVM distribution, i.e., $$\varphi_{\mathcal{GVM}}(\xi,m;\mu,P,\alpha,\beta,\Gamma,\kappa) \equiv E\left[e^{i(\xi^T x + m\theta)}\right] =$$

$$\int_{\mathbb{R}^n} \int_{-\pi}^{\pi} e^{i(\xi^T x + m\theta)} \mathcal{GVM}(x,\theta;\mu,P,\alpha,\beta,\Gamma,\kappa) d\theta \, dx,$$

for $\xi \in \mathbb{R}^n$ and $m \in \mathbb{Z}$ is $$\varphi_{\mathcal{GVM}}(\xi,m;\mu,P,\alpha,\beta,\Gamma,\kappa) = \frac{1}{\sqrt{\det(I-im\Gamma)}} \frac{I_{|m|}(\kappa)}{I_0(\kappa)} \times \tag{16}$$

$$\exp\left[i(\mu^T\xi + m\alpha) - \frac{1}{2}(A^T\xi + m\beta)^T(I-im\Gamma)^{-1}(A^T\xi + m\beta)\right],$$

where I denotes the n×n identity matrix and $I_p$ is the modified Bessel function of the first kind of order p.

To derive (16), the definition of the GVM distribution in conjunction with the definition of the characteristic function is applied to obtain $$\varphi_{\mathcal{GVM}}(\xi,m;\mu,P,\alpha,\beta,\Gamma,\kappa) = \int_{\mathbb{R}^n} e^{i\xi^T x} \mathcal{N}(x;\mu,P)$$

$$\left[\int_{-\pi}^{\pi} e^{im\theta} \mathcal{VM}(\theta;\Theta(x),\kappa) d\theta\right] dx$$

$$= \int_{\mathbb{R}^n} e^{i\xi^T x} \mathcal{N}(x;\mu,P) \frac{I_{|m|}(\kappa)}{I_0(\kappa)} e^{im\Theta(x)} dx.$$

This integral can be expressed in the form $$\varphi_{\mathcal{GVM}}(\xi,m;\mu,P,\alpha,\beta,\Gamma,\kappa) = \frac{1}{\sqrt{\det(2\pi P)}} \frac{I_{|m|}(\kappa)}{I_0(\kappa)} \int_{\mathbb{R}^n} e^{g(x)} dx,$$

where $$g(x) = -\frac{1}{2}(x-\mu)^T P^{-1}(x-\mu) + im\Theta(x) + i\xi^T x$$

$$\equiv g(x_*) - \frac{1}{2}(x-x_*)^T A^{-T}(I-im\Gamma)A^{-1}(x-x_*),$$

$$x_* = \mu + iA(I-im\Gamma)^{-1}(A^T\xi + m\beta), \, g(x_*)$$

$$= i(\mu^T\xi + m\alpha) - \frac{1}{2}(A^T\xi + m\beta)^T(I-im\Gamma)^{-1}(A^T\xi + m\beta).$$

This decomposition of g(x) can follow by "completing the square." The result (16) follows from known integration formulas for integrands containing an exponential of a quadratic form and elementary properties of the determinant.

III.C. Low-Order Moments

If $(x,\theta) \sim \text{GVM}(\mu,P,\alpha,\beta,\Gamma,\kappa)$, then $$E[x] = \mu,$$

$$E[(x-\mu)(x-\mu)^T] = P,$$

$$E[e^{i\theta}] = \frac{1}{\sqrt{\det(I-i\Gamma)}} \frac{I_1(\kappa)}{I_0(\kappa)} \exp\left[i\alpha - \frac{1}{2}\beta^T(I-i\Gamma)^{-1}\beta\right],$$

$$E[e^{i\theta}z] = i(I-i\Gamma)^{-1}\beta E[e^{i\theta}],$$

$$E[e^{i\theta}zz^T] = \left[(I-i\Gamma)^{-1} - (I-i\Gamma)^{-1}\beta\beta^T(I-i\Gamma)^{-1}\right] E[e^{i\theta}],$$

where $z = A^{-1}(x-\mu)$ and $P = AA^T$. These results follow from the characteristic function (16).

III.D. Differential Entropy

If $(x,\theta) \sim \text{GVM}(\mu,P,\alpha,\beta,\Gamma,\kappa)$, then its differential entropy can be $$H(x,\theta) = E[-\ln \mathcal{GVM}(x,\theta;\mu,P,\alpha,\beta,\Gamma,\kappa)] \tag{17}$$

$$= \frac{1}{2}\ln\det(2\pi e P) + \ln(2\pi I_0(\kappa)) - \kappa \frac{I_1(\kappa)}{I_0(\kappa)}.$$

III.E. Invariance Property

If $(x,\theta) \sim \text{GVM}(\mu,P,\alpha,\beta,\Gamma,\kappa)$ defined on $\mathbb{R}^n \times \mathbb{S}$ and $$\tilde{x} = Lx+d, \, \tilde{\theta} = \theta + a + b^T x + \tfrac{1}{2} x^T C x, \tag{18}$$

where L is an m×n matrix (with m≤n), $d \in \mathbb{R}^m$, $a \in \mathbb{R}$, $b \in \mathbb{R}^n$, and C is a symmetric n×n matrix, then $$(\tilde{x},\tilde{\theta}) \sim \text{GVM}(\tilde{\mu},\tilde{P},\tilde{\alpha},\tilde{\beta},\tilde{\Gamma},\tilde{\kappa})$$

defined on $\mathbb{R}^m \times \mathbb{S}$, where $$\tilde{\mu} = L\mu + d,$$

$$\tilde{P} = LPL^T,$$

$$\tilde{\alpha} = \alpha + a + b^T\mu + \tfrac{1}{2}\mu^T C\mu,$$

$$\tilde{\beta} = Q^T[\beta + A^T(C\mu+b)],$$

$$\tilde{\Gamma} = Q^T(\Gamma + A^T CA)Q,$$

$$\tilde{\kappa} = \kappa. \tag{19}$$

In these equations, Q can be an n×m matrix with mutually orthonormal columns and R can be an m×m positive-definite upper-triangular matrix such that $QR=(LA)^T$. (The Q and R matrices can be computed by performing a "thin" QR factorization of $(LA)^T$.) Additionally, the lower-triangular Cholesky factor $\tilde{A}$ such that $\tilde{P}=\tilde{A}\tilde{A}^T$ is $\tilde{A}=R^T$.

This result, which states that a GVM distribution remains a GVM distribution under transformations of the form (18), follows upon computing the characteristic function of the transformed random variables $(\tilde{x}, \tilde{\theta})$ (in analogy to the derivation in Subsection III.B) and then identifying it with the characteristic function (16) possessing the parameters defined in Equations (19).

III.F. Transformation to Canonical Form

The transformation $$z=A^{-1}(x-\mu), \phi=\theta-\alpha-\beta^T z - \tfrac{1}{2} z^T \Gamma z, \quad (20)$$

reduces $(x, \theta) \sim GVM(\mu, P, \alpha, \beta, \Gamma, \kappa)$ to the canonical or standardized GVM distribution with PDF $$p(z,\phi)\, \mathcal{VM}\,(z,\phi;0,I,0,0,0,\kappa) = \mathcal{N}(z;0,I)\, \mathcal{VM}(\theta;0,\kappa).$$

This result follows by noting that the transformation (20) is a special case of (18).

III.G. Marginalization

If $(x, \theta) \sim GVM(\mu, P, \alpha, \beta, \Gamma, \kappa)$, then the marginal distribution of x is the Gaussian PDF $\mathcal{N}(x; \mu, P)$. This result follows immediately from the definition of the GVM distribution:

$$p(x) = \int_{-\pi}^{\pi} \mathcal{GVM}(x, \theta; \mu, P, \alpha, \beta, \Gamma, \kappa)\,d\theta$$

$$= \mathcal{N}(x;\mu,P) \int_{-\pi}^{\pi} \mathcal{VM}(\theta;\Theta(x),\kappa)\,d\theta$$

$$= \mathcal{N}(x;\mu,P).$$

The marginal distribution of $(\tilde{x}, \theta)$, where $\tilde{x}=(x_{i_1},\ldots,x_{i_m})^T$ and $1 \le m < n = \dim(x)$, is $$p(\tilde{x},\theta) = \mathcal{VM}(\tilde{x},\theta;\tilde{\mu},\tilde{P},\tilde{\alpha},\tilde{\beta},\tilde{\Gamma},\tilde{\kappa}),$$

where the transformed parameter set is specified by Equations (19) with a=0, b=0, C=0, d=0, and $$L = \begin{bmatrix} e_{i_1}^T \\ \vdots \\ e_{i_m}^T \end{bmatrix}.$$

In this construction of the matrix L, $e_j$ is the n×1 vector where the j-th component is unity and all other components are zero.

III.H. Conversion Between Gauss Von Mises and Gaussian Distributions

As $\kappa \to \infty$ and $\|\Gamma\| \to 0$, a GVM distribution in $(x, \theta)$ becomes a Gaussian distribution in $\chi = (x, \theta)$. Under these conditions, $$\mathcal{GVM}(x,\theta;\mu,P,\alpha,\beta,\Gamma,\kappa) \approx \mathcal{N}(\chi;m,\mathcal{P}), \quad (21)$$

where $$m = \begin{bmatrix} \mu \\ \alpha \end{bmatrix}, \quad (22)$$

$$\mathcal{P} = \mathcal{A}\mathcal{A}^T,$$

$$\mathcal{A} = \begin{bmatrix} A & 0 \\ \beta^T & 1/\sqrt{\kappa} \end{bmatrix}.$$

The approximation (21) is justified by first noting that, for fixed x, the von Mises distribution $\mathcal{VM}(\theta;\Theta(x),\kappa)$ becomes concentrated at the point $\theta=\Theta(x)$ as $\kappa \to \infty$. Thus, for large $\kappa$, $$\mathcal{VM}(\theta;\Theta(x),\kappa) = \frac{1}{2\pi e^{-\kappa} I_0(\kappa)} \exp\left[-2\kappa \sin^2 \tfrac{1}{2}(\theta-\Theta(x))\right] \approx \quad (23)$$

$$\sqrt{\frac{\kappa}{2\pi}} \exp\left[-\tfrac{1}{2}\kappa(\theta-\Theta(x))^2\right] = \mathcal{N}(\theta;\Theta(x),1/\kappa),$$

noting that $I_0(\kappa) \sim e^{\kappa}/\sqrt{2\pi\kappa}$ as $\kappa \to \infty$ and $\sin^2 \tfrac{1}{2}\phi \sim \tfrac{1}{4}\phi^2$ as $\phi \to 0$;

hence $\mathcal{GVM}(x,\theta;\mu,P,\alpha,\beta,\Gamma,\kappa) \approx \mathcal{N}(x;\mu,P)\mathcal{N}(\theta;\Theta(x),1/\kappa).$ As $\|\Gamma\| \to 0$, $\Theta(x)$ tends to a linear function in x thereby reducing the right-hand side of (23) to a Gaussian in x and $\theta$.

The expressions for the mean m and covariance $\mathcal{P}$ in (22) of the approximating Gaussian in $\chi=(x, \theta)$ are derived as follows. First, define $$q_{GVM}(x,\theta) = -\ln \mathcal{GVM}(x,\theta;\mu,P,\alpha,\beta,\Gamma,\kappa),$$

$$q_{\mathcal{N}}(\chi) = -\ln \mathcal{N}(\chi;m,\mathcal{P}).$$

The approximating Gaussian in (21) is the "osculating Gaussian" defined as the Gaussian which is tangent to the GVM distribution at the mode. Specifically, the mean m is the mode of the GVM distribution, as specified in (22), and the covariance $\mathcal{P}$ is obtained by demanding equality between the second-order partial derivatives of $q_{\mathcal{M}}$ and $q_{\mathcal{N}}$ evaluated at the mode. Indeed, $$\left.\frac{\partial^2 q_{\mathcal{N}}}{\partial \chi \partial \chi^T}\right|_{\chi=m} = \mathcal{P}^{-1}, \quad (24)$$

$$\left.\frac{\partial^2 q_{GVM}}{\partial x \partial x^T}\right|_{(x,\theta)=(\mu,\alpha)} = A^{-T}(I+\kappa\beta\beta^T)A^{-1},$$

$$\left.\frac{\partial^2 q_{GVM}}{\partial \theta \partial x}\right|_{(x,\theta)=(\mu,\alpha)} = -\kappa A^{-T}\beta,$$

$$\left.\frac{\partial^2 q_{GVM}}{\partial \theta^2}\right|_{(x,\theta)=(\mu,\alpha)} = \kappa;$$

$$\mathcal{P}^{-1} = \begin{bmatrix} A^{-T}(I+\kappa\beta\beta^T)A^{-1} & -\kappa A^{-T}\beta \\ -\kappa\beta^T A^{-1} & \kappa \end{bmatrix}.$$

Inverting (24) using the block matrix inversion lemma yields $$\mathcal{P} = \begin{bmatrix} AA^T & A\beta \\ \beta^T A^T & \beta^T \beta + 1/\kappa \end{bmatrix}. \quad (25)$$

Finally, computing the lower-triangular Cholesky factor $\mathcal{A}$ of the covariance (25) results in the expression in (22). It is noted that the expressions in (22) can also be recovered from (23) by setting $\Gamma=0$ and combining the two Gaussian PDFs into a single Gaussian PDF in $\chi$ by way of a "completing the square" operation.

In summary, Equations (21) and (22) indicate how one can convert to and from a GVM distribution and a Gaussian. The approximation of a Gaussian distribution in $\chi=(x, \theta)$ by a GVM distribution with $\Gamma=0$ becomes exact in the limit as the standard deviation in $\theta$ tends to zero. The approximation of a GVM distribution by a Gaussian becomes exact as $\kappa \to \infty$ and $\|\Gamma\| \to 0$. In any case, the equations provide an approximation of a GVM distribution by the osculating or tangent Gaussian distribution at the modal point.

III.I Mahalanobis von Mises Statistic

Given $(x, \theta) \sim GVM(\mu, P, \alpha, \beta, \Gamma, \kappa)$, the Mahalanobis von Mises statistic is defined by $$M(x,\theta;\mu,P,\alpha,\beta,\Gamma,\kappa) \equiv (x-\mu)^T P^{-1}(x-\mu) + 4\kappa \sin^2 \tfrac{1}{2}(\theta - \Theta(x)), \quad (26)$$

where $\Theta(x) = \alpha + \beta^T z + \tfrac{1}{2} z^T \Gamma z$, $z = A^{-1}(x-\mu)$, and $P = AA^T$. For large $\kappa$, $M \sim \chi^2(n+1)$, where $\chi^2(v)$ is the chi-square distribution with $v$ degrees of freedom and '~' means "approximately distributed." The statistic (26) is analogous to the Mahalanobis distance for a multivariate Gaussian random vector $x \sim N(\mu, P)$. Indeed, the first term in (26) is precisely this Mahalanobis distance. Like the classical Mahalanobis distance, the Mahalanobis von Mises statistic provides a mechanism for testing if some realization $(x_*, \theta_*)$ from a GVM distribution is statistically significant. Additional details on the interpretation of the Mahalanobis von Mises statistic are provided following the derivation below.

The derivation of the distribution of M given that $(x, \theta)$ are jointly distributed as a GVM distribution is as follows. Applying the transformation (20) to canonical form yields $$M = z^T z + 4\kappa \sin^2 \tfrac{1}{2} \phi,$$

where now $z \sim N(0, I)$ and $\phi \sim VM(0, \kappa)$ with $z$ and $\phi$ independent. Therefore, $$M = \chi^2(n) + Y_\kappa,$$

where $Y_\kappa \equiv 4\kappa \sin^2 \tfrac{1}{2}\phi$ and is independent of the $\chi^2(n)$ random variable. It follows from elementary probability theory that the PDF of $Y_\kappa$ is $$p_{Y_\kappa}(y) = \begin{cases} \dfrac{e^{-y/2}}{\pi e^{-\kappa} I_0(\kappa) \sqrt{y(4\kappa - y)}}, & 0 < y < 4\kappa, \\ 0, & \text{otherwise.} \end{cases} \quad (27)$$

Noting that $I_0(\kappa) \sim e^\kappa / \sqrt{2\pi\kappa}$ and $\sqrt{y(4\kappa - y)} \sim 2\sqrt{\kappa y}$ as $\kappa \to \infty$, it follows that $p_{Y_\kappa}(y) \sim \dfrac{e^{-y/2}}{\sqrt{2\pi y}} = p_{\chi^2(1)}(y)$.

In other words, the PDF of $Y_\kappa$ converges (pointwise) to the PDF of a chi-square random variable with one degree of freedom as $\kappa \to \infty$. It can also be shown that the cumulative distribution function (CDF) of $Y_\kappa$ converges uniformly to the CDF of $\chi^2(1)$ as $\kappa \to \infty$. Therefore, for large $\kappa$, $Y_\kappa \sim \chi^2(1)$ and hence $M \sim \chi^2(n+1)$.

In principle, one can derive the exact PDF of M using the standard change of variables theorem in conjunction with the PDFs of the chi-square distribution and (27), though an analytic expression for the resulting convolution is intractable. In practice and in the context of the present invention, $\kappa$ is sufficiently large so that the approximation of $Y_\kappa$ by a $\chi^2(1)$ random variable (and hence M by $\chi^2(n+1)$) is justified.

III.I.i. Interpretation

Figure 8B:
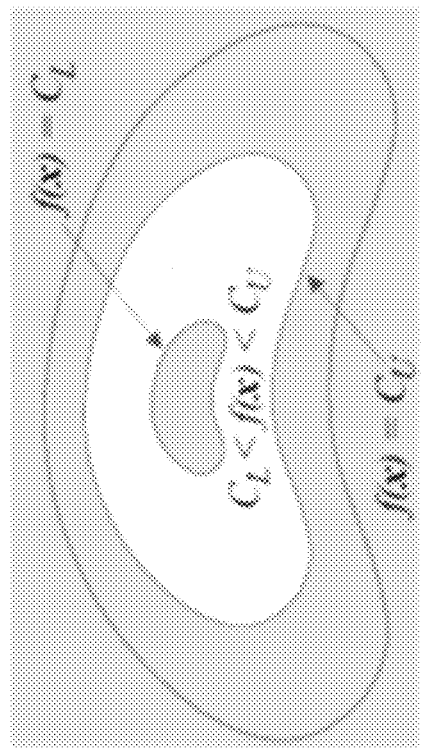
FIGS. 8a and 8b are graphs illustrating the setup for testing if a point is a statistically significant realization of a Gauss von Mises distribution with the shaded regions depicting those regions in which the null hypothesis is rejected according to one embodiment of the present invention.
Figure 8A:
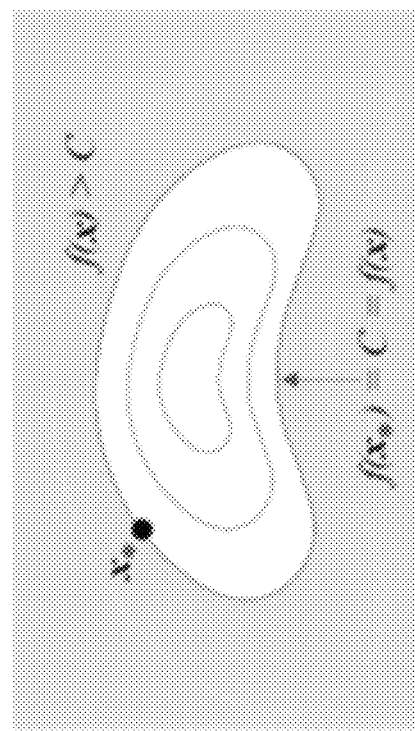

The interpretation of the Mahalanobis von Mises statistic (26) can be understood by first considering the more general setting of a multivariate random vector $x$ with support on a differentiable manifold $\mathcal{M}$ and a PDF of the form $p(x) = e^{-f(x)/2}$. Suppose a point $x_* \in \mathcal{M}$ is given and one wishes to test the null hypothesis $H_0$ that $x_*$ is not a statistically significant realization of the random vector $x$ (i.e., $x_*$ is a representative draw from $x$). The p-value for a one-sided test is $$p_{Y_\kappa}(y) = p = Pr[f(x) \in \Omega_*] = \int_{\Omega_*} e^{-f(x)/2} dx, \quad (28)$$

where $\Omega_* = \{x | f(x) > f(x_*) \equiv C\}$. Smaller p-values imply that the realization $x_*$ lies farther out on the tails of the PDF (see FIG. 8a). The null hypothesis $H_0$ is rejected at the significance level $\alpha$ (typically 0.05 or 0.01) if $p < \alpha$. FIG. 8b shows the setup for the analogous two-sided hypothesis test. For a given significance level $\alpha$, one determines the contours $C_L$ and $C_U$ such that $$\int_{\Omega_L} e^{-f(x)/2} dx = \int_{\Omega_U} e^{-f(x)/2} dx = \tfrac{1}{2}\alpha,$$

where $\Omega_L = \{x | f(x) < C_L\}$ and $\Omega_U = \{x | f(x) > C_U\}$. (Note that the shaded region in FIG. 8b has probability $\alpha$.) A two-sided test with significance level $\alpha$ rejects the null hypothesis $H_0$ if $f(x_*) < C_L$ or $f(x_*) > C_U$.

Specializing the one-sided statistical significance test to the Gauss von Mises distribution, suppose $(x, \theta) \sim GVM(\mu, P, \alpha, \beta, \Gamma, \kappa)$ and a realization $(x_*, \theta_*) \in \mathbb{R}^n \times \mathbb{S}$ is given. For this case, $$\begin{aligned} f(x, \theta) &= -2\ln \mathcal{GVM}(x, \theta; \mu, P, \alpha, \beta, \Gamma, \kappa) \\ &= M(x, \theta; \mu, P, \alpha, \beta, \Gamma, \kappa) + \ln det(2\pi P) + 2\ln(2\pi e^{-\kappa} I_0(\kappa)), \end{aligned}$$

where M is the Mahalanobis von Mises statistic ((26)). The integration region $\Omega_*$ in (28) is $$\begin{aligned} \Omega_* &= \{(x, \theta) \in \mathbb{R}^n \times \mathbb{S} \mid f(x, \theta) > f(x_*, \theta_*)\} \\ &= \{(x, \theta) \in \mathbb{R}^n \times \mathbb{S} \mid M(x, \theta; \mu, P, \alpha, \beta, \Gamma, \kappa) > M(x_*, \theta_*; \mu, P, \alpha, \beta, \Gamma, \kappa)\}. \end{aligned}$$

Substituting this information into (28) yields $$\begin{aligned} p &= Pr[f(x, \theta) \in \Omega_*] \\ &= Pr[M(x, \theta; \mu, P, \alpha, \beta, \Gamma, \kappa) > M(x_*, \theta_*; \mu, P, \alpha, \beta, \Gamma, \kappa)] \\ &= Pr[\chi^2(n) + Y_\kappa > M(x_*, \theta_*; \mu, P, \alpha, \beta, \Gamma, \kappa)] \\ &\approx Pr[\chi^2(n+1) > M(x_*, \theta_*; \mu, P, \alpha, \beta, \Gamma, \kappa)]. \end{aligned}$$

The justification of the approximation in the last line is given in the discussion proceeding Equation (27). Thus, the resulting p-value can be computed by evaluating the complementary cumulative distribution function (i.e., tail distribution) of $\chi^2(n+1)$ at the Mahalanobis von Mises statistic (26) evaluated at the realization $(x_*, \theta_*)$.

III.J. Asymptotic Expansions

In order to avoid numerical overflow issues, large $\kappa$ asymptotic expansions can be used for some expressions containing exponentials and modified Bessel functions in $\kappa$. In what follows, expansions are accurate to 16 significant digits for $\kappa \geq 500$.

For the normalization constant appearing in the definition of the von Mises PDF in (8), $$\ln(2\pi e^{-\kappa} I_0(\kappa)) \approx \tfrac{1}{2} \ln\left(\dfrac{2\pi}{\kappa}\right) + \dfrac{1}{8\kappa}\left(1 + \dfrac{1}{2\kappa} + \dfrac{25}{48\kappa^2} + \dfrac{13}{16\kappa^3} + \dfrac{1073}{640\kappa^4}\right). \quad (29)$$

For the κ-dependent terms in the expression of the differential entropy in (17), $$\ln(2\pi I_0(\kappa)) - \kappa \frac{I_1(\kappa)}{I_0(\kappa)} \approx \quad (30)$$

$$\frac{1}{2}\ln\left(\frac{2\pi e}{\kappa}\right) + \frac{1}{4\kappa}\left(1 + \frac{3}{4\kappa} + \frac{25}{24\kappa^2} + \frac{65}{32\kappa^3} + \frac{3219}{640\kappa^4}\right).$$

For the weights and nodes used in the Gauss von Mises quadrature formulas (derived in Section IV), $$\frac{B_1(\kappa)^2}{4B_1(\kappa) - B_2(\kappa)} \approx \frac{1}{6} - \frac{1}{48\kappa^2}\left(1 + \frac{3}{\kappa} + \frac{151}{16\kappa^2} + \frac{267}{8\kappa^3} + \frac{16967}{128\kappa^4}\right), \quad (31)$$

$$\arccos\left(\frac{B_2(\kappa)}{2B_1(\kappa)} - 1\right) \approx \sqrt{\frac{3}{\kappa}}\left(\begin{array}{c} 1 + \frac{1}{4\kappa} + \frac{43}{160\kappa^2} + \frac{443}{896\kappa^3} + \\ \frac{2523}{2048\kappa^4} + \frac{340453}{90112\kappa^5} + \frac{11584095}{851968\kappa^6} \end{array}\right), \quad (32)$$

IV. Gauss von Mises Quadrature

The Julier-Uhlmann unscented transform or the more general framework of Gauss-Hermite quadrature enables one to compute the expected value of a non-linear transformation of a multivariate Gaussian random vector. In this section, these methodologies are extended to enable the computation of the expected value a non-linear transformation of a Gauss von Mises (GVM) random vector, thereby providing a general framework for Gauss von Mises quadrature. The quadrature formulas are subsequently used in the prediction step of the GVM filter developed in the next section. The GVM quadrature framework is also useful for extracting supplemental statistics from a GVM distribution. For example, if a space object's orbital state is represented as a GVM distribution in equinoctial orbital element space, one can compute the expected value of the object's Cartesian position and velocity or the covariance in its position and velocity.

Given $(x, \theta) \sim \text{GVM}(\mu, P, \alpha, \beta, \Gamma, \kappa)$ and a function $f: \mathbb{R}^n \times \mathbb{S} \to \mathbb{R}$, an approximation is sought for $$E[f(x,\theta)] = \int_{\mathbb{R}^n} \int_{-\pi}^{\pi} \mathcal{M}(x,\theta;\mu,P,\alpha,\beta,\Gamma,\kappa) f(x,\theta) d\theta dx. \quad (33)$$

As in classical Gaussian quadrature, the framework of Gauss von Mises quadrature approximates (33) as a weighted sum of function values at specified points:

$$\int_{\mathbb{R}^n} \int_{-\pi}^{\pi} \mathcal{GVM}(x,\theta;\mu,P,\alpha,\beta,\Gamma,\kappa) f(x,\theta) d\theta dx \approx \quad (34)$$

$$\sum_{i=1}^{N} w_{\sigma_i} f(x_{\sigma_i}, \theta_{\sigma_i}).$$

The set of quadrature nodes, sometimes called sigma points, $\{(x_{\sigma_i}, \theta_{\sigma_i})\}_{i=1}^{N}$ and corresponding quadrature weights $\{w_{\sigma_i}\}_{i=1}^{N}$ can be chosen so that (34) is exact for a certain class of functions. In the derivation of the GVM quadrature weights and nodes, the Smolyak sparse grid paradigm can be used so that, for a specified order of accuracy, the number of nodes increases polynomially with the dimension n thereby avoiding the so-called "curse of dimensionality." In particular, the number of quadrature nodes (and hence function evaluations) increases linearly in the dimension n for the third-order rule derived in Subsection IV.A and increases quadratically in n for the fifth-order rule derived in Subsection IV.B. Higher-order GVM quadrature rules are discussed in Subsection IV.C.

IV.A. Third-Order Method

Without loss of generality, the method can be restricted to quadrature using the canonical GVM distribution as the weighting function:

$$\int_{\mathbb{R}^n} \int_{-\pi}^{\pi} \mathcal{N}(z;0,I) \mathcal{VM}(\phi;0,\kappa) f(z,\phi) d\phi dz \approx \sum_{i=1}^{N} w_{\sigma_i} f(z_{\sigma_i}, \phi_{\sigma_i}). \quad (35)$$

Indeed, if considering the general quadrature problem in Equation (34), the nodes $(x_{\sigma_i}, \theta_{\sigma_i})$ can be recovered from the nodes $(z_{\sigma_i}, \phi_{\sigma_i})$ of the canonical problem (35) through the transformation (20):

$$x_{\sigma_i} = A z_{\sigma_i}, \quad \theta_{\sigma_i} = \phi_{\sigma_i} + \alpha + \beta^T z_{\sigma_i} + \tfrac{1}{2} z_{\sigma_i}^T \Gamma z_{\sigma_i}$$

In what follows, the following notation is used. Let $\xi \in \mathbb{R}$, $\eta \in (-\pi, \pi]$, and $$\mathcal{P} = \{(i,j) \in \mathbb{P}^2 \mid 1 \leq i < j \leq n\},$$

$$\mathcal{N}^{00} = \{(z,\phi) \in \mathbb{S}^n \times \mathbb{R} \mid z=0, \phi=0\},$$

$$\mathcal{N}^{\eta 0} = \{(z,\phi) \in \mathbb{R}^n \times \mathbb{S} \mid z=0, |\phi|=\eta\},$$

$$\mathcal{N}_i^{\xi 0} = \{(z,\phi) \in \mathbb{R}^n \times \mathbb{S} \mid z_1 = \ldots = z_{i-1} = z_{i+1} = \ldots = z_n = 0, |z_i|=\xi, \phi=0\},$$

$$\mathcal{N}_i^{\xi 0} = \{(z,\phi) \in \mathbb{R}^n \times \mathbb{S} \mid z_1 = \ldots = z_{i-1} = z_{i+1} = \ldots = z_n = 0, |z_i|=\xi, |\phi|=\eta\},$$

$$\mathcal{N}_{ij}^{\xi\xi} = \{(z,\phi) \in \mathbb{R}^n \times \mathbb{S} \mid z_1 = \ldots = z_{i-1} = z_{i+1} = \ldots = z_{j-1} = z_{j+1} = \ldots = z_n = 0,$$

$$|z_i|=|z_j|=\xi, \phi=0\},$$

For the third-order method, it is demanded that the approximation (35) be exact for all functions of the form $$f(z,\phi) = (a_0 + \tfrac{1}{2} z^T B_0 z) + a_1 \cos\phi + a_2 \cos 2\phi + g_o(z,\theta), \quad (36)$$

where $a_0, a_1, a_2 \in \mathbb{R}$, $B_0$ is any symmetric n×n matrix, and $g_o$ is any function such that $g_o(z,\phi) = -g_o(-z,\theta)$ or $g_o(z,\theta) = -g(z,-\phi)$. It is claimed that this objective can be achieved with the quadrature node set $$\mathcal{N} = \mathcal{N}^{00} \cup \mathcal{N}^{\eta 0} \cup \bigcup_{i=1}^{n} \mathcal{N}_i^{\xi 0}, \quad (37)$$

for some choice of parameters $\xi$ and $\eta$, and a quadrature rule of the form $$\int_{\mathbb{R}^n} \int_{-\pi}^{\pi} \mathcal{N}(z;0,I) \mathcal{VM}(\phi;0,\kappa) f(z,\phi) d\phi dz \approx \quad (38)$$

$$w_{00} \sum_{(z,\phi) \in \mathcal{N}^{00}} f(z,\phi) + w_{\eta 0} \sum_{(z,\phi) \in \mathcal{N}^{\eta 0}} f(z,\phi) + w_{\xi 0} \sum_{i=1}^{n} \sum_{(z,\phi) \in \mathcal{N}_i^{\xi 0}} f(z,\phi).$$

Indeed, to make (38) exact for functions of the form (36), it suffices to impose the condition that (38) be exact for the basis functions listed in Table 1.

TABLE 1

| f (z, φ) | Constraint |
| --- | --- |
| 1 | $w_{00} + 2w_{\eta 0} + 2nw_{\xi 0} = 1$ |
| cos φ | $w_{00} + 2\cos\eta \, w_{\eta 0} + 2nw_{\xi 0} = I_1(K)/I_0(K)$ |

TABLE 1-continued

| f (z, φ) | Constraint |
|---|---|
| cos 2φ | $w_{00} + 2\cos 2\eta\, w_{\eta 0} + 2nw_{\xi 0} = I_2(K)/I_0(K)$ |
| $z_i^2, i \in \{1, \ldots, n\}$ | $2\xi^2 w_{\xi 0} = 1$ |
| $z_i^4, i \in \{1, \ldots, n\}$ | $2\xi^4 w_{\xi 0} = 3$ |

The corresponding constraints on the quadrature weights and the parameters ξ and η appearing in the quadrature nodes are also listed in the table. It is noted that these constraints follow from the assumed quadrature rule (38) in conjunction with the characteristic function (16) or the low-order moments listed in Section III.C. Solving the five constraint equations in Table 1 for $w_{00}$, $w_{\eta 0}$, $w_{\xi 0}$, ξ, and η yields $$\xi = \sqrt{3}, \tag{39}$$

$$\eta = \arccos\left(\frac{B_2(\kappa)}{2B_1(\kappa)} - 1\right),$$

$$w_{\xi 0} = \frac{1}{6},$$

$$w_{\eta 0} = \frac{B_1(\kappa)^2}{4B_1(\kappa) - B_2(\kappa)},$$

$$w_{00} = 1 - 2w_{\eta 0} - 2nw_{\xi 0},$$

where $B_p(\kappa) \equiv 1 - I_p(\kappa)/I_0(\kappa)$. For large κ, the asymptotic expansions in (31) and (32) should be applied to compute the quantities containing the modified Bessel functions.

In summary, the third-order GVM quadrature rule is (38) with the nodes and weights specified in (37) and (39).

It is noted that the number of quadrature nodes in the set (37) is $$|\mathcal{N}| = 2n + 3.$$

Thus, the number of nodes increases linearly with the dimension n. Further, this is precisely the same number of nodes (sigma points) used in the unscented transform (which is a third-order Gauss-Hermite quadrature method) in a Cartesian space of dimension n+1.

IV.B. Fifth-Order Method

The derivation of the fifth-order GVM quadrature rule is similar to that of the third-order rule. It is demanded that the approximation (20) be exact for all functions of the form $$f(z,\phi) = (a_0 + \tfrac{1}{2}b_0^{ij} z_i z_j + \tfrac{1}{24}c_0^{ijkl} z_i z_j z_k z_l) + (a_1 + \tfrac{1}{2}b_1^{ij} z_i z_j) \\ \cos\phi + a_2 \cos 2\phi + g_o(z,\phi), \tag{40}$$

where the coefficients are arbitrary and $g_o$ is any function such that $g_o(z, \phi) = -g_o(-z, \theta)$ or $g_o(z, \phi) = -g(z, -\phi)$. (The summation convention is implied between repeated upper and lower indices.) It is claimed that this objective can be achieved with the quadrature node set $$\mathcal{N} = \mathcal{N}^{00} \cup \mathcal{N}^{\eta 0} \cup \bigcup_{i=1}^{n} \mathcal{N}_i^{\xi 0} \cup \bigcup_{i=1}^{n} \mathcal{N}_i^{\xi \eta} \cup \bigcup_{(i,j) \in \mathcal{P}} \mathcal{N}_{ij}^{\xi\xi}, \tag{41}$$

for some choice of parameters ξ and η, and a quadrature rule of the form $$\int_{\mathbb{R}^n} \int_{-\pi}^{\pi} \mathcal{N}(z; 0, I) V\mathcal{M}(\phi; 0, \kappa) f(z, \phi) d\phi\, dz \approx \tag{42}$$

-continued $$w_{00} \sum_{(z,\phi) \in \mathcal{N}^{00}} f(z, \phi) +$$

$$w_{\eta 0} \sum_{(z,\phi) \in \mathcal{N}^{\eta 0}} f(z, \phi) + w_{\xi 0} \sum_{i=1}^{n} \sum_{(z,\phi) \in \mathcal{N}_i^{\xi 0}} f(z, \phi) +$$

$$w_{\xi\eta} \sum_{i=1}^{n} \sum_{(z,\phi) \in \mathcal{N}_i^{\xi\eta}} f(z, \phi) + w_{\xi\xi} \sum_{(i,j) \in \mathcal{P}} \sum_{(z,\phi) \in \mathcal{N}_{ij}^{\xi\xi}} f(z, \phi).$$

Indeed, to make (42) exact for functions of the form (40), it suffices to impose the condition that (42) be exact for the basis functions listed in Table 2.

TABLE 2

| f (z, φ) | Constraint |
|---|---|
| 1 | $w_{00} + 2w_{\eta 0} + 2nw_{\xi 0} + 4nw_{\xi\eta} + 4\binom{n}{2} w_{\xi\xi} = 1$ |
| cos φ | $w_{00} + 2\cos\eta\, w_{\eta 0} + 2nw_{\xi 0} + 4n\cos\eta\, w_{\xi\eta} + 4\binom{n}{2} w_{\xi\xi} = I_1(\kappa)/I_0(\kappa)$ |
| cos 2φ | $w_{00} + 2\cos 2\eta\, w_{\eta 0} + 2nw_{\xi 0} + 4n\cos 2\eta\, w_{\xi\eta} + 4\binom{n}{2} w_{\xi\xi} = I_2(\kappa)/I_0(\kappa)$ |
| $z_i^2, i \in \{1, \ldots, n\}$ | $2\xi^2 w_{\xi 0} + 4\xi^2 w_{\xi\eta} + 4(n-1)\xi^2 w_{\xi\xi} = 1$ |
| $z_i^4, i \in \{1, \ldots, n\}$ | $2\xi^4 w_{\xi 0} + 4\xi^4 w_{\xi\eta} + 4(n-1)\xi^4 w_{\xi\xi} = 3$ |
| $z_i^2 z_j^2, (i, j) \in P$ | $4\xi^4 w_{\xi\xi} = 1$ |
| $z_i^2 \cos\phi, i \in \{1, \ldots, n\}$ | $2\xi^2 w_{\xi 0} + 4\xi^2 \cos\eta\, w_{\xi\eta} + 4(n-1)\xi^2 w_{\xi\xi} = I_1(\kappa)/I_0(\kappa)$ |

The corresponding constraints on the quadrature weights and the parameters ξ and η appearing in the quadrature nodes are also listed in the table. Solving the seven constraint equations in Table 2 for $w_{00}$, $w_{\eta 0}$, $w_{\xi 0}$, $w_{\xi\eta}$, $w_{\xi\xi}$, ..., and η yields $$\xi = \sqrt{3}, \tag{43}$$

$$\eta = \arccos\left(\frac{B_2(\kappa)}{2B_1(\kappa)} - 1\right),$$

$$w_{\xi\xi} = \frac{1}{36},$$

$$w_{\xi\eta} = \frac{1}{6} \cdot \frac{B_1(\kappa)^2}{4B_1(\kappa) - B_2(\kappa)},$$

$$w_{\xi 0} = \frac{2}{9} - \frac{n}{18} - \frac{1}{3} \cdot \frac{B_1(\kappa)^2}{4B_1(\kappa) - B_2(\kappa)},$$

$$w_{\eta 0} = \left(1 - \frac{n}{3}\right) \cdot \frac{B_1(\kappa)^2}{4B_1(\kappa) - B_2(\kappa)},$$

$$w_{00} = 1 - 2w_{\eta 0} - 2nw_{\xi 0} - 4nw_{\xi\eta} - 2n(n-1)w_{\xi\xi},$$

where $$B_p(\kappa) \equiv 1 - I_p(\kappa)/I_0(\kappa).$$

In summary, the fifth-order GVM quadrature rule is (42) with the nodes and weights specified in (41) and (43).

It is noted that the number of quadrature nodes in the set (41) is $$|\mathcal{N}| = 1 + 2 + 2n + 4n + 4\binom{n}{2} = 2(n+1)^2 + 1.$$

Thus, the number of nodes increases quadratically with the dimension n. Further, this is precisely the same number of nodes obtained using the sparse grid fifth-order Gauss-Hermite quadrature method of Genz and Keister in a Cartesian space of dimension n+1.

IV.C. Higher-Order Methods

It is briefly noted that that GVM quadrature rules can be generated to arbitrarily high-order using classical Gauss-Hermite quadrature formulas and the discrete Fourier transform. Indeed, $$\mathcal{J} \equiv \int_{\mathbb{R}^n} \int_{-\pi}^{\pi} \mathcal{N}(z;0,I) \mathcal{VM}(\phi;0,\kappa) f(z,\phi) d\phi dz$$

$$= \int_{-\pi}^{\pi} \mathcal{VM}(\phi;0,\kappa) \int_{\mathbb{R}^n} \mathcal{N}(z;0,I) f(z,\phi) dz d\phi$$

$$\approx \sum_{j=1}^{N} w_{\sigma j}^{GH} \int_{-\pi}^{\pi} \mathcal{VM}(\phi;0,\kappa) f(z_{\sigma j}^{GH},\phi) d\phi,$$

where $\{w_{\sigma_j}^{GH}\}_{j=1}^N$ and $\{z_{\sigma_j}^{GH}\}_{j=1}^N$ are the canonical n-dimensional Gauss-Hermite weights and nodes. These quadrature weights and nodes can be generated using, for example, the sparse grid framework of Genz and Keister, to yield an approximation to any desired order of accuracy. For each j= 0, . . . , N, perform a discrete Fourier transform on $f(z_{\sigma_j}^{GH}, \phi)$ and introduce the notation $$f(z_{\sigma j}^{GH}, \phi) \approx \sum_{k=-M}^{M} F_{jk} e^{ik\phi},$$

where $$F_{jk} = \frac{1}{2M+1} \sum_{\ell=-M}^{M} f(z_{\sigma j}^{GH}, \phi_\ell) e^{-ik\phi_\ell}, \phi_\ell = \frac{2\pi\ell}{2M+1}.$$

Therefore, $$\mathcal{J} \approx \sum_{j=1}^{N} w_{\sigma j}^{GH} \sum_{k=-M}^{M} F_{jk} \int_{-\pi}^{\pi} \mathcal{VM}(\phi;0,\kappa) e^{ik\phi} d\phi =$$

$$\sum_{j=1}^{N} w_{\sigma j}^{GH} \sum_{k=-M}^{M} \frac{I_{|k|}(\kappa)}{I_0(\kappa)} F_{jk}.$$

In the context of the present invention which makes use of GVM quadrature, it is observed that there is little benefit in using any quadrature rule beyond the simple third-order method.

V. Uncertainty Propagation

This section presents the method to implement the prediction step of the Bayesian non-linear filter using the Gauss von Mises (GVM) probability density function (PDF) as input. Effectively, the new algorithm provides a means for approximating the non-linear transformation of a GVM distribution as another GVM distribution. The GVM quadrature rules developed in the previous section play a key role in the computation. In analogy to the unscented transform applicable to Gaussian PDFs, quadrature nodes can be deterministically selected from the initial GVM distribution and then acted on by the non-linear transformation. The transformed quadrature nodes can then be used to reconstruct the parameters of the transformed GVM distribution. One application of this methodology can be the propagation of a space object's state uncertainty under non-linear two-body dynamics, which provides improved prediction capabilities of the object's future location and characterization of its orbital uncertainty at future times. It is shown in the EXAMPLE that uncertainty propagation using the new GVM filter prediction step for this application can be achieved by propagating 13 quadrature nodes, the same number used in the standard unscented Kalman filter (UKF). Moreover, the new method is shown to maintain a proper characterization of the orbital state uncertainty for up to eight times as long as the UKF.

The organization of this section is as follows. In Subsection V.A, the preliminary notation is defined followed by discussions on how state propagation under a non-linear system of ordinary differential equations (ODEs) fits into the general framework. In Subsection V.B, the GVM filter prediction step is motivated followed by the complete algorithm description in Subsection V.C. In Subsection V.D, two different online metrics are proposed which allow the operator to validate the characterization of the transformed PDF by a GVM distribution. In Subsection V.E, it is shown how the inclusion of additional uncertain parameters or stochastic process noise can be treated within the same framework. Finally, in Subsection V.F, it is shown how a "mixture version" of the GVM filter prediction step can be formulated, in analogy to the Gaussian sum (mixture) filter to provide proper uncertainty realism in the most challenging scenarios.

V.A. Preliminary Notation

Let $(x, \theta) \sim GVM(\mu, P, \alpha, \beta, \Gamma, \kappa)$, $\Phi: \mathbb{R}^n \times \mathbb{S} \to \mathbb{R}^n \times \mathbb{S}$ be a diffeomorphism (i.e., a bijection on $\mathbb{R}^n \times \mathbb{S}$ with a smooth inverse), and $(\tilde{x}, \tilde{\theta})$ be defined such that $$(\tilde{x}, \tilde{\theta}) = \Phi(x, \theta; p), \quad (44)$$

where p denotes any constant non-stochastic parameters. The inverse of (44) is denoted as $$(x, \theta) = \Psi(\tilde{x}, \tilde{\theta}; \tilde{p}). \quad (45)$$

Thus, given the GVM random vector $(x, \theta)$ and a diffeomorphism $\Phi$, the objective is to approximate the joint PDF of $(\tilde{x}, \tilde{\theta})$ by a GVM distribution and quantify the fidelity of this approximation.

The first-order system of ODEs, $$\chi'(t) = \mathit{f}(\chi(t), t), \quad (46)$$

naturally gives rise to a family of diffeomorphisms. For a given initial condition $\chi(t_0) = \chi_0$, the solution of (46) is denoted as $$\chi(t) = \Phi(\chi_0; t_0, t), \quad (47)$$

which maps the state $\chi_0$ at some initial epoch to the state at a future time. (Existence and uniqueness of solutions is assumed on the interval $[t_0, t]$.) In this context, $\Phi$ is called the solution flow and is of the form (44) where the parameter vector p contains the initial and final times. The inverse solution flow is denoted as $$\chi_0 = \Psi(\chi(t); t_0, t),$$

which maps the state $\chi(t)$ at time t to the state $\chi_0$ at some past time $t_0$. If the initial condition $\chi_0$ is uncertain and described by a PDF, then Equation (47) dictates how this PDF is transformed to a future epoch.

The dynamics governing the two-body problem in orbital mechanics are of the form (46) where $f$ encodes the force components (e.g., gravity, atmospheric drag, etc.) and, typically, the state $\chi$ is six-dimensional Cartesian Earth Centered Inertial (ECI) position-velocity coordinates. (The choice of inertial coordinates can be made so that Newton's laws hold.) As argued in Section I.A, it is advantageous to represent orbital states and uncertainties in equinoctial orbital element (EqOE) coordinates because the solution flow (47) in such coordinates, denoted as $\Phi^{EqOE}$ is approximated more closely as a transformation of the form (18) which maps a GVM distribution to a GVM distribution. Computationally, one can implement the map $\Phi^{EqOE}$ by transforming the ODEs expressed in the natural ECI coordinates to a system of ODEs in EqOE space (see Equation (2)) and thus propagating states directly in EqOE space. In an equivalent approach, one can (i) take the initial condition $\chi_0^{EqOE}$ space and convert it to an initial condition $\chi_0^{ECI}$ in ECI coordinates, (ii) propagate this initial condition using the solution flow $\Phi^{ECI}$ with respect to ECI coordinates to obtain the propagated ECI state $\chi_f^{ECI}$, and (iii) convert $\chi_f^{ECI}$ back to EqOE coordinates to yield the propagated EqOE state $\chi_f^{EqOE}$. Thus, $\Phi^{EqOE}$ is a composition of the three maps described in Steps (i)-(iii). This approach is sometimes preferred when using a commercial orbital propagator utilizing input in ECI coordinates. In summary, the following diagram commutes:

$$\begin{array}{ccc} x_0^{EqOE} & \xrightarrow{\Phi^{EqOE}} & x_f^{EqOE} \\ \downarrow & & \downarrow \\ x_0^{ECI} & \xrightarrow{\Phi^{ECI}_{47}} & x_f^{ECI} \end{array} \qquad (48)$$

In what follows, the following notation is used. Given $(x, \theta) \in \mathbb{R}^n \times \mathbb{S}$ and a diffeomorphism $\Phi: \mathbb{R}^n \times \mathbb{R} \to \mathbb{S}^n \times \mathbb{S}$, the following definitions are used.

$\Phi_x: \mathbb{R}^n \times \mathbb{S} \to \mathbb{R}$ is the projection of $\Phi$ on $\mathbb{R}^n$.

$\Phi_\theta: \mathbb{R}^n \times \mathbb{S} \to \mathbb{S}$ is the projection of $\Phi$ on $\mathbb{S}$.

$\partial_x \Phi_x: \mathbb{R}^n \times \mathbb{S}^n \times \mathbb{R}^{n \times n}$ is the Jacobian of $\Phi_x$ with respect to x:

$$\partial_x \Phi_x(x, \theta) = \begin{bmatrix} \frac{\partial \Phi_1(\xi, \theta)}{\partial \xi_1} & \cdots & \frac{\partial \Phi_1(\xi, \theta)}{\partial \xi_n} \\ \vdots & \ddots & \vdots \\ \frac{\partial \Phi_n(\xi, \theta)}{\partial \xi_1} & \cdots & \frac{\partial \Phi_n(\xi, \theta)}{\partial \xi_n} \end{bmatrix}_{\xi=x}$$

$\partial_x \Phi_\theta: \mathbb{R}^n \times \mathbb{S} \to \mathbb{R}$ is the gradient of $\Phi_\theta$ with respect to x:

$$\partial_x \Phi_\theta(x, \theta) = \begin{bmatrix} \frac{\partial \Phi_\theta(\xi, \theta)}{\partial \xi_1} \\ \vdots \\ \frac{\partial \Phi_\theta(\xi, \theta)}{\partial \xi_n} \end{bmatrix}_{\xi=x}$$

$\partial_x^2 \Phi_\theta: \mathbb{R}^n \times \mathbb{S} \to \mathbb{R}^{n \times n}$ is the Hessian of $\Phi_\theta$ with respect to x:

$$\partial_x^2 \Phi_\theta(x, \theta) = \begin{bmatrix} \frac{\partial^2 \Phi_\theta(\xi, \theta)}{\partial \xi_1 \partial \xi_1} & \cdots & \frac{\partial^2 \Phi_\theta(\xi, \theta)}{\partial \xi_1 \partial \xi_n} \\ \vdots & \ddots & \vdots \\ \frac{\partial^2 \Phi_\theta(\xi, \theta)}{\partial \xi_n \partial \xi_1} & \cdots & \frac{\partial^2 \Phi_\theta(\xi, \theta)}{\partial \xi_n \partial \xi_n} \end{bmatrix}_{\xi=x}$$

V.B. Motivation

Consider the random variables $(\tilde{\chi}, \tilde{\theta})$ defined by $$(\tilde{\chi}, \tilde{\theta}) = \Phi(x, \theta; p),$$

where $\Phi: \mathbb{R}^n \times \mathbb{S} \to \mathbb{R}^n \times \mathbb{S}$ is a diffeomorphism and $(x, \theta) \sim GVM(\mu, P, \alpha, \beta, \Gamma, \kappa)$. By the change of variables theorem for PDFs, it follows that $$p(\tilde{x}, \tilde{\theta}) = \det\left[\frac{\partial \Psi}{\partial \tilde{x}}\right] \mathcal{GVM}(\Psi_x(\tilde{x}, \tilde{\theta}; p), \Psi_\theta(\tilde{x}, \tilde{\theta}; p); \mu, P, \alpha, \beta, \Gamma, \kappa), \qquad (49)$$

where $\Psi$ is the inverse of $\Phi$ and $\tilde{x} = (\tilde{x}, \tilde{\theta})$. The transformed PDF (49) is a GVM distribution in $(\tilde{\chi}, \tilde{\theta})$ if the transformation $\Psi$ (or $\Phi$) is of the form (18). In general, the non-linear transformation of a GVM distribution is not a GVM distribution. In such cases, the objective of the GVM filter prediction step is to compute an approximate GVM distribution such that $$p(\tilde{\chi}, \tilde{\theta}) \approx \mathcal{M}(\tilde{\chi}, \tilde{\theta}; \tilde{\mu}, \tilde{P}, \tilde{\alpha}, \tilde{\beta}, \tilde{\Gamma}, \tilde{\kappa}). \qquad (50)$$

One way to achieve this objective is to approximate $\Phi$ as a Taylor series about the modal point $(x, \theta) = (\mu, \alpha)$ and then match the Taylor coefficients with the coefficients in the transformation (18). It follows that $$L = \partial_x \Phi_x(\mu, \alpha), \ d = \Phi_x(\mu, \alpha) - \partial_x \Phi_x(\mu, \alpha) \mu,$$

$$a = \Phi_\theta(\mu, \alpha) - \alpha - \partial_x \Phi_\theta(\mu, \alpha)^T \mu + \tfrac{1}{2} \mu^T \partial_x^2 \Phi_\theta(\mu, \alpha) \mu,$$

$$b = \partial_x \Phi_\theta(\mu, \alpha) - \partial_x^2 \Phi_\theta(\mu, \alpha) \mu, \ C = \partial_x^2 \Phi_\theta(\mu, \alpha), \qquad (51)$$

where, for notational convenience, the dependence of $\Phi$ and its derivatives on the non-stochastic parameter p is suppressed. Substituting (51) into (19) yields $$\tilde{\mu} = \Phi_x(\mu, \alpha), \ \tilde{P} = \partial_x \Phi_x(\mu, \alpha) P \partial_x \Phi_x(\mu, \alpha)^T, \ \tilde{\alpha} = \Phi_\theta(\mu, \alpha),$$

$$\tilde{\beta} = Q^T[\beta + A^T \partial_x \Phi_\theta(\mu, \alpha)], \ \tilde{\Gamma} = Q^T[\Gamma + A^T \partial_x^2 \Phi_\theta(\mu, \alpha) A]$$
$$Q, \ \tilde{\kappa} = \kappa, \qquad (52)$$

where Q is an n×n orthogonal matrix and R is an n×n positive-definite upper-triangular matrix such that $QR = (LA)^T$. It follows that $Q = A^T \partial_x \Phi_x(\mu, \alpha)^T \tilde{A}^{-T}$ where $\tilde{A}$ is the lower-triangular matrix such that $\tilde{P} = \tilde{A} \tilde{A}^T$; hence $$\tilde{\mu} = \Phi_x(\mu, \alpha), \ \tilde{P} = \partial_x \Phi_x(\mu, \alpha) P \partial_x \Phi_x(\mu, \alpha)^T, \ \tilde{\alpha} = \Phi_\theta(\mu, \alpha),$$

$$\tilde{\beta} = \tilde{A}^{-1} \partial_x \Phi_x(\mu, \alpha) A [\beta + A^T \partial_x \Phi_\theta(\mu, \alpha)],$$

$$\tilde{\Gamma} = \tilde{A}^{-1} \partial_x \Phi_x(\mu, \alpha) A [\Gamma + A^T \partial_x^2 \Phi_\theta(\mu, \alpha) A] A^T \partial_x \Phi_x(\mu, \alpha)^T$$
$$\tilde{A}^{-T}, \ \tilde{\kappa} = \kappa. \qquad (53)$$

An equivalent form of the above equations for $\tilde{\beta}$ and $\tilde{\Gamma}$ are used in the next section which expresses all partial derivatives of $\Phi$ with respect to the standardized variable $z = A^{-1}(x - \mu)$. By the chain rule, $$\partial_x \Phi_\theta = A^{-T} \partial_z \Phi_\theta, \ \partial_x^2 \Phi_\theta = A^{-T} \partial_z^2 \Phi_\theta A^{-1}, \ \partial_x \Phi_x = \partial_z \Phi_x A^{-1}.$$

Substituting the above equations into (53) yields $$\tilde{\mu} = \Phi_x(\mu, \alpha), \ \tilde{P} = \partial_x \Phi_x(\mu, \alpha) P \partial_x \Phi_x(\mu, \alpha)^T, \ \tilde{\alpha} = \Phi_\theta(\mu, \alpha),$$

$$\tilde{\beta} = \tilde{A}^{-1} \partial_z \Phi_x(\mu, \alpha) [\beta + \partial_z \Phi_\theta(\mu, \alpha)],$$

$$\tilde{\Gamma} = \tilde{A}^{-1} \partial_z \Phi_x(\mu, \alpha) [\Gamma + \partial_z^2 \Phi_\theta(\mu, \alpha)] \partial_z \Phi_x(\mu, \alpha)^T \tilde{A}^{-T}, \ \tilde{\kappa} = \kappa. \qquad (54)$$

It is noted that Equations (53) or (54) are analogous to those used in the prediction step of the extended Kalman filter (EKF) for the linearized propagation of a multivariate Gaussian distribution. Indeed, if $x \sim N(\mu, P)$, $\Phi: \mathbb{R}^n \to \mathbb{R}^n$ then, under weak non-linear assumptions in $\Phi$, $\tilde{x}=\Phi(x) \sim N(\tilde{\mu}, \tilde{P})$, where $$\tilde{\mu}=\Phi(\mu), \tilde{P}=\partial_x\Phi(\mu)P\partial_x\Phi(\mu)^T.$$

While the analogous "EKF-like" prediction derived in Equations (53) provides an approximate GVM distribution to a non-linear transformation of a GVM random vector, the proposed algorithm developed in the next subsection provides a more accurate approximation while avoiding the direct computation of the partial derivatives of the transformation $\Phi$.

V.C. Algorithm Description

FIG. 1 is a flowchart illustrating an exemplary process for transforming a Gauss von Mises (GVM) distribution under a non-linear transformation and approximating the output as a GVM distribution. In this example, there are two inputs 100: (i) a random vector $(x, \theta) \in \mathbb{R}^n \times \mathbb{S}$ distributed as a GVM distribution with parameter set $(\mu, P, \alpha, \beta, \Gamma, \kappa)$, and (ii) a diffeomorphism $\Phi: \mathbb{R}^n \times \mathbb{S} \to \mathbb{R}^n \times \mathbb{S}$. Where, as described in detail above: $(\mu, \alpha)$ is the mode of the GVM distribution (i.e., the state with the maximum likelihood); P is the covariance of x; $\kappa$ quantifies concentration in the angular variable $\theta$; $\beta$ beta characterizes correlation between x and $\theta$; and $\Gamma$ models higher-order cumulants (which give the level sets of the GVM distribution their distinctive "banana" or "boomerang" shape). The output 105 can be an approximation of the distribution of $(\tilde{x}, \tilde{\theta})=\Phi(x, \theta)$ as a GVM distribution with parameter set $(\tilde{\mu}, \tilde{P}, \tilde{\alpha}, \tilde{\beta}, \tilde{\Gamma}, \tilde{\kappa})$. The algorithm has four main steps summarized below:

Generate 101 N quadrature nodes $\{(x_{\sigma_i}, \theta_{\sigma_i})\}_{i=1}^N$ from the input GVM distribution and compute the transformed quadrature nodes $(\tilde{x}_{\sigma_i}, \tilde{\theta}_{\sigma_i})=\Phi(x_{\sigma_i}, \theta_{\sigma_i})$, for $i=1, \ldots, N$;

Recover 102 the parameters $\tilde{\mu}$ and $\tilde{P}$ of the transformed GVM distribution from the transformed quadrature nodes computed in Step 101 using the appropriate Gauss von Mises quadrature rule;

Compute 103 approximations of $\tilde{\alpha}$, $\tilde{\beta}$, and $\tilde{\Gamma}$, denoted as $\hat{\alpha}$, $\hat{\beta}$, and $\hat{\Gamma}$, using Equations (54) in conjunction with suitable approximations of the partial derivatives of $\Phi$; and Set 104 $\tilde{\kappa}=\kappa$ and recover the parameters $\tilde{\alpha}$, $\tilde{\beta}$, and $\tilde{\Gamma}$ by solving the non-linear least squares problem $$(\tilde{\alpha}, \tilde{\beta}, \tilde{\Gamma}) = \underset{\hat{\alpha}, \hat{\beta}, \hat{\Gamma}}{\arg\min} \quad (55)$$

$$\sum_{i=1}^{N}\left[M(x_{\sigma_i}, \theta_{\sigma_i}; \mu, P, \alpha, \beta, \Gamma, \kappa) - M(\tilde{x}_{\sigma_i}, \tilde{\theta}_{\sigma_i}; \tilde{\mu}, \tilde{P}, \hat{\alpha}, \hat{\beta}, \hat{\Gamma}, \tilde{\kappa})\right]^2$$

where M is the Mahalanobis von Mises statistic (26).

These four steps 101, 102, 103, and 104 are described in more detail below including discussions on how they can be specialized to the case when $\Phi$ is the solution flow (in equinoctial orbital element coordinates) corresponding to the two-body problem in orbital mechanics (henceforth referred to as the "two-body problem").

At step 101, using either the third, fifth, or higher-order GVM quadrature rule derived in Sections IV.A, IV.B, and IV.C, respectively, first generate N quadrature nodes $\{(z_{\sigma_i}, \phi_{\sigma_i})\}_{i=1}^N$ with respective weights $\{w_{\sigma_i}\}_{i=1}^N$ corresponding to the canonical GVM distribution. Next, use these canonical quadrature nodes to generate quadrature nodes corresponding to the input GVM random vector $(x, \theta) \sim \text{GVM}(\mu, P, \alpha, \beta, \Gamma, \kappa)$ according to $$x_{\sigma_i}=\mu+Az_{\sigma_i}, \theta_{\sigma_i}=\phi_{\sigma_i}+\alpha+\beta^T z_{\sigma_i}+\tfrac{1}{2}z_{\sigma_i}^T \Gamma z_{\sigma_i},$$

for $i=1, \ldots, N$. Finally, compute the transformed quadrature nodes $(\tilde{x}_{\sigma_i}, \tilde{\theta}_{\sigma_i})=\Phi(x_{\sigma_i}, \theta_{\sigma_i})$, for $i=1, \ldots, N$.

In the case of the two-body problem, the transformed quadrature nodes can be generated by propagating each quadrature node $(x_{\sigma_i}, \theta_{\sigma_i})$, representing a state in equinoctial orbital element space, from a specified initial time to a specified final time under the underlying dynamics. This generally can be accomplished using the numerical solution of a non-linear system of ordinary differential equations. Additional details are discussed in the paragraph preceding Equation (48).

At step 102, the transformed parameters $\tilde{\mu}$ and $\tilde{P}$ are given by $$\tilde{\mu}=E[\tilde{x}]=E[\Phi_x(x,\theta)]$$

$$\tilde{P}=E[(\tilde{x}-\tilde{\mu})(\tilde{x}-\tilde{\mu})^T]=E[(\Phi_x(x,\theta)-\tilde{\mu})(\Phi_x(x,\theta)-\tilde{\mu})^T].$$

Using the quadrature weights $\{w_{\sigma_i}\}_{i=1}^N$ and the transformed quadrature nodes $\{(\tilde{x}_{\sigma_i}, \tilde{\theta}_{\sigma_i})\}_{i=1}^N$ generated in Step 101, the above expected values can be approximated using the framework of Gauss von Mises quadrature developed in Section IV:

$$\tilde{\mu} = \sum_{i=1}^N w_{\sigma_i} \tilde{x}_{\sigma_i},$$

$$\tilde{P} = \sum_{i=1}^N w_{\sigma_i} (\tilde{x}_{\sigma_i} - \tilde{\mu})(\tilde{x}_{\sigma_i} - \tilde{\mu})^T.$$

The lower-triangular Cholesky factor of $\tilde{P}$, satisfying $\tilde{P}=\tilde{A}\tilde{A}^T$, can be used in subsequent computations.

At step 103, the parameters $\tilde{\alpha}$, $\tilde{\beta}$, and $\tilde{\Gamma}$ are approximated as $\hat{\alpha}$, $\hat{\beta}$, and $\hat{\Gamma}$ using Equations (54):

$$\hat{\alpha}=\Phi_\theta(\mu,\alpha), \hat{\beta}=\tilde{A}^{-1}\partial_z\Phi_x(\mu,\alpha)[\beta+\partial_z\Phi_\theta(\mu,\alpha)],$$

$$\hat{\Gamma}=\tilde{A}^{-1}\partial_z\Phi_x(\mu,\alpha)[\Gamma+\partial_z^2(\mu,\alpha)]\partial_z\Phi_x(\mu,\alpha)^T\tilde{A}^{-T}. \quad (56)$$

It is noted that $(\mu, \alpha)$ is itself a quadrature node corresponding to the canonical node $(z, \phi)=(0, 0)$. Hence, $\hat{\alpha}$ is recovered. The partial derivatives of $\Phi$ in the expressions for $\hat{\beta}$ and $\hat{\Gamma}$ are approximated using a two-point central difference scheme (for the first-order derivatives $\partial_z\Phi_x$ and $\partial_z\Phi_\theta$) and a three-point central difference scheme (for the second-order derivatives $\partial_z^2\Phi_\theta$). Shown below are examples using a scalar function $f$:

$$f'(x) \approx \frac{f(x+\xi)-f(x-\xi)}{2\xi},$$

$$f''(x) \approx \frac{f(x+\xi)-2f(x)+f(x-\xi)}{\xi^2}.$$

The value used for $\xi$ depends on the GVM quadrature rule used to generate the quadrature nodes. For the third and fifth-order methods, $\xi=\sqrt{3}$, as given by Equations (39) and (43). No additional function evaluations of $\Phi$ are required in these central difference calculations since they only make use of the transformed quadrature nodes $\{(\tilde{x}_{\sigma_i}, \tilde{\theta}_{\sigma_i})\}_{i=1}^N$. It is noted that the use of numerical approximations for the partial derivatives of $\Phi$ can be diverted if it is computationally feasible to calculate them directly.

When specialized to the two-body problem, some additional assumptions can be made in this step to reduce computations. If the third-order GVM quadrature method is assumed, then the N=13 canonical sigma points can be enumerated as $$\begin{bmatrix} z_{\sigma_1} & \cdots & z_{\sigma_{13}} \\ \phi_{\sigma_1} & \cdots & \phi_{\sigma_{13}} \end{bmatrix} = \begin{bmatrix} 0 & 0 & 0 & \xi & -\xi & 0 & 0 & 0 & 0 & 0 & 0 & 0 & 0 \\ 0 & 0 & 0 & 0 & 0 & \xi & -\xi & 0 & 0 & 0 & 0 & 0 & 0 \\ 0 & 0 & 0 & 0 & 0 & 0 & 0 & \xi & -\xi & 0 & 0 & 0 & 0 \\ 0 & 0 & 0 & 0 & 0 & 0 & 0 & 0 & 0 & \xi & -\xi & 0 & 0 \\ 0 & 0 & 0 & 0 & 0 & 0 & 0 & 0 & 0 & 0 & 0 & \xi & -\xi \\ 0 & \eta & -\eta & 0 & 0 & 0 & 0 & 0 & 0 & 0 & 0 & 0 & 0 \end{bmatrix},$$

where $\xi$ and $\eta$ are specified in (39). Then, $$\partial_z \Phi_\theta(\mu, \alpha) \approx \frac{1}{2\xi} \begin{bmatrix} \tilde{\theta}_{\sigma_4} - \tilde{\theta}_{\sigma_5} \\ \tilde{\theta}_{\sigma_6} - \tilde{\theta}_{\sigma_7} \\ \tilde{\theta}_{\sigma_8} - \tilde{\theta}_{\sigma_9} \\ \tilde{\theta}_{\sigma_{10}} - \tilde{\theta}_{\sigma_{11}} \\ \tilde{\theta}_{\sigma_{12}} - \tilde{\theta}_{\sigma_{13}} \end{bmatrix},$$

$$\partial_z^2 \Phi_\theta(\mu, \alpha) \approx \frac{1}{\xi^2} \begin{bmatrix} \tilde{\theta}_{\sigma_4} - 2\tilde{\theta}_{\sigma_1} + \tilde{\theta}_{\sigma_5} & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \end{bmatrix}.$$

and $\Phi_\theta(\mu, \alpha) = \tilde{\theta}_{\sigma_1}$. Further, the approximation $\partial_x \Phi_x \approx I$ is assumed. (These approximations are exact under the assumption of unperturbed two-body dynamics in (5)). Thus, $$\alpha = \Phi_\theta(\mu,\alpha), \hat{\beta} = \tilde{A}^{-1} A/\beta + \partial_z \Phi_\theta(\mu,\alpha)], \hat{\Gamma} = \tilde{A}^{-1} A/\Gamma + \partial_z^2 \Phi_\theta(\mu,\alpha)] A^T \tilde{A}^{-T}.$$

At step 104, the hatted parameters $\hat{\alpha}$, $\hat{\beta}$, and $\hat{\Gamma}$ computed in Step 103 can be approximations to the "optimal" parameters $\hat{\alpha}$, $\hat{\beta}$, and $\hat{\Gamma}$ characterizing the output GVM distribution. In this step, the hatted parameters can be "refined" by solving a non-linear least squares problem which is motivated as follows. Define (57)

$$p_a(\tilde{x},\tilde{\theta}) = \mathcal{M}(\tilde{x},\tilde{\theta};\tilde{\mu},\tilde{P},\hat{\alpha},\hat{\beta},\hat{\Gamma},\hat{\kappa}), \quad (57)$$

$$p_e(\tilde{x},\tilde{\theta}) = \mathcal{M}(\Psi_x(\tilde{x},\tilde{\theta};p),\Psi_\theta(\tilde{x},\tilde{\theta};p);\mu,P,\alpha,\beta,\Gamma,\kappa). \quad (58)$$

It is noted that $p_a$ is the approximate GVM distribution of the output using the hatted parameters, while $p_e$ is the "exact" PDF, as given by (49), but with the assumption that the determinant factor is unity (i.e., $\Phi$ is volume preserving). It is acknowledged that this is suboptimal (only if $\Phi$ is not volume preserving) though, in the context of the present invention, it is observed that the largest deviations from unity in the determinant factor are on the order of $10^{-4}$ for scenarios with the strongest non-conservative forces.

In this refinement step, the approximations of the hatted parameters can be improved by "matching" the approximate and exact PDFs in (57) and (58) at the N transformed quadrature nodes $\{(\tilde{x}_{o_i}, \ldots, \tilde{\theta}_{o_i})\}_{i=1}^N$. One way to accomplish this objective is to study the overdetermined system of algebraic equations $$p_a(\tilde{x}_{\sigma_i},\tilde{\theta}_{\sigma_i}) = p_e(\tilde{x}_{\sigma_i},\tilde{\theta}_{\sigma_i}), i=1,\ldots,N,$$

in $\hat{\alpha}$, $\hat{\beta}$, and $\hat{\Gamma}$. Instead, the analogous equations in 'log space' are used by defining $$l_a(\tilde{x},\tilde{\theta}) = -2\ln\left[\frac{p_a(\tilde{x},\tilde{\theta})}{p_a(\tilde{x}_*,\tilde{\theta}_*)}\right],$$

$$l_e(\tilde{x},\tilde{\theta}) = -2\ln\left[\frac{p_e(\tilde{x},\tilde{\theta})}{p_e(\tilde{x}_*,\tilde{\theta}_*)}\right],$$

where $(\tilde{x}_*, \tilde{\theta}_*)$ denotes the modal point. It follows that $$l_a(\tilde{x},\tilde{\theta}) = M(\tilde{x},\tilde{\theta};\tilde{\mu},\tilde{P},\hat{\alpha},\hat{\beta},\hat{\Gamma},\hat{\kappa}),$$

$$l_e(\tilde{x},\tilde{\theta}) = M(\Psi_x(\tilde{x},\tilde{\theta};p),\Psi_\theta(\tilde{x},\tilde{\theta};p);\mu,P,\alpha,\beta,\Gamma,\kappa),$$

where M is the Mahalanobis von Mises statistic (26). Now set $\tilde{\kappa} = \kappa$ (see (53) or (54)) and solve the overdetermined system of algebraic equations $$l_a(\tilde{x}_{\sigma_i},\tilde{\theta}_{\sigma_i}) = l_e(\tilde{x}_{\sigma_i},\tilde{\theta}_{\sigma_i}), i=1,\ldots,N,$$

for $\hat{\alpha}$, $\hat{\beta}$, and $\hat{\Gamma}$, in the least squares sense. This leads to the optimization problem (55) which can be expressed in the equivalent form $$(\hat{\alpha}, \hat{\beta}, \hat{\Gamma}) = \operatorname*{arg\,min}_{\hat{\alpha},\hat{\beta},\hat{\Gamma}} \sum_{i=1}^{N} [r_i(\hat{\alpha},\hat{\beta},\hat{\Gamma})]^2, \quad (59)$$

where $$r_i(\hat{\alpha},\hat{\beta},\hat{\Gamma}) = z_{\sigma_i}^T z_{\sigma_i} - \tilde{z}_{\sigma_i}^T \tilde{z}_{\sigma_i} + 4\kappa\left(\sin^2\frac{1}{2}\phi_{\sigma_i} - \sin^2\frac{1}{2}\tilde{\phi}_{\sigma_i}\right),$$

and $$\tilde{z}_{\sigma_i} = \tilde{A}^{-1}(\tilde{x}_{\sigma_i} - \tilde{\mu}),$$

$$\tilde{\phi}_{\sigma_i} = \tilde{\theta}_{\sigma_i} - \hat{\alpha} - \hat{\beta}^T \tilde{z}_{\sigma_i} - \frac{1}{2}\tilde{z}_{\sigma_i}^T \hat{\Gamma} \tilde{z}_{\sigma_i}.$$

Methods for solving non-linear least squares problems, such as Gauss-Newton, full Newton, and quasi-Newton updates, along with globalization methods such as line search and trust region methods including Levenberg-Marquardt, are efficient and mature and will not be discussed further here. It is noted that the hatted parameters computed in Step 103 can be used as a starting iteration.

For the two-body problem, it is proposed to optimize over the parameters $\hat{\alpha}, \hat{\beta}$, and the (1,1)-component of $\hat{\Gamma}$. (The largest changes in the initial parameter matrix $\Gamma$ to the transformed matrix $\hat{\Gamma}$ is in the (1,1)-component.) To facilitate the solution of the non-linear least squares problem (59) with these specializations, it is useful to note the partial derivatives of the residuals $r_i$:

$$\frac{\partial r_i}{\partial \hat{\alpha}} = 2\kappa \sin\tilde{\phi}_{\sigma_i},$$

$$\frac{\partial r_i}{\partial \hat{\beta}} = 2\kappa \sin\tilde{\phi}_{\sigma_i} \tilde{z}_{\sigma_i},$$

$$\frac{\partial r_i}{\partial \hat{\Gamma}_{11}} = \kappa \sin\tilde{\phi}_{\sigma_i} [(\tilde{z}_{\sigma_i})_{11}]^2.$$

It is noted that the optimization problem (59) is numerically well-conditioned and, for the case of the two-body problem, is inexpensive to solve relative to the propagation of the quadrature nodes.

V.D. Performance Metrics

In this subsection, two different metrics are proposed which allow the operator to assess online when the non-linear transformation of a GVM distribution is not well-represented by a GVM distribution. The first metric, given by Equation (61), is based on the differential entropy and was popularized by DeMars et al. in their design of an adaptive Gaussian mixture filter. While the entropy has a nice information-theoretic interpretation and is straightforward to apply, it is only applicable to transformations which are volume preserving. In the context of the two-body problem in orbital mechanics, volume preserving transformations can be induced generally in the case of pure (conservative) gravity flows (solar radiation pressure is one exception). The second metric, given by Equation (62), is valid for general (non-volume preserving) non-linear transformations and can be based on the Mahalanobis von Mises statistic. Both metrics provide a tool to validate the GVM propagation algorithm in the previous subsection. If a breakdown is found to occur, a higher-fidelity method can be triggered such as one that uses a mixture of GVM distributions to more accurately characterize the transformed PDF. Additional details are provided in Subsection V.F.

V.D.i. Differential Entropy

Let x denote a random vector defined on a manifold $\mathcal{M}$ with corresponding PDF $p_x(x)$. The differential entropy of x is defined by $$H(x) = -\int_{\mathcal{M}} p_x(x) \ln p_x(x) dx. \tag{60}$$

If $\Phi: \mathcal{M} \to \mathcal{M}$ is a diffeomorphism that is also volume preserving, i.e., $$\det\left[\frac{\partial \Phi}{\partial x}\right] = 1.$$

for all $x \in \mathcal{M}$ then it follows from the change of variables theorem for PDFs that $H(x) = H(\tilde{x})$, where $\tilde{x} = \Phi(x)$. In other words, the differential entropy is invariant under a volume preserving diffeomorphism.

If $(x, \theta) \sim \text{GVM}(\mu, P, \alpha, \beta, \Gamma, \kappa)$, then its differential entropy can be given by the expression in (17). This expression can be used to validate the approximation $(\tilde{x}, \tilde{\theta}) \sim \text{GVM}(\tilde{\mu}, \tilde{P}, \tilde{\alpha}, \tilde{\beta}, \tilde{\Gamma}, \tilde{\kappa})$, where $(\tilde{x}, \tilde{\theta}) = \Phi(x, \theta)$ and $\Phi$ is a volume preserving diffeomorphism on $\mathbb{R}^n \times \mathbb{S}$. Indeed, any deviation between the differential entropy of $(x, \theta)$ and $(\tilde{x}, \tilde{\theta})$ indicates a breakdown of the GVM assumption. To detect such deviations, one can evaluate the percentage change in differential entropy:

$$\Delta H(\tilde{x}, \tilde{\theta}; x, \theta) = 100 \left| \frac{H(\tilde{x}, \tilde{\theta}) - H(x, \theta)}{H(x, \theta)} \right|. \tag{61}$$

If $\Delta H$ exceeds a user-defined threshold, then a breakdown in the GVM assumption is declared.

V.D.ii. Mahalanobis von Mises Statistic

Diffeomophisms are generally not volume preserving including those encountered in the two-body problem induced by non-conservative forces such as atmospheric drag. In such cases, to detect a breakdown in the GVM assumption discussed above and to thereby validate the GVM propagation algorithm in Subsection V.C, a metric is proposed based on the Mahalanobis von Mises statistic (26) formed from the quadrature nodes of a GVM quadrature rule.

The metric is motivated from the property that the Mahalanobis von Mises statistic can be invariant under any transformation of the form (18). Indeed, if $(x, \theta) \sim \text{GVM}(\mu, P, \alpha, \beta, \Gamma, \kappa)$, and $(\tilde{x}, \tilde{\theta})$ is defined by the transformation (18), then $(\tilde{x}, \tilde{\theta}) \sim \text{GVM}(\tilde{\mu}, \tilde{P}, \tilde{\alpha}, \tilde{\Gamma}, \tilde{\kappa})$, where the transformed parameters are given by (19). It follows that $$M(x, \theta; \mu, P, \alpha, \beta, \Gamma, \kappa) = M(\tilde{x}, \tilde{\theta}; \tilde{\mu}, \tilde{P}, \tilde{\alpha}, \tilde{\Gamma}, \tilde{\kappa}),$$

where M is the Mahalanobis von Mises statistic (26).

Using the same input from the algorithm of Subsection V.C, define $$\Sigma_M = \sum_{i=1}^{N} M(x_{\sigma_i}, \theta_{\sigma_i}; \mu, P, \alpha, \beta, \Gamma, \kappa),$$

where $\{(x_{\sigma_i}, \theta_{\sigma_i})\}_{i=1}^{N}$ are the N quadrature nodes generated from Step 101 of the algorithm. Equivalently, the expression for $\Sigma_M$ can be written in terms of the canonical GVM sigma points $\{(z_{\sigma_i}, \theta_{\sigma_i})\}_{i=1}^{N}$ according to $$\Sigma_M = \sum_{i=1}^{N} M(z_{\sigma_i}, \phi_i; 0, I, 0, 0, 0, \kappa). \tag{62}$$

Next, define $$\tilde{\Sigma}_M = \sum_{i=1}^{N} M(\tilde{x}_{\sigma_i}, \tilde{\theta}_{\sigma_i}; \tilde{\mu}, \tilde{P}, \tilde{\alpha}, \tilde{\beta}, \tilde{\Gamma}, \tilde{\kappa}),$$

where $\{(\tilde{x}_{\sigma_i}, \tilde{\theta}_{\sigma_i})\}_{i=1}^{N}$ are the transformed quadrature nodes computed from Step 101 of the algorithm and $(\tilde{\mu}, \tilde{P}, \tilde{\alpha}, \tilde{\beta}, \tilde{\Gamma}, \tilde{\kappa})$ are the parameter set of the output GVM distribution computed in Steps 102-104.

By the invariance property of the Mahalanobis von Mises statistic discussed above, if $\tilde{\Sigma}_M \neq \Sigma_M$, then the underlying transformation that produced the sigma points $\{(\tilde{x}_{\sigma_i}, \tilde{\theta}_{\sigma_i})\}_{i=1}^{N}$ is not of the form (18). Hence, the PDF of the transformed random vector $\Phi(x, \theta)$ is not the output GVM distribution of the algorithm. Significant departures of the transformed PDF from a GVM distribution are manifested in deviations in $\tilde{\Sigma}_M$ from $\Sigma_M$. Therefore, if $|\tilde{\Sigma}_M - \Sigma_M|/\Sigma_M$ exceeds a user-defined threshold, then a breakdown in the GVM assumption is declared.

V.E. Inclusion of Stochastic Process Noise

The inclusion of uncertain parameters or stochastic process noise in the transformation of a GVM random vector can be treated within the algorithm of Subsection V.C using state augmentation. Indeed, let $\Phi: \mathbb{R}^n \times \mathbb{R}^m \times \mathbb{S} \to \mathbb{R}^n \times \mathbb{S}$ be a family of diffeomorphisms in $w \in \mathbb{R}^m$ defined such that $$(\tilde{x}, \tilde{\theta}) = \Phi(x, w, \theta; p),$$

where p denotes any constant non-stochastic parameters. It is assumed that $(y, \theta) \sim \text{GVM}(\mu, P, \alpha, \beta, \Gamma, \kappa)$, where $y = (x, w)$ denotes the augmented random vector. In many filtering applications, it commonly assumed that the state vector $(x, \theta)$ is independent of the process noise random vector w and that w is additive so that $\Phi$ enjoys the form $$\Phi(x, w, \theta; p) = f(x, \theta; p) + g(x, \theta; p) w.$$

In this formulation, such assumptions on the additivity of the process noise and the independence of $(x, \theta)$ with w can be relaxed.

Introducing a slack variable $\tilde{w}$, consider the augmented transformation $$(\tilde{y}, \tilde{\theta}) = \Omega(y, \theta; p), \tag{63}$$

where $\tilde{y}=(\tilde{x},\tilde{w})$ and $$\Omega(y,\theta) = \begin{bmatrix} \Phi_x(x, w, \theta; p) \\ w \\ \Phi_\theta(x, w, \theta; p) \end{bmatrix}.$$

It is noted that $\Omega$ is a diffeomorphism from $\mathbb{R}^{n+m} \times \mathbb{S}$ to $\mathbb{R}^{n+m} \times \mathbb{S}$. Therefore, the algorithm of Subsection V.C can be applied in conjunction with the transformation (63) to yield an approximation of the joint PDF of $(\tilde{y}, \tilde{\theta})$ by a GVM distribution. To obtain the joint PDF of $(\tilde{x}, \tilde{\theta})$, the slack variable $\tilde{w}$ is marginalized out, noting from Section III.G that (Si, a) is also a GVM distribution given that the output $(\tilde{y}, \tilde{\theta})$ is a GVM distribution.

V.F. Propagation of Mixtures

According to one embodiment, the framework of this section can be applied equally to the propaga According to another embodiment, the "adaptive entropy-based Gaussian-mixture information synthesis" (AEGIS) methodology of DeMars et al., a Gaussian mixture filter in which the number of mixture components adapts according to the non-linearity, can be extended to mixtures of GVM distributions using the metrics defined in Subsection V.D.

The random variables $(x, \theta) \in \mathbb{R}^n \times \mathbb{S}$ are said be jointly distributed as a mixture of GVM distributions if their joint PDF has the form $$p(x, \theta) = \sum_{i=1}^{N} w_i \mathcal{GVM}(x, \theta; \mu_i, P_i, \alpha_i, \beta_i, \Gamma_i, \kappa_i), \quad (64)$$

where the weights $w_i$, $i=1, \ldots, N$, are positive and sum to unity. Under a diffeomorphism $(\tilde{x}, \tilde{\theta}) = \Phi(x, \theta; p)$, the joint PDF of $(\tilde{x}, \tilde{\theta})$ is approximated as $$p(\tilde{x}, \tilde{\theta}) \approx \sum_{i=1}^{N} w_i \mathcal{GVM}(\tilde{x}, \tilde{\theta}; \tilde{\mu}_i, \tilde{P}_i, \tilde{\alpha}_i, \tilde{\beta}_i, \tilde{\Gamma}_i, \tilde{\kappa}_i), \quad (65)$$

where the weights $w_j$ can be left unchanged and the parameter sets $(\tilde{\mu}_i, \tilde{P}_i, \tilde{\alpha}_i, \tilde{\beta}_i, \tilde{\Gamma}_i, \tilde{\kappa}_i)$ of each of the transformed GVM components can be computed using the algorithm in Subsection V.C. In analogy to the prediction step of the Gaussian mixture filter, the procedure is parallelizable since each GVM component can be processed through the algorithm independently of the others. The approximation in (65) can be provided each input GVM component gets mapped to a GVM component under the transformation $\Phi$. The fidelity of the approximation can be validated using the metrics in Subsection V.D.

A feature of the Gaussian mixture filter is an algorithm for choosing the component means, covariances, and weights of the initial input Gaussian mixture so that, when acted on by a non-linear transformation, the resulting output Gaussian mixture is a proper characterization of the actual transformed PDF up to a prescribed accuracy. Noting that any (smooth) non-linear transformation is approximately linear in a sufficiently small neighborhood, Gaussians with smaller covariances remain more Gaussian than those with larger covariances under the non-linear map. Thus, a Gaussian mixture which is refined by approximating each component Gaussian by a finer Gaussian mixture exhibits better behavior under a non-linear transformation. Within the two-body problem, the refinement is usually performed along one coordinate direction, namely along the semi-major axis, because it is along this coordinate where the non-linearities are most severe.

The refinement paradigm for Gaussians and Gaussian mixtures described above applies equally well to GVM distributions. Suppose it is desired to refine the GVM component $$p(x,\theta) = \mathcal{M}(x,\theta;\bar{\mu},\bar{P},\bar{\beta},\bar{\Gamma},\bar{\kappa}) = \mathcal{N}(x;\bar{\mu},\bar{P})\mathcal{M}(\theta;\alpha + \bar{\beta}^T z + \tfrac{1}{2}z^T \bar{\Gamma} z, \bar{\kappa}),$$

where $z = \bar{A}^{-1}(x-\bar{\mu})$. If the Gaussian component is refined into a Gaussian mixture according to $$\mathcal{N}(x;\bar{\mu},\bar{P}) \approx \sum_{i=1}^{N} w_i \mathcal{N}(x, \mu_i, P_i),$$

then it follows that $p(x, \theta)$ is approximated as a mixture of GVM distributions of the form (64) where $$\alpha_i = \bar{\alpha} + \bar{\beta}^T v_i + \tfrac{1}{2} v_i^T \bar{\Gamma} v_i, \quad \beta_i = A_i^T \bar{A}^{-T}(\bar{\beta} + \bar{\Gamma} v_i),$$

$$\Gamma_i = A_i^T \bar{A}^{-T} \bar{\Gamma} \bar{A}^{-1} A_i, \quad \kappa_1 = \bar{\kappa}, \quad v_i = \bar{A}^{-1}(\mu_i - \bar{\mu}),$$

for $i=1, \ldots, N$.

A feature of the AEGIS methodology for Gaussian mixtures is its ability to detect online when a single Gaussian or Gaussian mixture, after undergone a non-linear transformation, does not properly characterize the actual uncertainty. AEGIS uses the differential entropy (60) to detect departures from "Gaussianity" due to local non-linearities in the transformation. If a sufficiently large departure is detected, it refines the Gaussian mixture into a finer Gaussian mixture in order to mitigate the non-linear effects and improve subsequent accuracy. Thus, to adapt the AEGIS concept to mixtures of GVM distributions, the differential entropy metric (61), valid for volume preservation transformations, or the Mahalanobis von Mises metric (62), applicable to general non-volume preserving transformations, can be used to detect when additional refinement of the input mixture is required.

Stated another way, predicting a location of an object in a multi-dimensional space having a plurality of (n+1) dimensions can comprise reading 100 a prior probability density function defined by a set of parameters ($\mu$, P, $\alpha$, $\beta$, $\Gamma$, $\kappa$) and representing an uncertainty of the location of the object in a cylindrical manifold ($\mathbb{R}^n \times \mathbb{S}$) of the multi-dimensional space and a diffeomorphism ($\Phi$) of the cylindrical manifold ($\Phi$: $\mathbb{R}^n \times \mathbb{S} \to \mathbb{R}^n \times \mathbb{S}$). A transformed probability density function defined by a set of parameters ($\tilde{\mu}$, $\tilde{P}$, $\tilde{\alpha}$, $\tilde{\beta}$, $\tilde{\Gamma}$, $\tilde{\kappa}$) and representing an uncertainty of the location of the object in a cylindrical manifold can be generated 101-104. The transformed probability density function can be generated 101-104 from the input probability density function under the diffeomorphism. The input probability density function and the transformed probability density function are both represented by Gauss von Mises distributions defined on the cylindrical manifold. The set of parameters representing the transformed probability density function can then be provided 105 as a representation of the predicted location of the object in the multi-dimensional space. In a SSA application, the diffeomorphism can be a solution flow induced from a system of ordinary differential equations describing two-body dynamics of orbital mechanics for the object. Also in such an application, the input Gauss von Mises distribution can be generated from a plurality of radar, electro-optical, or infrared sensor observations.

Generating the transformed probability density function can comprise computing 102 the parameters $\tilde{\mu}$ and $\tilde{P}$ from a sequence of function evaluations $\Phi(x_{\sigma_i}, \theta_{\sigma_i})$, for $i=1, \ldots, N$, where $(x_{\sigma_i}, \theta_{\sigma_i})$, for $i=1, \ldots, N$, are a chosen sequence of quadrature nodes on $\mathbb{R}^n \times \mathbb{S}$ and wherein the quadrature nodes $(x_{\sigma_i}, \theta_{\sigma_i})$, for $i=1, \ldots, N$, are generated 101 from a Gauss von Mises quadrature rule of a chosen order of accuracy in conjunction with the input parameter set $(\mu, P, \alpha, \beta, \Gamma, \kappa)$. Additionally, $\tilde{\kappa}$ can be set to $\tilde{\kappa}=\kappa$. The parameters $\tilde{\alpha}, \tilde{\beta}$, and $\tilde{\Gamma}$ by $\hat{\alpha}, \hat{\beta}$ and $\hat{\Gamma}$, respectively, can be approximated 103 using expressions depending on the partial derivatives of the diffeomorphism $\Phi$. The parameters $\hat{\alpha}, \hat{\beta}$, and $\hat{\Gamma}$ can be selected 104 according to:

$$(\hat{\alpha}, \hat{\beta}, \hat{\Gamma}) = \operatorname*{arg\,min}_{\hat{\alpha}, \hat{\beta}, \hat{\Gamma}} \sum_{i=1}^{N} \left[ M(x_{\sigma_i}, \theta_{\sigma_i}; \mu, P, \alpha, \beta, \Gamma, \kappa) - M(\Phi(x_{\sigma_i}, \theta_{\sigma_i}); \tilde{\mu}, \tilde{P}, \hat{\alpha}, \hat{\beta}, \hat{\Gamma}, \tilde{\kappa}) \right]^2,$$

where M is a Mahalanobis von Mises statistic. In some cases, the accuracy of the transformed Gauss von Mises distribution can be validated using a differential entropy metric. Additionally or alternatively, the accuracy of the transformed Gauss von Mises distribution can be validated using a metric based on a Mahalanobis von Mises statistic.

VI. Data Fusion

The problem of data fusion in multi-target tracking entails the combining of reports emanating from a common object in order to improve the state or understanding of that object. The "combining" or "fusion" process is performed in a probabilistic manner based on the laws of conditional probability and Bayes' rule. Within a sequential non-linear filter, this operation is called the correction or measurement update step of the filter.

This section shows how the correction step of the Bayesian non-linear filter can be specialized to the case when the prior state is a random vector represented by a Gauss von Mises (GVM) distribution and the update report, hypothesized to emanate from the prior, is either (i) another GVM random vector of the same dimension as the prior, or (ii) an observation related to the prior by a stochastic measurement model. In either case, the output of the Bayesian correction step can be a GVM distribution characterizing the fusion of the prior and the update. In addition, the process can furnish a statistically rigorous prediction error, a term appearing in the likelihood ratios for scoring the association of one report to another. The algorithm descriptions for Cases (i) and (ii) are provided in Subsections VI.A and VI.B, respectively, with respective block diagrams provided in FIGS. 2 and 3.

VI.A. Full State Update

Figure 2:
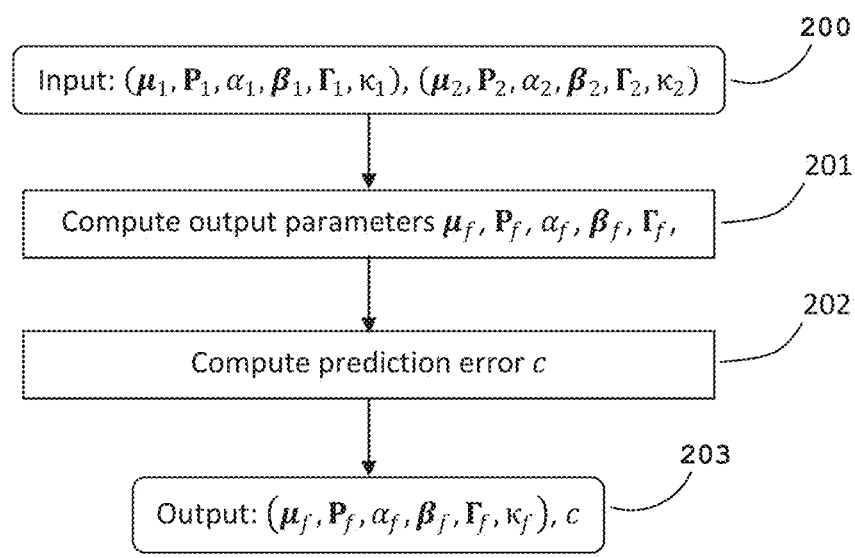
FIG. 2 is a flowchart illustrating an exemplary process for fusing a prior state represented by a Gauss von Mises distribution with an update report, wherein said update is another Gauss von Mises distribution of the same dimension as the prior according to one embodiment of the present invention.

FIG. 2 is a flowchart illustrating an exemplary process for fusing a prior state represented by a Gauss von Mises distribution with an update report, wherein said update is another Gauss von Mises distribution of the same dimension as the prior according to one embodiment of the present invention. In the case of a full state update, the Bayesian non-linear filter correction step has two inputs 200:
  i. a random vector $(x_1, \theta_1) \in \mathbb{R}^n \times \mathbb{S}$, called the prior, distributed as a GVM distribution with parameter set $(\mu_1, P_1, \alpha_1, \beta_1, \Gamma_1, \kappa_1)$, and
  ii. a second random vector $(x_2, \theta_2) \in \mathbb{R}^n \times \mathbb{S}$, called the update, distributed as a GVM distribution with parameter set $(\mu_2, P_2, \alpha_2, \beta_2, \Gamma_2, \kappa_2)$.

There are two outputs 203:
  i. a random vector $(x, \theta) \in \mathbb{R}^n \times \mathbb{S}$, called the correction, distributed as a GVM distribution with parameter set $(\mu_f, P_f, \alpha_f, \beta_f, \Gamma_f, \kappa_f)$ which characterizes the fusion of the prior with the update, and ii. the prediction error used to score the association of the prior with the update.

The algorithm can have two main steps summarized below:
  Compute 201 the parameter set $(\mu_f, P_f, \alpha_f, \beta_f, \Gamma_f, \kappa_f)$ of the corrected GVM distribution from Equations (71) and (74); and
  Evaluate 202 the prediction error integral (75) using a GVM quadrature rule in conjunction with the output from Step 201 and Equation (76).

These two steps 201 and 202 are described in more detail below including discussions on theoretical considerations.

VI.A.i. Theoretical Considerations

In a general setting, suppose X and Y are random vectors defined on a manifold $\mathcal{M}$ with respective probability density functions (PDFs) $p_{X|I_x}(x|I_x)$ and $p_{Y|I_y}(y|I_y)$, where $I_x$ and $I_y$ denote any prior information associated with X and Y, respectively. Denote the joint PDF of X and Y (conditioned on their respective prior information) by $p_{X,Y|I_x,I_y}(x, y|I_x, I_y)$ and the conditional PDF of X given Y=y, $I_x$ and $I_y$ by $p_{X|Y,I_x,I_y}(x|y, I_x, I_y)$.

The PDF obtained by fusing the information of X with that of Y is defined to be the conditional PDF of X given Y=x and given the other prior information:

$$p_{X \rightarrow Y|I_x, I_y}(x|I_x, I_y) \equiv p_{X|Y,I_x,I_y}(x|x, I_x, I_y).$$

By the definition of conditional probability, $$p_{X \rightarrow Y|I_x, I_y}(x \mid I_x, I_y) = \frac{1}{c} p_{X,Y|I_x,I_y}(x, x \mid I_x, I_y), \quad (66)$$

where the normalization constant c is given by $$c = p_{Y|I_x,I_y}(x|I_x,I_y) = \int_{\mathcal{M}} p_{X,Y|I_x,I_y}(x, x|I_x, I_y) dx. \quad (67)$$

Additionally, if (i) X is independent of Y given the prior information $I_x$ and $I_y$, (ii) X is independent of $I_y$ given $I_x$, and (iii) Y is independent of $I_x$ given $I_y$, then (66) and (67) simplify to $$p_{X \rightarrow Y|I_x, I_y}(x \mid I_x, I_y) = \frac{1}{c} p_{X|I_x}(x \mid I_x) p_{Y|I_y}(x \mid I_y),$$

$$c = \int_{\mathcal{M}} p_{X|I_x}(x \mid I_x) p_{Y|I_y}(x \mid I_y) dx.$$

In what follows, the above theoretical considerations and independence assumptions are specialized to the case when the random vectors X and Y are the input described at the beginning of the subsection (and $I_x$ and $I_y$ denote any prior information used to construct their respective parameter sets).

VI.A.ii. Algorithm Description

At step 201, the fused (corrected) PDF in $(x, \theta)$ obtained by fusing the prior random vector $(x_1, \theta_1)$ with the information from the update random vector $(x_2, \theta_2)$ is $$p_f(x, \theta) = \frac{1}{c} \mathcal{GVM}(x, \theta; \mu_1, P_1, \alpha_1, \beta_1, \Gamma_1, \kappa_1) \quad (68)$$
$$\mathcal{GVM}(x, \theta; \mu_2, P_2, \alpha_2, \beta_2, \Gamma_2, \kappa_2),$$

where $$c = \int_{\mathbb{R}^n} \int_{-\pi}^{\pi} \mathcal{GVM}(x, \theta; \mu_1, P_1, \alpha_1, \beta_1, \Gamma_1, \kappa_1) \quad (69)$$
$$\mathcal{GVM}(x, \theta; \mu_2, P_2, \alpha_2, \beta_2, \Gamma_2, \kappa_2) d\theta dx.$$

The normalization constant c is what is referred to as the prediction error. The objective is to approximate (68) by a GVM distribution with parameters $(\mu_f, P_f, \alpha_f, \beta_f, \Gamma_f, \kappa_f)$. To proceed, write $$p_f(x,\theta) \propto \mathcal{N}(x;\mu_1,P_1)\mathcal{N}(x;\mu_2,P_2)\exp[\kappa_1\cos(\theta-\Theta_1(x))+\kappa_2\cos(\theta-\Theta_2(x))], \quad (70)$$

where $$\Theta_1(x)=\alpha_1+\beta_1^T z_1+\tfrac{1}{2}z_1^T \Gamma_1 z_1, \; z_1=A_1^{-1}(x-\mu_1),$$

$$\Theta_2(x)=\alpha_2+\beta_2^T z_2+\tfrac{1}{2}z_2^T \Gamma_2 z_2, \; z_2=A_2^{-1}(x-\mu_2),$$

and '∝' denotes equality up to an overall multiplicative constant. Combining the two Gaussian PDFs in (70) into a single Gaussian PDF, it follows that $$p_f(x,\theta) \propto \mathcal{N}(x;\mu_f,P_f)\exp[\kappa_1\cos(\theta-\Theta_1(x))+\kappa_2\cos(\theta-\Theta_2(x))],$$

where $\mu_f$ and $P_f$ satisfy $$P_f^{-1}=P_1^{-1}+P_2^{-1},\; P_f^{-1}\mu_f=P_1^{-1}\mu_1+P_2^{-1}\mu_2. \quad (71)$$

Using elementary trigonometric identities, it follows that $$\kappa_1\cos(\theta-\Theta_1(x))+\kappa_2\cos(\theta-\Theta_2(x))=K(x)\cos(\theta-Q(x)),$$

where $$K(x)=[\kappa_1^2+2\kappa_1\kappa_2\cos(\Theta_1(x)-\Theta_2(x))+\kappa_2^2]^{1/2},$$

$$Q(x)=\arctan(\kappa_1\sin\Theta_1(x)+\kappa_2\sin\Theta_2(x),\kappa_1\cos\Theta_1(x)+\kappa_2\cos\Theta_2(x)).$$

(The two-argument inverse tangent function is implied.) The final step in the computation is to find the parameters $(\alpha_f, \beta_f, \Gamma_f, \kappa_f)$ such that $$K(x)\cos(\theta-Q(x))\approx \kappa_f\cos(\theta-\Theta_f(x)), \quad (72)$$

where $\Theta_f(x)=\alpha_f+\beta_f^T z_f+\tfrac{1}{2}z_f^T\Gamma_f z_f, z_f=A_f^{-1}(x-\mu_f)$, and $P_f=A_f A_f^T$. To streamline subsequent notation, define the auxiliary quantities $$v_i=A_i^{-1}(\mu_f-\mu_i)$$

$$\theta_i=\Theta_i(\mu_f)=\alpha_i+\beta_i^T v_i+\tfrac{1}{2}v_i^T\Gamma_i v_i,$$

$$b_i=A_i^{-T}(\beta_i+\Gamma_i v_i),$$

$$C_i=A_i^{-T}\Gamma_i A_i^{-1}, \quad (73)$$

for i=1,2. The approximation (72) can be achieved using Taylor expansions yielding $$\kappa_f=K(\mu_f)=[\kappa_1^2+2\kappa_1\kappa_2\cos(\theta_1-\theta_2)+\kappa_2^2]^{1/2},$$

$$\alpha_f=Q(\mu_f)=\arctan(\kappa_1\sin\theta_1+\kappa_2\sin\theta_2,\kappa_1\cos\theta_1+\kappa_2\cos\theta_2),$$

$$\beta_f=A_f^T b_f,$$

$$\Gamma_f=A_f^T C_f A_f, \quad (74)$$

where $$b_f = [\kappa_1\cos(\alpha_f-\theta_1)b_1 + \kappa_2\cos(\alpha_f-\theta_2)b_2]/[\kappa_1\cos(\alpha_f-\theta_1)+\kappa_2\cos(\alpha_f-\theta_2)],$$

$$C_f = \{\kappa_1\sin(\alpha_f-\theta_1)[b_1 b_1^T - (b_1 b_f^T + b_f b_1^T) + b_f b_f^T] +$$

$$\kappa_2\sin(\alpha_f-\theta_2)[b_2 b_2^T - (b_2 b_f^T + b_f b_2^T) + b_f b_f^T] + \kappa_1\cos(\alpha_f-\theta_1)C_1 +$$

$$\kappa_2\cos(\alpha_f-\theta_2)C_2\}/[\kappa_1\cos(\alpha_f-\theta_1)+\kappa_2\cos(\alpha_f-\theta_2)].$$

In summary, Equations (71) and (74) specify the parameter set $(\mu_f, P_f, \alpha_f, \beta_f, \Gamma_f, \kappa_f)$ of the output GVM distribution.

At step 202, using the GVM distribution with parameter set $(\mu_f, P_f, \alpha_f, \beta_f, \Gamma_f, \kappa_f)$ computed from above, the prediction error c given by (69) can be expressed in the form $$c = k\int_{\mathbb{R}^n}\int_{-\pi}^{\pi}\mathcal{GVM}(x,\theta;\mu_f,P_f,\alpha_f,\beta_f,\Gamma_f,\kappa_f)f(x,\theta)d\theta dx, \quad (75)$$

where $$k = \frac{2\pi e^{-\kappa_f}I_0(\kappa_f)}{2\pi e^{-\kappa_1}I_0(\kappa_1)\cdot 2\pi e^{-\kappa_2}I_0(\kappa_2)}\cdot\left[\frac{\det(2\pi P_f)}{\det(2\pi P_1)\det(2\pi P_2)}\right]^{1/2}$$

and $$f(x,\theta)=\exp\Big[-\tfrac{1}{2}z_1^T z_1 - \tfrac{1}{2}z_2^T z_2 + \tfrac{1}{2}z_f^T z_f - 2\kappa_1\sin^2\tfrac{1}{2}(\theta-\Theta_1(x)) -$$

$$2\kappa_2\sin^2\tfrac{1}{2}(\theta-\Theta_2(x))+2\kappa_f\sin^2\tfrac{1}{2}(\theta-\Theta_f(x))\Big].$$

The definitions of $z_1, z_2, z_f, \Theta_1(x), \Theta_2(x)$, and $\Theta_f(x)$ are provided following Equations (70) and (72). The framework of Gauss von Mises quadrature, as developed in Section IV, is applicable to the evaluation of the integral in (75). If $\{(z_{\sigma_i}, \phi_{\sigma_i})\}_{i=1}^N$ and $\{w_{\sigma_i}\}_{i=1}^N$ are the quadrature nodes (sigma points) and weights for the canonical GVM distribution, then it follows that $$c \approx k\sum_{i=1}^N w_{\sigma_i} f_{\sigma_i}, \quad (76)$$

where $$f_{\sigma_i} = \exp\Big[-\tfrac{1}{2}v_{1,\sigma_i}^T v_{1,\sigma_i} - \tfrac{1}{2}v_{2,\sigma_i}^T v_{2,\sigma_i} + \tfrac{1}{2}z_{\sigma_i}^T z_{\sigma_i} -$$

$$2\kappa_1\sin^2\tfrac{1}{2}\eta_{1,\sigma_i} - 2\kappa_2\sin^2\tfrac{1}{2}\eta_{2,\sigma_i} + 2\kappa_f\sin^2\tfrac{1}{2}\phi_{\sigma_i}\Big],$$

and $$v_{j,\sigma_i} = A_j^{-1}(\mu_f - \mu_j + A_f z_{\sigma_i}),$$

$$\eta_{j,\sigma_i} = \Big(\phi_{\sigma_i} + \alpha_f + \beta_f^T z_{\sigma_i} + \tfrac{1}{2}z_{\sigma_i}^T \Gamma_f z_{\sigma_i}\Big) -$$

$$\Big(\alpha_j + \beta_j^T v_{j,\sigma_i} + \tfrac{1}{2}v_{j,\sigma_i}^T \Gamma_j v_{j,\sigma_i}\Big),$$

for $j = 1, 2$.

It is noted that the evaluation of the prediction error integral (75) using different order GVM quadrature rules allows the operator to assess when the fused PDF (68) is not well-represented by a GVM distribution with the parameter set $(\mu_f, P_f, \alpha_f, \beta_f, \Gamma_f, \kappa_f)$. Indeed, the approximation (76) to the prediction error is exact if the fused PDF (68) is identically a GVM distribution. In such a case, the function $f(x,\theta)$ in (75) is a constant. Hence, the prediction error integral can be evaluated exactly using any GVM quadrature rule. For example, using a trivial first-order GVM quadrature rule leads to $$c_1 = k\exp[-\tfrac{1}{2}v_1^T v_1 - \tfrac{1}{2}v_2^T v_2 - 2\kappa_1\sin^2\tfrac{1}{2}(\alpha_f-\theta_1) - 2\kappa_2\sin^2\tfrac{1}{2}(\alpha_f-\theta_2)],$$

where $v_1, v_2, \theta_1$, and $\theta_2$ are the auxiliary quantities defined in (73). (The subscript '1' underneath c implies the use of a first-order GVM quadrature rule.) Similarly, one can evaluate (75) using a third-order quadrature method in conjunction with Equations (76). The (absolute or relative) difference between the high and low-order approximations to the prediction error (75) can be used to estimate the error of the integration and validate the underlying assumptions of the algorithm. A breakdown can be declared if this difference exceeds a user-defined threshold.

VI.B. Measurement-Based Update

Figure 3:
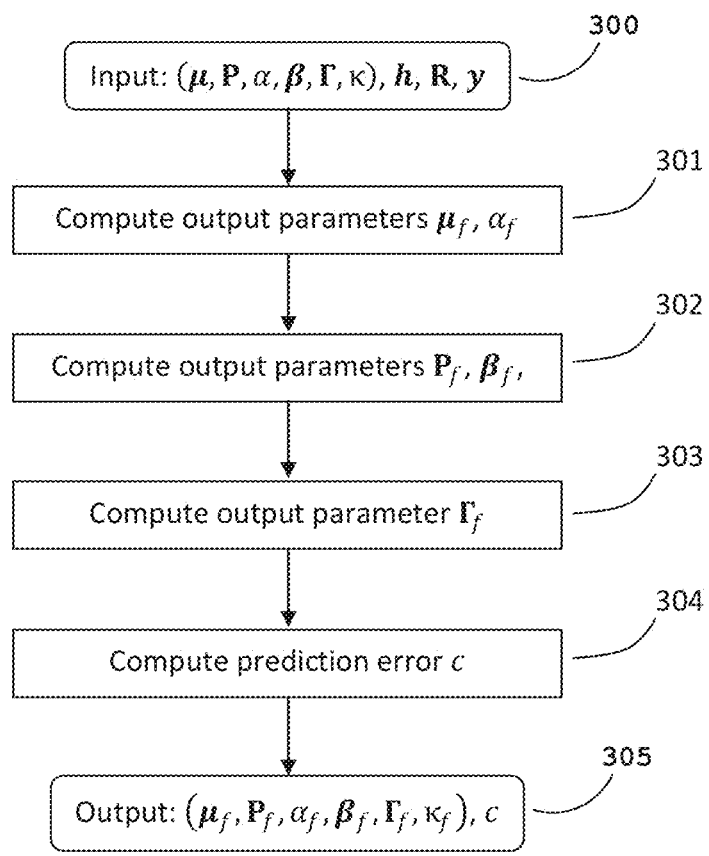
FIG. 3 is a flowchart illustrating an exemplary process for fusing a prior state represented by a Gauss von Mises distribution with an update report, wherein said update is an observation related to the prior by a stochastic measurement model according to one embodiment of the present invention.

FIG. 3 is a flowchart illustrating an exemplary process for fusing a prior state represented by a Gauss von Mises distribution with an update report, wherein said update is an observation related to the prior by a stochastic measurement model according to one embodiment of the present invention. In the case of a measurement-based update, the Bayesian non-linear filter correction step can have four inputs 300:

i. a random vector $(x, \theta) \in \mathbb{R}^n \times \mathbb{S}$, called the prior, distributed as a GVM distribution with parameter set $(\mu, P, \alpha, \beta, \Gamma, \kappa)$, ii. a smooth map h: $\mathbb{R}^n \times \mathbb{S} \to \mathbb{R}^p$, called the measurement model, iii. a random vector $v \in \mathbb{R}^p$, called the measurement error, distributed as a zero-mean multivariate Gaussian random vector with covariance R, and iv. a vector $y \in \mathbb{R}^p$, called the measurement update, hypothesized to be a realization of the random vector $h(x, \theta) + v$.

There are two outputs 305:

i. a random vector $(x, \theta) \in \mathbb{R}^n \times \mathbb{S}$, called the correction, distributed as a GVM distribution with parameter set $(\mu_f, P_f, \alpha_f, \beta_f, \Gamma_f, \kappa_f)$ which characterizes the fusion of the prior with the measurement update, and ii. the prediction error used to score the association of the prior with the measurement update.

The algorithm can have four main steps summarized below:

Compute 301 the components $\mu_f$ and $\alpha_f$ of the output GVM parameter set by solving the least squares problem (81);

Recover 302 the components $P_f$, $\beta_f$, and $\kappa_f$ of the output GVM parameter set from Equation (82);

Compute 303 the component $\Gamma_f$ of the output GVM parameter set by solving the least squares problem (83). If it is believed that the output is well-approximated by a Gaussian, this step can be skipped and one can set $\Gamma_f = 0$; and Evaluate 304 the prediction error integral (84) using a GVM quadrature rule in conjunction with the output from Steps 301-303 and Equation (85).

These four steps are described in more detail below including discussions on theoretical considerations.

VI.B.i. Theoretical Considerations

In a general setting, suppose X and V are random vectors defined on manifolds $\mathcal{M}$ and $\mathcal{N}$, respectively, with respective PDFs $p_{X|I_x}(x|I_x)$ and $p_V(v)$, where $I_x$ denotes any prior information associated with X. Given a smooth map h: $\mathcal{M} \to \mathcal{N}$, define the random vector Y according to $$Y = h(X) + V.$$

The PDF obtained by fusing the information of X with that of a given update $y \in \mathcal{N}$ is defined to be the conditional PDF of X given that Y=y and given the other prior information:

$$p_{X \to Y|I_x}(x|y, I_x) = p_{X|Y, I_x}(x|y, I_x).$$

By Bayes' rule and the preceding definitions, it follows that $$p_{X \to Y}(x \mid y, I_x) = \frac{p_{Y|X, I_x}(y \mid x, I_x) p_{X|I_x}(x \mid I_x)}{p_{Y|I_x}(y \mid I_x)} \quad (77)$$

$$= \frac{1}{c} p_V(y - h(x)) p_{X|I_x}(x \mid I_x),$$

where the normalization c is given by $$c = p_{Y|I_x}(y|I_x) = \int_{\mathcal{M}} p_V(y - h(x)) p_{X|I_x}(x|I_x) dx. \quad (78)$$

The above theoretical considerations are now specialized to the case when the random vectors X and V and the map h are the input described at the beginning of the subsection.

At step 301, the fused (corrected) PDF in $(x, \theta)$ obtained by fusing the prior GVM distribution with the information from the measurement update y is $$p_f(x, \theta) = \frac{1}{c} \mathcal{GVM}(x, \theta; \mu, P, \alpha, \beta, \Gamma, \kappa) \mathcal{N}(y - h(x, \theta); 0, R), \quad (79)$$

where $$c = \int_{\mathbb{R}^n} \int_{-\pi}^{\pi} \mathcal{GVM}(x, \theta; \mu, P, \alpha, \beta, \Gamma, \kappa) \mathcal{N}(y - h(x, \theta); 0, R) d\theta dx. \quad (80)$$

The normalization constant c is what is referred to as the prediction error. The objective is to approximate (79) by a GVM distribution with parameters $(\mu_f, P_f, \alpha_f, \beta_f, \Gamma_f, \kappa_f)$. The mode of this output GVM distribution is $(\mu_f, \alpha_f)$. These parameters can be chosen to coincide with the mode of (79). The computation of the mode can be formulated in terms of a non-linear least squares problem as follows. Define $$q_f(x, \theta) = -\ln p_f(x, \theta) = \frac{1}{2} r(x, \theta)^T r(x, \theta) + k,$$

where k is a constant (independent of x and $\theta$), and $$r(x, \theta) = \begin{bmatrix} z \\ 2\sqrt{\kappa} \sin \frac{1}{2} \phi \\ \xi \end{bmatrix},$$

where $$z = A^{-1}(x - \mu), \phi = \theta - \alpha - \beta^T z - \frac{1}{2} z^T \Gamma z,$$

$$\xi = S^{-1}(h(x, \theta) - y), \hat{\xi} = S^{-T} \xi, R = SS^T.$$

Thus, the parameters $\mu_f$ and $\alpha_f$ can be computed by solving the non-linear least squares problem $$(\mu_f, \alpha_f) = \operatorname*{argmax}_{x, \theta} p_f(x, \theta) = \operatorname*{argmin}_{x, \theta} \frac{1}{2} r(x, \theta)^T r(x, \theta). \quad (81)$$

At step 302, the parameters $P_f$, $\beta_f$, and $\kappa_f$ of the output GVM distribution can be recovered from the osculating Gaussian of (79) in analogy to the derivation of Equation (24) in Section III.H. Specifically, $$\begin{bmatrix} A_f^{-T}(I + \kappa_f \beta_f \beta_f^T) A_f^{-1} & -\kappa_f A_f^{-T} \beta_f \\ -\kappa_f \beta_f^T A_f^{-1} & \kappa_f \end{bmatrix} = \partial_x^2 q_f(\mu_f, \alpha_f), \quad (82)$$

where $P_f = A_f A_f^T$ and $x = (x, \theta)$. Analytic expressions for the second derivatives of $q_f$ are given by $$\partial_x^2 q_f(x, \theta) = \partial_x r(x, \theta)^T \partial_x r(x, \theta) + \sum_{i=1}^{n+1+p} r_i(x, \theta) \partial_x^2 r_i(x, \theta),$$

where $r_i(x, \theta)$ denotes the i-th component of the residual $r(x, \theta)$. The Jacobian of r with respect to $\chi$ is $$\partial_x r(x,\theta) = \begin{bmatrix} A^{-1} & 0 \\ -\sqrt{\kappa}\cos\frac{1}{2}\phi(\beta+\Gamma z)^T A^{-1} & \sqrt{\kappa}\cos\frac{1}{2}\phi \\ S^{-1}\partial_x h(x,\theta) & S^{-1}\partial_\theta h(x,\theta) \end{bmatrix}.$$

For the second derivatives, it is first noted that $\partial_x^2 r_i(x,\theta) = \partial_x^2 z_i = 0$, for $i=1, \ldots, n$. For $i=n+1$, $$\partial_x^2\left(2\sqrt{\kappa}\sin\frac{1}{2}\phi\right) =$$

$$\sqrt{\kappa}\begin{bmatrix} -A^{-T}\begin{bmatrix} \cos\frac{1}{2}\phi\Gamma + \\ \frac{1}{2}\sin\frac{1}{2}\phi(\beta+\Gamma z)(\beta+\Gamma z)^T \end{bmatrix} A^{-1} & \frac{1}{2}\sin\frac{1}{2}\phi A^{-T}(\beta+\Gamma z) \\ \frac{1}{2}\sin\frac{1}{2}\phi(\beta+\Gamma z)^T A^{-1} & -\frac{1}{2}\sin\frac{1}{2}\phi \end{bmatrix}.$$

Finally, for $r_i = \xi_i$, $$\sum_{i=n+2}^{n+1+p} r_i(x,\theta)\partial_x^2 r_i(x,\theta) = \sum_{j=1}^p \xi_j\partial_x^2 \xi_j = \sum_{j=1}^p \xi_j \partial_x^2 h_j(x,\theta).$$

These partial derivatives are also useful if solving the optimization problem (81) in Step 301 using Gauss-Newton or full Newton iterations.

At step 303, in the space surveillance tracking problem, the prior GVM distribution used as an input to this algorithm can be significantly non-Gaussian characterized by "banana" or "boomerang" shaped level sets and with a parameter matrix $\Gamma$ possessing non-negligible components. This "non-Gaussianity" in the input is often induced from the propagation of another GVM distribution under the non-linear dynamics of the two-body problem. Further, in this application, the measurement update can often be a radar, electro-optical, or infrared sensor observation where the corresponding measurement model is the map from (equinoctial orbital element) state space to the sensor space coordinates. Upon performing the Bayesian correction step with this input, it is often found that the corrected (fused) distribution collapses to something which is nearly Gaussian. In other words, $\|\Gamma_f\| \approx 0$. In general, if it is believed that the output is well-approximated by a Gaussian, this step can be skipped and one can set $\Gamma_f = 0$. Regardless of whether this step is executed, some insight on how to validate the realism of the corrected GVM distribution compared to the actual corrected PDF are provided in the discussions at the end of Step 304.

Let $\tilde{\Gamma}_f$ be an approximation to $\Gamma_f$ and initially set $\tilde{\Gamma}_f = 0$. In this step, the approximation $\tilde{\Gamma}_f$ can be refined by solving a non-linear least squares problem, in analogy to Step 104 of the uncertainty propagation algorithm in Section V.C. Using the exact expression for the corrected (fused) PDF $p_f(x,\theta)$ given by (79) and the approximation given by $$p_a(x,\theta) = \mathcal{M}(x,\theta;\mu_f, P_f, \alpha_f, \beta_f, \hat{\Gamma}_f, \kappa_f),$$

the approximation of $\tilde{\Gamma}_f$ is improved by "matching" $p_a$ and $p_f$ at the N quadrature nodes $\{(x_{\sigma_i}, \theta_{\sigma_i})\}_{i=1}^N$ of the GVM distribution with parameter set $(\mu_f, P_f, \alpha_f, \beta_f, \tilde{\Gamma}_f, \kappa_f)$. These sigma points are defined from either the third, fifth, or higher-order GVM quadrature rules derived in Sections IV.A, IV.B, and IV.C, respectively. It is noted that $$x_{\sigma_i} = \mu_f + A_f z_{\sigma_i},\ \theta_{\sigma_i} = \phi_{\sigma_i} + \alpha_f + \beta_f^T z_{\sigma_i} + \tfrac{1}{2} z_{\sigma_i}^T \tilde{\Gamma}_f z_{\sigma_i},$$

for $i=1, \ldots, N$, where $\{(z_{\sigma_i}, \phi_{\sigma_i})\}_{i=1}^N$ are the quadrature nodes corresponding to the canonical GVM distribution. One way to perform this matching procedure is to study the overdetermined system of algebraic equations $$p_f(x_{\sigma_i},\theta_{\sigma_i}) = p_a(x_{\sigma_i},\theta_{\sigma_i}),\ i=1,\ldots,N,$$

in $\hat{\Gamma}_f$. Instead, the analogous equations in 'log space' are used by defining $$\ell_f(x,\theta) = -2\ln\left[\frac{p_f(x,\theta)}{p_f(\mu_f,\alpha_f)}\right],\ \ell_a(x,\theta) = -2\ln\left[\frac{p_a(x,\theta)}{p_a(\mu_f,\alpha_f)}\right].$$

It follows that $$\ell_f(x,\theta) = M(x,\theta;\mu,P,\alpha,\beta,\Gamma,\kappa) + (y-h(x,\theta))^T R^{-1}(y-h(x,\theta)) - M(\mu_f;\alpha_f;\mu,P,\alpha,\beta,\Gamma,\kappa) - (y-h(\mu_f,\alpha_f))^T R^{-1}(y-h(\mu_f,\alpha_f)),$$

$$\ell_a(x,\theta) = M(x,\theta;\mu_f, P_f, \alpha_f, \mu_f, P_f, \alpha_f, \beta_f, \hat{\Gamma}_f, \kappa_f),$$

where M is the Mahalanobis von Mises statistic (26). The overdetermined system of algebraic equations $$\ell_f(x_{\sigma_i},\theta_{\sigma_i}) = \ell_a(x_{\sigma_i},\theta_{\sigma_i}),\ i=1,\ldots,N,$$

is solved for $\hat{\Gamma}_f$ in the least squares sense. This leads to the optimization problem $$\Gamma_f = \underset{\hat{\Gamma}_f}{\mathrm{argmin}} \sum_{i=1}^n \left[r_i(\hat{\Gamma}_f)\right]^2 \text{ subject to } \hat{\Gamma}_f^T = \hat{\Gamma}_f, \qquad (83)$$

where $$r_i(\hat{\Gamma}_f) = \xi_{\sigma_i}^T \xi_{\sigma_i} + 4\kappa\sin^2\frac{1}{2}\eta_{\sigma_i} + v_{\sigma_i}^T v_{\sigma_i} -$$

$$\xi_f^T \xi_f - 4\kappa\sin^2\frac{1}{2}\eta_f - v_f^T v_f - z_{\sigma_i}^T z_{\sigma_i} - 4\kappa_f \sin^2\frac{1}{2}\phi_{\sigma_i},$$

and $$\xi_{\sigma_i} = S^{-1}(h(x_{\sigma_i},\theta_{\sigma_i}) - y),\ \xi_f = S^{-1}(h(\mu_f,\alpha_f) - y),\ R = SS^T,$$

$$v_{\sigma_i} = A^{-1}(x_{\sigma_i} - \mu) = A^{-1}(\mu_f - \mu + A_f z_{\sigma_i}),\ v_f = A^{-1}(\mu_f - \mu),$$

$$\eta_{\sigma_i} = \theta_{\sigma_i} - \Theta(x_{\sigma_i}) =$$

$$\phi_{\sigma_i} + \alpha_f + \beta_f^T z_{\sigma_i} + \tfrac{1}{2} z_{\sigma_i}^T \hat{\Gamma}_f z_{\sigma_i} - \left(\alpha + \beta^T v_{\sigma_i} + \tfrac{1}{2} v_{\sigma_i}^T \Gamma v_{\sigma_i}\right),$$

$$\eta_f = \alpha_f - \left(\alpha + \beta^T v_f + \tfrac{1}{2} v_f^T \Gamma v_f\right).$$

It is noted that only the first two terms in the residuals $r_i$, namely $\xi_{\sigma_i}^T \xi_{\sigma_i}$ and $4\kappa \sin^2 \tfrac{1}{2}$ depend on $\hat{\Gamma}_f$. The other terms can be pre-computed once. In solving the non-linear least squares problem (83), the starting iteration $\hat{\Gamma}_f = 0$ is used. It is also useful to note the partial derivatives of $r_i$:

$$\frac{\partial r_i}{\partial \hat{\Gamma}_f} = (\xi_{\sigma_i}^T S^{-1} \partial_\theta h(x_{\sigma_i}, \theta_{\sigma_i}) + \kappa \sin\eta_{\sigma_i}) z_{\sigma_i} z_{\sigma_i}^T.$$

At step 304, using the GVM distribution with parameter set $(\mu_f, P_f, \alpha_f, \beta_f, \Gamma_f, \kappa_f)$ computed from Steps 301-303, the prediction error c given by (80) can be expressed in the form $$c = k \int_{\mathbb{R}^n} \int_{-\pi}^{\pi} \mathcal{GVM}(x,\theta;\mu_f, P_f, \alpha_f, \beta_f, \Gamma_f, \kappa_f) f(x,\theta) d\theta dx, \qquad (84)$$

where $$k = \frac{2\pi e^{-\kappa_f} I_0(\kappa_f)}{2\pi e^{-\kappa} I_0(\kappa)} \cdot \left[\frac{\det(2\pi P_f)}{\det(2\pi P)\det(2\pi R)}\right]^{1/2}$$

and $$f(x,\theta) = \exp\left[-\tfrac{1}{2}z^T z + \tfrac{1}{2} z_f^T z_f - \tfrac{1}{2}\xi^T \xi - \right.$$

-continued
$$2\kappa\sin^2\frac{1}{2}(\theta-\Theta(x))+2\kappa_f\sin^2\frac{1}{2}(\theta-\Theta_f(x))\bigg],$$

$$z=A^{-1}(x-\mu),\ z_f=A_f^{-1}(x-\mu_f),\ \xi=S^{-1}(h(x,\theta)-y),\ R=SS^T,$$

$$\Theta(x)=\alpha+\beta^T z+\frac{1}{2}z^T\Gamma z,\ \Theta_f(x)=\alpha_f+\beta_f^T z_f+\frac{1}{2}z_f^T\Gamma_f z_f.$$

The framework of Gauss von Mises quadrature, as developed in Section IV, is applicable to the evaluation of the integral in (84). If $\{(z_{o_i},\phi_{o_i})\}_{i=1}^N$ and $\{w_{o_i}\}_{i=1}^N$ are the quadrature nodes and weights for the canonical GVM distribution, then it follows that $$c\approx k\sum_{i=1}^N w_{\sigma_i}f_{\sigma_i},$$

where $$f_{\sigma_i}=\exp\bigg[-\frac{1}{2}v_{\sigma_i}^T v_{\sigma_i}+\frac{1}{2}z_{\sigma_i}^T z_{\sigma_i}-\frac{1}{2}\xi_{\sigma_i}^T\xi_{\sigma_i}-2\kappa\sin^2\frac{1}{2}\eta_{\sigma_i}+2\kappa_f\sin^2\frac{1}{2}\phi_{\sigma_i}\bigg],$$

and the definitions of $v_{o_i}$, $\xi_{o_i}$, and $\eta_{o_i}$ are provided in Step 303 following Equation (83).

As noted in the case of full state update, the evaluation of the prediction error integral (84) using different order GVM quadrature rules allows the operator to assess when the fused PDF (79) is not well-represented by a GVM distribution with the parameter set $(\mu_f, P_f, \alpha_f, \beta_f, \Gamma_f, \kappa_f)$. Indeed, the approximation (85) to the prediction error is exact if the fused PDF (79) is identically a GVM distribution. In such a case, the function $f(x,\theta)$ in (84) can be a constant. Hence, the prediction error integral can be evaluated exactly using any GVM quadrature rule. For example, using a trivial first-order GVM quadrature rule leads to $$c_1=k\exp\bigg[-\frac{1}{2}v_f^T v_f-\frac{1}{2}\xi_f^T\xi_f-2\kappa\sin^2\frac{1}{2}\eta_f\bigg],$$

where $v_f$, $\xi_f$, and $\eta_f$ are the auxiliary quantities defined following Equation (83). (The subscript '1' underneath c implies the use of a first-order GVM quadrature rule.) Similarly, one can evaluate (84) using a third-order quadrature method in conjunction with Equations (85). The (absolute or relative) difference between the high and low-order approximations to the prediction error (84) can be used to estimate the error of the integration and validate the underlying assumptions of the algorithm. A breakdown can be declared if this difference exceeds a user-defined threshold.

Stated another way, updating a predicted location of an object in a multi-dimensional space having a plurality of (n+1) dimensions can comprise reading a first probability density function representing a first location of the object on a cylindrical manifold ($\mathbb{R}^n\times\mathbb{S}$) of the multi-dimensional space. A second probability density function representing a second location of the object on the cylindrical manifold of the multi-dimensional space can be received. The first probability density function can be fused with the second probability density function to form a third probability density function representing a third location of the object on the cylindrical manifold of the multi-dimensional space. The third probability density function can be provided as an indication of the updated predicted location of the object in the multi-dimensional space.

More specifically, each of the first, second, and third probability density functions can be represented by Gauss von Mises distributions defined on the manifold $\mathbb{R}^n\times\mathbb{S}$. The first Gauss von Mises distribution can be represented by the parameter set $(\mu_1, P_1, \alpha_1, \beta_1, \Gamma_1, \kappa_1)$, the second Gauss von Mises distribution can be represented by the parameter set $(\mu_2, P_2, \alpha_2, \beta_2, \Gamma_2, \kappa_2)$, and the third Gauss von Mises distribution can be represented by the parameter set $(\mu_f, P_f, \alpha_f, \beta_f, \Gamma_f, \kappa_f)$. The parameters $\mu_f, P_f, \alpha_f, \beta_f, \Gamma_f, \kappa_f$ can be calculated 201 from analytical algebraic and trigonometric expressions. In some cases, a prediction error can be computed 202 using a Gauss von Mises quadrature rule of a chosen order of accuracy. In a SSA application, at least one of the first or the second Gauss von Mises distributions can be generated from pluralities of radar, electro-optical, or infrared sensor observations. In various cases, at least one of the first or the second Gauss von Mises distributions can be generated from Gaussian distributions defined on manifold $\mathbb{R}^{n+1}$. The second probability density function can comprise an observation. In such cases, the observation can be related to the first probability density function by a stochastic measurement model, and each of the probability density functions can be defined on a n+1 dimensional cylindrical manifold ($\mathbb{R}^n\times\mathbb{S}$).

In one embodiment, the first and third probability density functions can be represented by Gauss von Mises distributions defined on the manifold $\mathbb{R}^n\times\mathbb{S}$. In such cases, the first probability density function can be represented by the parameter set $(\mu, P, \alpha, \beta, \Gamma, \kappa)$ and the third probability density function can be represented by the parameter set $(\mu_f, P_f, \alpha_f, \beta_f, \Gamma_f, \kappa_f)$. The second probability density function can be a vector ($y\in\mathbb{R}^p$) hypothesized to be a realization of a random vector ($h(x,\theta)+v$), where h: $\mathbb{R}^n\times\mathbb{S}\rightarrow\mathbb{R}^p$ and v is a zero-mean p-dimensional Gaussian random vector with covariance matrix R. The parameters $\mu_f$ and $\alpha_f$ can be computed 301 by solving a non-linear least squares problem and the parameters $P_f$, $\beta_f$, and $\kappa_f$ can be computed 302 from analytical algebraic expressions. The parameter $\Gamma_f$ can be computed 303 by solving a non-linear least squares problem and, in some cases, a prediction error can be computed 304 using a Gauss von Mises quadrature rule of a chosen order of accuracy. In a SSA application, the first Gauss von Mises distribution can be generated from a plurality of radar, electro-optical, or infrared sensor observations. In some cases, the first Gauss von Mises distribution can be generated from a Gaussian distribution defined on the manifold $\mathbb{R}^{n+1}$.

VII. Batch Processing

Sequential non-linear filtering, the focus of the previous two sections, entails updating the system state recursively using multiple uncertainty propagation (prediction) and data fusion (correction) operations within a Bayesian framework. This section considers the batch filtering problem which processes a sequence of reports simultaneously to produce a probability density function (PDF) of the system state conditioned on the reports. Such batch processing capabilities can be used for track initiation or orbit determination to produce a prior PDF of the system state which can be subsequently passed to a sequential filter.

For a system state defined on a cylindrical manifold, such as a space object's equinoctial orbital element state, a Bayesian maximum a posteriori framework can be used to generate a Gauss von Mises (GVM) distribution representing the state conditioned on a sequence of reports. The input reports can be either (i) GVM distributions in the same state space or (ii) observations each related to the system state by a stochastic measurement model. When specialized to two-body dynamics in orbital mechanics, the new batch processing capability using the GVM distribution can extend the sequential differential correction (SEQDC) and batch differential correction (BATCHDC) algorithms in the Astrodynamics Standards software suite maintained by Air Force Space Command. SEQDC and BATCHDC are the analogous algorithms for Cases (i) and (ii), respectively, and produce a Gaussian PDF of the orbital state conditioned on the reports. The complete algorithm descriptions for Cases (i) and (ii) are provided in Subsections VII.A and VII.B, respectively, with respective block diagrams provided in FIGS. 4 and 5.

VII.A. Full State Reports

Figure 4:
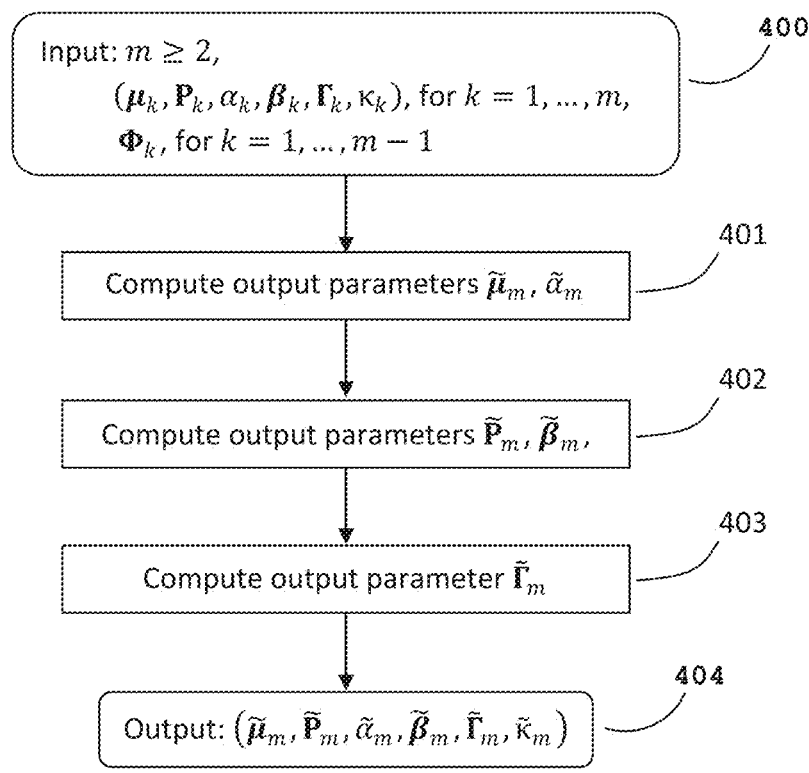
FIG. 4 is a flowchart illustrating an exemplary process for generating a Gauss von Mises distribution from a plurality of reports, wherein said reports are Gauss von Mises distributions according to one embodiment of the present invention.

FIG. 4 is a flowchart illustrating an exemplary process for generating a Gauss von Mises distribution from a plurality of reports, wherein said reports are Gauss von Mises distributions according to one embodiment of the present invention. In the case of full state reports, the batch processing algorithm can have the following inputs 400:

i. a sequence of mutually independent random vectors $(x_k, \theta_k) \in \mathbb{R}^n \times \mathbb{S}$, for $k=1, \ldots, m$, called the reports, each distributed as a GVM distribution with respective parameter set $(\mu_k, P_k, \alpha_k, \beta_k, \Gamma_k, \kappa_k)$; and ii. a sequence of diffeomorphisms $\Phi_k: \mathbb{R}^n \times \mathbb{S} \to \mathbb{R}^n \times \mathbb{S}$, for $k=1, \ldots, m-1$.

The output 404 can be a random vector $(x_m, \theta_m) \in \mathbb{R}^n \times \mathbb{S}$, distributed as a GVM distribution with parameter set $(\tilde{\mu}_m, \tilde{P}_m, \tilde{\alpha}_m, \tilde{\beta}_m, \tilde{\Gamma}_m, \tilde{\kappa}_m)$ which characterizes the "fusion" of the m-th report with the first m−1 reports subject to the constraints $$(x_{k+1}, \theta_{k+1}) = \Phi_k(x_k, \theta_k),$$

for $k=1, \ldots, m-1$. The algorithm can have three main steps summarized below:

Compute 401 the components $\tilde{\mu}_m$ and $\tilde{\alpha}_m$ of the output GVM parameter set by solving the least squares problem (90);

Recover 402 the components $\tilde{P}_m, \tilde{\beta}_m$, and $\tilde{\kappa}_m$ of the output GVM parameter set from Equation (91); and Compute 403 the component $\tilde{\Gamma}_m$ of the output GVM parameter set by solving the least squares problem (93). If it is believed that the output is well-approximated by a Gaussian, this step can be skipped and one can set $\tilde{\Gamma}_m = 0$.

These three steps are described in more detail below including discussions on theoretical considerations and a precise statistical definition of what is meant by "fusion" in the sense of the output.

VII.A.i. Theoretical Considerations

In a general setting, suppose for $k=1, \ldots, m$ that $X_k$ is a random vector defined on a manifold $\mathcal{M}$ with PDF $p_{X_k|I_k}(x_k|I_k)$, where $I_k$ denotes any prior information association with $X_k$. Let $\mathcal{I}_m = (I_1, \ldots, I_m)$. The joint PDF of $X_1, \ldots, X_m$ (conditioned on $\mathcal{I}_m$) can be denoted by $$p_{X_1, \ldots, X_m | \mathcal{I}_m}(x_1, \ldots, x_m | \mathcal{I}_m).$$

The conditional PDF of $X_m$ given $X_k = x_k$, for $k=1, \ldots, m-1$, and given the prior information $\mathcal{I}_m$ can be denoted by $$p_{X_m | X_1, \ldots, X_{m-1}, \mathcal{I}_m}(x_m | x_1, \ldots, x_{m-1}, \mathcal{I}_m).$$

Let $\Phi_k: \mathcal{M} \to \mathcal{M}$, for $k=1, \ldots, m-1$, be a sequence of diffeomorphisms with corresponding actions $$x_{k+1} = \Phi_k(x_k), k=1, \ldots, m-1,$$

and let $\Psi_k$ denote the inverse of $\Phi_k$ so that $$x_k = \Psi_k(x_{k+1}), k=1, \ldots, m-1.$$

Further, for $k=1, \ldots, m-1$, define the composition maps $$\Xi_{m-k} = \Psi_{m-k} \circ \Psi_{m-k+1} \circ \ldots \circ \Psi_{m-1}, \quad (86)$$

with corresponding actions $$x_{m-k} = \Xi_{m-k}(x_m), k=1, \ldots, m-1.$$

For notational convenience, $\Xi_m$ denotes the identity map.

The PDF obtained by fusing the m-th report with the first m−1 reports can be defined to be the conditional PDF of $X_m$ given $X_k = \Xi_k$, for $k=1, \ldots, m-1$, and given the other prior information $\mathcal{I}_m$:

$$p_f(x_m | \mathcal{I}_m) = p_{X_m | X_1, \ldots, X_{m-1}, \mathcal{I}_m}(x_m | \Xi_1(x_m), \ldots, \Xi_{m-1}(x_m), \mathcal{I}_m).$$

By the definition of conditional probability, $$p_f(x_m | \mathcal{I}_m) = \frac{1}{c} p_{X_1, \ldots, X_m | \mathcal{I}_m}(\Xi_1(x_m), \ldots, \Xi_m(x_m) | \mathcal{I}_m), \quad (87)$$

where the normalization constant c is given by $$c = p_{X_1, \ldots, X_{m-1} | \mathcal{I}_m}(\Xi_1(x_m), \ldots, \Xi_{m-1}(x_m) | \mathcal{I}_m) \quad (88)$$

$$= \int_\infty p_{X_1, \ldots, X_m | \mathcal{I}_m}(\Xi_1(x_m), \ldots, \Xi_m(x_m) | \mathcal{I}_m) dx_m.$$

Additionally, if (i) the sequence of random vectors $X_1, \ldots, X_m$ are mutually independent given the prior information $\mathcal{I}_m$ and (ii) for $k=1, \ldots, m$, $X_k$ is independent of $I_1, \ldots, I_{k-1}$, $I_{k+1}, \ldots, I_m$ given $I_k$, then (87) and (88) simplify to $$p_f(x_m | \mathcal{I}_m) = \frac{1}{c} \prod_{k=1}^m p_{X_k | I_k}(\Xi_k(x_m) | I_k), \quad c = \int_\infty \prod_{k=1}^m p_{X_k | I_k}(\Xi_k(x_m) | I_k) dx_m.$$

The above theoretical considerations and independence assumptions can now be specialized to case when the random vectors $X_1, \ldots, X_m$ are the input described at the beginning of the subsection (and $I_1, \ldots, I_m$ denote any prior information used to construct their respective parameter sets).

VII.A.ii. Algorithm Description

At step 401, given the input defined at the beginning of the subsection, the fused PDF in $(x_m, \theta_m)$ is $$p_f(x_m, \theta_m) = \frac{1}{c} \prod_{k=1}^m \mathcal{GVM}(\Xi_k(x_m, \theta_m); \mu_k, P_k, \alpha_k, \beta_k, \Gamma_k, \kappa_k), \quad (89)$$

where c is a normalization constant and the $\Xi_k$, for $k=1, \ldots, m$, are the composition maps defined in (86). The objective can be to approximate (89) by a GVM distribution with parameters $(\tilde{\mu}_m, \tilde{P}_m, \tilde{\alpha}_m, \tilde{\beta}_m, \tilde{\Gamma}_m, \tilde{\kappa}_m)$. The mode of this output GVM distribution is $(\tilde{\mu}_m, \tilde{\alpha}_m)$. These parameters can be chosen to coincide with the mode of (89). The computation of the mode can be formulated in terms of a non-linear least squares problem as follows. Define $$q_f(x_m, \theta_m) = -\ln p_f(x_m, \theta_m) = \frac{1}{2} r(x_m, \theta_m)^T r(x_m, \theta_m) + k,$$

where k is a constant (independent of $x_m$ and $\theta_m$), and $$r(x_m, \theta_m) = \begin{bmatrix} z_1 \\ 2\sqrt{\kappa_1} \sin \frac{1}{2} \phi_1 \\ \vdots \\ z_m \\ 2\sqrt{\kappa_m} \sin \frac{1}{2} \phi_m \end{bmatrix},$$

where $$z_k = A_k^{-1}(x_k - \mu_k), \phi_k = \theta_k - \alpha_k - \beta_k^T z_k - \frac{1}{2} z_k^T \Gamma_k z_k, (x_k, \theta_k) = \Xi_k(x_m, \theta_m),$$

for $i=1, \ldots, m$. Thus, the parameters $\mu_f$ and $\alpha_f$ are computed by solving the non-linear least squares problem $$(\tilde{\mu}_m, \tilde{\alpha}_m) = \underset{x_m, \theta_m}{\operatorname{argmax}} p_f(x_m, \theta_m) = \underset{x_m, \theta_m}{\operatorname{argmin}} \frac{1}{2} r(x_m, \theta_m)^T r(x_m, \theta_m). \quad (90)$$

At step 402, the parameters $\tilde{P}_m$, $\tilde{\beta}_m$, and $\tilde{\kappa}_m$ of the output GVM distribution can be recovered from the osculating Gaussian of (89) in analogy to Step 302 of the data fusion algorithm in Section VI.B. Specifically, $$\begin{bmatrix} \tilde{A}_m^{-T}(I + \tilde{\kappa}_m \tilde{\beta}_m \tilde{\beta}_m^T)\tilde{A}_m^{-1} & -\tilde{\kappa}_m \tilde{A}_m^{-T}\tilde{\beta}_m \\ -\tilde{\kappa}_m \tilde{\beta}_m^T \tilde{A}_m^{-1} & \tilde{\kappa}_m \end{bmatrix} = \partial_{x_m}^2 q_f(\tilde{\mu}_m, \tilde{\alpha}_m), \quad (91)$$

where $\tilde{P}_m = \tilde{A}_m \tilde{A}_m^T$ and $x_m = (x_m, \theta_m)$. Analytic expressions for the second derivatives of $q_f$ in terms of the derivatives of the maps $\Xi_k$ are given as follows. First, the notation $\Xi_{k\,x}$, $\Xi_{k\,\theta}$, and $\Xi_{k\,i}$, for $i=1,\ldots,n$, is used to express the map $\Xi_k$ in component form according to $$\Xi_k(x_m, \theta_m) = \begin{bmatrix} \Xi_{k\,x}(x_m, \theta_m) \\ \Xi_{k\,\theta}(x_m, \theta_m) \end{bmatrix} = \begin{bmatrix} \Xi_{k\,1}(x_m, \theta_m) \\ \vdots \\ \Xi_{k\,n}(x_m, \theta_m) \\ \Xi_{k\,\theta}(x_m, \theta_m) \end{bmatrix},$$

for $k=1,\ldots,m$. Next, define the auxiliary quantities $$B_k = A_k^{-1}\partial_{x_m}\Xi_{kx}, \quad b_k = \partial_{x_m}\Xi_{k\theta} - B_k^T(\beta_k + \Gamma_k z_k),$$

$$c_k = A_k^{-T} z_k, \quad d_k = A_k^{-T}(\beta_k + \Gamma_k z_k),$$

for $k=1,\ldots,m$. The second derivatives of $q_f$ are given by $$\partial_{x_m}^2 q_f = (\partial_{x_m} r)^T \partial_{x_m} r + \sum_{i=1}^{(n+1)m} r_i \partial_{x_m}^2 r_i,$$

where $r_i$ denotes the i-th component of the residual $r$. The Jacobian of $r$ with respect to $x_m$ is $$\partial_{x_m} r = \begin{bmatrix} B_1 \\ b_1^T \\ \vdots \\ B_m \\ b_m^T \end{bmatrix}.$$

The second derivative terms can be decomposed according to $$\sum_{i=1}^{(n+1)m} r_i \partial_{x_m}^2 r_i = $$

$$\sum_{k=1}^{m}\sum_{i=1}^{n}(z_k)_i \partial_{x_m}^2 (z_k)_i + \sum_{k=1}^{m} 2\sqrt{\kappa_k}\sin\frac{1}{2}\phi_k \partial_{x_m}^2\left(2\sqrt{\kappa_k}\sin\frac{1}{2}\phi_k\right).$$

It follows that $$\sum_{i=1}^{n}(z_k)_i \partial_{x_m}^2 (z_k)_i = \sum_{i=1}^{n}(c_k)_i \partial_{x_m}^2 \Xi_{k\,i},$$

and $$\partial_{x_m}^2\left(2\sqrt{\kappa_k}\sin\frac{1}{2}\phi_k\right) =$$

$$\sqrt{\kappa_k}\left[\cos\frac{1}{2}\phi_k\left(\partial_{x_m}^2 \Xi_{k\,\theta} - B_k^T \Gamma_k B_k - \sum_{i=1}^{n}(d_k)_i \partial_{x_m}^2 \Xi_{k\,i}\right) - \frac{1}{2}\sin\frac{1}{2}\phi_k b_k b_k^T\right].$$

These partial derivatives are also useful if solving the optimization problem (90) in Step 401 using Gauss-Newton or full Newton iterations.

At step 403, let $\tilde{\Gamma}_m$ be an approximation to $\tilde{\Gamma}_m$ and initially set $\tilde{\Gamma}_m=0$. In this step, the approximation $\tilde{\Gamma}_m$ can be refined by solving a non-linear least squares problem, in analogy to Step 104 of the uncertainty propagation algorithm in Section V.C and Step 303 of the data fusion algorithm in Section VI.B. As motivated in the latter, one can elect to skip this step (and set $\tilde{\Gamma}_m=0$) if it is believed that the output is well-approximated by a Gaussian, as might be the case if the underlying application is the space surveillance tracking problem.

Using the exact expression for the fused PDF $p_f(x_m, \theta_m)$ given by (89) and the approximation given by $$p_a(x_m, \theta_m) = \mathcal{M}(x_m, \theta_m; \tilde{\mu}_m, \tilde{P}_m, \tilde{\alpha}_m, \tilde{\beta}_m, \tilde{\Gamma}_m, \tilde{\kappa}_m), \quad (92)$$

the approximation of $\tilde{\Gamma}_m$ is improved by "matching" $p_a$ and $p_f$ at the N quadrature nodes $\{(x_{\sigma_i}, \theta_{\sigma_i})\}_{i=1}^{N}$ of the GVM distribution with parameter set $(\tilde{\mu}_m, \tilde{P}_m, \tilde{\alpha}_m, \tilde{\beta}_m, \tilde{\Gamma}_m, \tilde{\kappa}_m)$. These quadrature nodes are defined from either the third, fifth, or higher-order GVM quadrature rules derived in Sections IV.A, IV.B, and IV.C, respectively. It is noted that $$x_{\sigma_i} = \tilde{\mu}_m + \tilde{A}_m z_{\sigma_i}, \quad \theta_{\sigma_i} = \phi_{\sigma_i} + \tilde{\alpha}_m + \tilde{\beta}_m^T z_{\sigma_i} + \tfrac{1}{2}z_{\sigma_i}^T \tilde{\Gamma}_m z_{\sigma_i},$$

for $i=1,\ldots,N$, where $\{(z_{\sigma_i}, \phi_{\sigma_i})\}_{i=1}^{N}$ are the quadrature nodes corresponding to the canonical GVM distribution. One way to perform this matching procedure is to consider the matching equations in 'log space' by defining $$\ell_f(x_m, \theta_m) = -2\ln\left[\frac{p_f(x_m, \theta_m)}{p_f(\tilde{\mu}_m, \tilde{\alpha}_m)}\right], \quad \ell_a(x_m, \theta_m) = -2\ln\left[\frac{p_a(x_m, \theta_m)}{p_a(\tilde{\mu}_m, \tilde{\alpha}_m)}\right].$$

It follows that $$\ell_f(x_m, \theta_m) = \sum_{k=1}^{m}\begin{bmatrix} M(\Xi_k(x_m, \theta_m); \mu_k, P_k, \alpha_k, \beta_k, \Gamma_k, \kappa_k) - \\ M(\Xi_k(\tilde{\mu}_m, \tilde{\alpha}_m); \mu_k, P_k, \alpha_k, \beta_k, \Gamma_k, \kappa_k) \end{bmatrix},$$

$$\ell_a(x_m, \theta_m) = M(x_m, \theta_m; \tilde{\mu}_m, \tilde{P}_m, \tilde{\alpha}_m, \tilde{\beta}_m, \tilde{\Gamma}_m, \tilde{\kappa}_m),$$

where $M$ is the Mahalanobis von Mises statistic (26). The overdetermined system of algebraic equations $$\ell_f(x_{\sigma_i}, \theta_{\sigma_i}) = \ell_a(x_{\sigma_i}, \theta_{\sigma_i}), \quad i=1,\ldots,N,$$

is solved for $\tilde{\Gamma}_m$ in the least squares sense. This leads to the optimization problem $$\tilde{\Gamma}_m = \underset{\tilde{\Gamma}_m}{\operatorname{argmin}} \sum_{i=1}^{n} [r_i(\tilde{\Gamma}_m)]^2 \text{ subject to } \tilde{\Gamma}_m^T = \tilde{\Gamma}_m, \quad (93)$$

where $$r_i(\tilde{\Gamma}_m) = \sum_{k=1}^{m}\left[v_{k,\sigma_i}^T v_{k,\sigma_i} + 4\kappa_k \sin^2\frac{1}{2}\eta_{k,\sigma_i} - \tilde{v}_k^T \tilde{v}_k - 4\kappa_k \sin^2\frac{1}{2}\tilde{\eta}_k\right] -$$

$$z_{\sigma_i}^T z_{\sigma_i} - 4\tilde{\kappa}_m \sin^2\frac{1}{2}\phi_{\sigma_i},$$

and

-continued $$v_{k,\sigma_i} = A_k^{-1}(\Xi_{k\,x}(x_{\sigma_i},\theta_{\sigma_i}) - \mu_k), \tilde{v}_k = A_k^{-1}(\Xi_{k\,x}(\tilde{\mu}_m,\tilde{\alpha}_m) - \mu_k),$$

$$\eta_{k,\sigma_i} = \Xi_{k\,\theta}(x_{\sigma_i},\theta_{\sigma_i}) - \alpha_k - \beta_k^T v_{k,\sigma_i} - \frac{1}{2}v_{k,\sigma_i}^T \Gamma_k v_{k,\sigma_i},$$

$$\tilde{\eta}_k = \Xi_{k\,\theta}(\tilde{\mu}_m,\tilde{\alpha}_m) - \alpha_k - \beta_k^T \tilde{v}_k - \frac{1}{2}\tilde{v}_k^T \Gamma_k \tilde{v}_k.$$

It is noted that the only terms in the residuals $r_i$ that depend on $\Gamma_m$ are $v_{k,o_i}v_{k,o_i}$ and $4\kappa_k \sin^2 \frac{1}{2}\eta_{k,o_i}$. The other terms can be pre-computed once. In solving the non-linear least squares problem (93), the starting iteration $\Gamma_m=0$ is used. It is also useful to note the partial derivatives of $r_i$:

$$\frac{\partial r_i}{\partial \Gamma_m} = z_{\sigma_i} z_{\sigma_i}^T \sum_{k=1}^{m} \left\{ \begin{array}{c} v_{k,\sigma_i} A_k^{-1} \partial_\theta \Xi_{k\,x}(x_{\sigma_i},\theta_{\sigma_i}) + \kappa_k \sin\eta_{k,\sigma_i} \times \\ [\partial_\theta \Xi_{k\,\theta}(x_{\sigma_i},\theta_{\sigma_i}) - (\beta_k + \Gamma_k z_{\sigma_i})^T A_k^{-1} \partial_\theta \Xi_{k\,x}(x_{\sigma_i},\theta_{\sigma_i})] \end{array} \right\}$$

Optionally, the fidelity of the approximation (92) can be verified by evaluating the normalization constant c using a first and third-order accurate GVM quadrature rule, in analogy to the discussions at the end of the data fusion algorithms in Sections VI.A and VI.B. A breakdown is declared if the (absolute or relative) difference exceeds a user-defined threshold.

VII.B. Measurement-Based Reports

Figure 5:
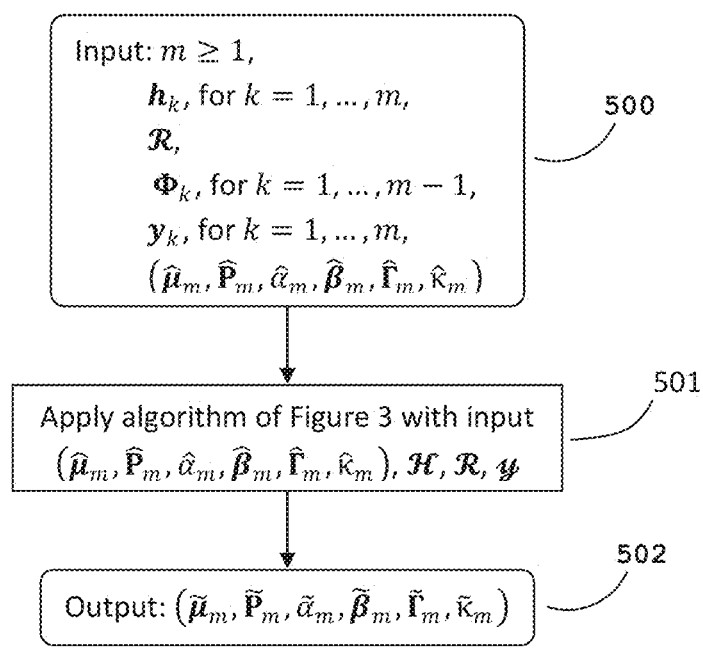
FIG. 5 is a flowchart illustrating an exemplary process for generating a Gauss von Mises distribution from a plurality of reports, wherein said reports are observations related to the state space by a stochastic measurement model according to one embodiment of the present invention.

FIG. 5 is a flowchart illustrating an exemplary process for generating a Gauss von Mises distribution from a plurality of reports, wherein said reports are observations related to the state space by a stochastic measurement model according to one embodiment of the present invention. In the case of measurement-based reports, the batch processing algorithm can have the following inputs 500:

i. a sequence of smooth maps $h_k$: $\mathbb{R}^n \times \mathbb{S} \to \mathbb{R}^p$, called the measurement models, ii. a sequence of random vectors $v_k \in \mathbb{R}^p$, for k=1, ..., m, called the measurement errors, distributed jointly as a zero-mean Gaussian random vector of dimension pm with covariance $\mathcal{R}$, iii. a sequence of diffeomorphisms $\Phi_k$: $\mathbb{R}^n \times \mathbb{S} \to \mathbb{R}^n \times \mathbb{S}$, for k=1, ..., m−1, iv. a sequence of vectors $y_k \in \mathbb{R}^p$, for k=1, ..., m, called the measurements or reports, each hypothesized to be a realization of the respective random vector $h_k(x_k, \theta_k)+v_k$, where the $(x_k, \theta_k)$ are constrained by the relations $(x_{k+1}, \theta_{k+1})=\Phi_k(x_k, \theta_k)$, for k=1, ..., m−1, and v. optionally, a random vector $(\hat{x}_m, \hat{\theta}_m) \in \mathbb{R}^n \times \mathbb{S}$, called the prior, distributed as a GVM distribution with parameter set $(\hat{\mu}_m, \hat{\alpha}_m, \hat{\alpha}_m, \hat{\beta}_m, \hat{\Gamma}_m, \hat{\kappa}_m)$.

The output 502 can be a random vector $(x_m, \theta_n) \in \mathbb{R}^n \times \mathbb{S}$, distributed as a GVM distribution with parameter set $(\mu_m, P_m, \alpha_m, \beta_m, \Gamma_m, \kappa_m)$ which characterizes the "fusion" of the m reports and the optional prior.

In what follows, theoretical considerations are discussed and a precise statistical definition of what is meant by "fusion" in the sense of the output is made. In the process, it is shown that batch processing with measurement-based reports in conjunction with the input listed above reduces to the data fusion algorithm of Section VI.B for a measurement-based update. This is Step 501 in FIG. 5.

VII.B.i. Theoretical Considerations

In a general setting, suppose $X_m$ is a random vector, called the prior, defined on a manifold $\mathcal{M}$ with PDF $p_{X_m|I_m}(x_m|I_m)$, where $I_m$ denotes any prior information associated with $X_m$.

Further, suppose $V_1, \ldots, V_k$ are random vectors each defined on a manifold $\mathcal{N}$ with joint PDF $p_{V_1, \ldots, V_m}(v_1, \ldots, v_m)$. Given a sequence of smooth maps $h_k$: $\mathcal{M} \to \mathcal{N}$, for k=1, ..., m, and a sequence of diffeomorphisms $\Phi_k$: $\mathcal{M} \to \mathcal{M}$, for k=1, ..., m−1, define the sequence of random vectors $Y_k$, for k=1, ..., m, according to $$Y_k = h_k(X_k) + V_k,$$

subject to the constraints $$X_{k+1} = \Phi_k(X_k),$$

for k=1, ..., m−1. Let $\Psi_k$ denote the inverse of $\Phi_k$ so that $$X_k = \Psi_k(X_{k+1}), k=1, \ldots, m-1.$$

Further, for k=1, ..., m−1, define the composition maps $$\Xi_{m-k} = \Psi_{m-k} \circ \Psi_{m-k+1} \circ \ldots \circ \Psi_{m-1}, \quad (94)$$

and let $\Xi_M$ be the identity map. For notational convenience, let $\mathcal{V} = (V_1, \ldots, V_m)$, $X = (X_1, \ldots, X_m)$, $x = (x_1, \ldots, x_m)$, $\mathcal{Y} = (Y_1, \ldots, Y_m)$, and $\mathcal{y} = (y_1, \ldots y_m)$.

The PDF obtained by fusing a sequence of reports $y_1, \ldots, y_m \in \mathcal{N}$ with the prior is defined to be the conditional PDF of $X_m$, given that $Y_k = y_k$, for k=1, ..., m, and given the other prior information $I_m$:

$$p_f(x_m|\mathcal{y}, I_m) = p_{X_m|\mathcal{Y}, I_m}(x_m|\mathcal{y}, I_m).$$

By marginalization, $$p_f(x_m|\mathcal{y}, I_m) = \int p_{X|\mathcal{Y}, I_m}(x|\mathcal{y}, I_m) dx_1 \ldots dx_{m-1}, \quad (95)$$

By Bayes' rule, $$p_{X|Y, I_m}(x|\mathcal{y}, I_m) = \frac{1}{c} p_{Y|X, I_m}(\mathcal{y}|x, I_m) p_{X|I_m}(x|I_m),$$

where $c = p_{\mathcal{Y}|I_m}(\mathcal{y}|I_m)$. From the preceding definitions, it follows that $$p_{Y|X, I_m}(\mathcal{y}|x, I_m) = p_V(y_1 - h_1(x_1), \ldots, y_m - h_m(x_m)),$$

$$p_{X|I_m}(x|I_m) = p_{X_m|I_m}(x_m|I_m) \prod_{k=1}^{m-1} p_{X_k|X_{k+1}, I_m}(x_k|x_{k+1}, I_m)$$

$$= p_{X_m|I_m}(x_m|I_m) \prod_{k=1}^{m-1} \delta(x_k - \Psi_k(x_{k+1})),$$

where '$\delta$' denotes the Dirac delta function. Substituting these expressions into (95) yields $$p_f(x_m|\mathcal{y}, I_m) =$$

$$\frac{1}{c} p_V(y_1 - (h_1 \circ \Xi_1)(x_m), \ldots, y_m - (h_m \circ \Xi_m)(x_m)) p_{X_m|I_m}(x_m|I_m),$$

where the normalization constant c is given by $$c = \int p_V(y_1 - (h_1 \circ \Xi_1)(x_m), \ldots y_m - (h_m \circ \Xi_m)(x_m))$$
$$p_{X_m|I_m}(x_m|I_m) dx_m.$$

If there is no prior information on $X_m$, then the prior PDF $p_{X_m|I_m}(x_m|I_m)$ is removed from the formulation by making the diffuse prior assumption.

The above theoretical considerations are now specialized to the case when the random vectors $X_1, \ldots, X_m$ and $V_1, \ldots, V_m$, the maps $h_1, \ldots, h_m$ and $\Phi_1, \ldots, \Phi_{m-1}$, and the reports $y_1, \ldots, y_m$, are the input described at the beginning of the subsection. It is shown how the algorithm of Section VI.B can be applied to generate the desired output.

VII.B.ii. Algorithm Description

At step 501, given the input defined at the beginning of the subsection, the fused PDF in $(x_m, \theta_m)$ is $$p_f(x_m, \theta_m) = \frac{1}{c} \mathcal{N}(\mathbf{\mathcal{Y}} - \mathbf{\mathcal{H}}(x_m, \theta_m); 0, \mathbf{\mathcal{R}}) \quad (96)$$

$$\mathcal{GVM}(x_m, \theta_m; \hat{\mu}_m, \hat{P}_m, \hat{\alpha}_m, \hat{\beta}_m, \hat{\Gamma}_m, \hat{\kappa}_m),$$

where c is a normalization constant and $$\mathbf{\mathcal{Y}} = \begin{bmatrix} y_1 \\ \vdots \\ y_m \end{bmatrix}, \mathbf{\mathcal{H}} = \begin{bmatrix} h_1 \circ \Xi_i \\ h_m \circ \Xi_m \end{bmatrix}.$$

The composition maps $\Xi_k$, for $k=1, \ldots, m$, can be defined in terms of the input diffeomorphisms $\Phi_1, \ldots, \Phi_{m-1}$ by way of Equations (86).

The objective is to approximate (96) by a GVM distribution with parameter set $(\mu_m, P_m, \alpha_m, \beta_m, \Gamma_m, \kappa_m)$. This is precisely the objective of the data fusion algorithm in Section VI.B for a measurement-based update upon comparing Equations (96) and (79). Indeed, the algorithm of Section VI.B is applicable in this case where the inputs are (i) the prior GVM distribution with parameter set $(\hat{\mu}_m, \hat{P}_m, \hat{\alpha}_m, \hat{\beta}_m, \hat{\Gamma}, \hat{\kappa}_m)$, (ii) the map $\mathcal{H}$ defined above, (iii) the covariance matrix $\mathcal{R}$, and (iv) the vector $\mathbf{\mathcal{Y}}$ defined above. If there is no prior information on the state $(x_m, \theta_m)$ for the first input, then any terms dependent on the prior in the objective function of Equation (81) can be removed.

Stated another way, determining a track of an object through a multi-dimensional space having a plurality of (n+1) dimensions can comprise receiving a plurality of probability density functions including at least one report probability density function. The plurality of probability density functions can be fused to form an output probability density function. Each probability density function can be defined on a n+1 dimensional cylindrical manifold ($\mathbb{R}^n \times \mathbb{S}$), and the probability density functions can be constrained by a plurality of diffeomorphisms from $\mathbb{R}^n \times \mathbb{S}$ to $\mathbb{R}^n \times \mathbb{S}$. The output probability density function can be provided as a representation of the track of the object through the multi-dimensional space.

For example, each of the plurality of probability density functions can comprise a report represented by a Gauss von Mises distribution defined on the manifold $\mathbb{R}^n \times \mathbb{S}$ and the Gauss von Mises distributions can comprise at least a first distribution with a parameter sets $(\mu_k, P_k, \alpha_k, \beta_k, \Gamma_k, \kappa_k)$, and a second distribution with a parameter set $(\tilde{\mu}_m, \tilde{P}_m, \tilde{\alpha}_m, \tilde{\beta}_m, \tilde{\Gamma}_m, \tilde{\kappa}_m)$. In such cases, the parameters $\tilde{\mu}_m$ and $\tilde{\alpha}_m$ can be computed 401 by solving a non-linear least squares problem. The parameters $\tilde{P}_m, \tilde{\beta}_m$, and $\tilde{\kappa}_m$ can be computed 402 from analytical algebraic expressions. The parameter $\tilde{\Gamma}_m$ can be computed 403 by solving a non-linear least squares problem. In a SSA application, one or more of the Gauss von Mises distributions can be generated from pluralities of radar, electro-optical, or infrared sensor observations. one or more of the Gauss von Mises distributions can be generated from Gaussian distributions defined on the manifold $\mathbb{R}^{n+1}$. The diffeomorphisms can be solution flows induced from a system of ordinary differential equations describing two-body dynamics of orbital mechanics for the object.

In another case, the plurality of probability density functions can comprise a first probability density function and at least one report. Each probability density function can be represented by a Gauss von Mises distribution defined on the manifold $\mathbb{R}^n \times \mathbb{S}$. The first Gauss von Mises distribution can be represented by a parameter set comprising $(\hat{\mu}_m, \hat{P}_m, \hat{\alpha}_m, \hat{\beta}_m, \hat{\Gamma}_m, \hat{\kappa}_m)$ and the report Gauss von Mises distributions can be represented by a parameter set comprising $(\mu_m, P_m, \alpha_m, \beta_m, \Gamma M, \kappa_m)$. The report Gauss von Mises distributions can be vectors ($y_k \in \mathbb{R}^p$, for $k=1, \ldots, m$), each hypothesized to be a realization of a random vector ($h(x_k, \theta_k) + v_k$), where $h_k: \mathbb{R}^n \times \mathbb{S} \to \mathbb{R}^p$, for $k=1, \ldots, m$, and $(v_1, \ldots, v_m)$ is a zero-mean pm-dimensional Gaussian random vector with covariance matrix $\mathcal{R}$. In a SSA application, the first Gauss von Mises distribution can be generated from a plurality of radar, electro-optical, or infrared sensor observations. The first Gauss von Mises distribution can be generated from a Gaussian distribution defined on the manifold $\mathbb{R}^{n+1}$. One or more of the reports may also be generated from radar, electro-optical, or infrared sensors. The diffeomorphisms can be solution flows induced from a system of ordinary differential equations describing two-body dynamics of orbital mechanics for the object.

EXAMPLES

In the following, an example is presented to demonstrate embodiments of the present invention. The example is a scenario in low Earth orbit (LEO) which compares the Gauss von Mises (GVM) filter prediction step with that of the extended Kalman filter (EKF), the unscented Kalman filter (UKF), a Gaussian sum filter (GSF), and a particle filter. The accuracy of the GVM uncertainty propagation algorithm is also validated using a metric based on the $L_2$ error. For the specific LEO scenario, it is shown that the GVM filter prediction step properly characterizes the actual uncertainty of a space object's orbital state while simple less sophisticated methods which make Gaussian assumptions (such as the EKF and UKF) do not. Specifically, under the non-linear propagation of two-body dynamics, the new algorithm properly characterizes the uncertainty for up to eight times as long as the standard UKF all at no additional computational cost to the UKF.

In what follows, the particulars of the simulation scenario are defined in Section I and the results are discussed Section II.

I. Scenario Description

This section describes the specific input to the uncertainty propagation algorithm in Section V.C above, how the output is visualized, and how the accuracy of the output is validated.

I.A. Input

The initial GVM distribution of the space object's orbital state (i.e., input (i)) is defined with respect to equinoctial orbital elements (a, h, k, p, q, l) $\in \mathbb{R}^5 \times \mathbb{S}$ with parameter set ($\mu$, P, $\alpha$, $\beta$, $\Gamma$, $\kappa$) given by $$\mu = \begin{bmatrix} 7136.635 \text{ km} \\ 0 \\ 0 \\ 0 \\ 0 \end{bmatrix}, P = \begin{bmatrix} (20 \text{ km})^2 & 0 & 0 & 0 & 0 \\ 0 & 10^{-6} & 0 & 0 & 0 \\ 0 & 0 & 10^{-6} & 0 & 0 \\ 0 & 0 & 0 & 10^{-6} & 0 \\ 0 & 0 & 0 & 0 & 10^{-6} \end{bmatrix},$$

$\alpha = 0, \beta = 0, \Gamma = 0, \kappa = 3.282806 \times 10^7.$

The mode of this distribution describes a circular, non-inclined orbit in LEO with a semi-major axis of 7136.635 km.

This choice of semi-major axis is made so that the instantaneous orbital period of the object is 100 minutes. In subsequent discussions, a time unit of one orbital period is equal to 100 minutes. It is noted that the GVM distribution with the above parameter set is approximately Gaussian (since $\Gamma$=0 and $\kappa$>>1). In particular, the standard deviation in the mean longitude coordinate l is $\sigma_l=1/\sqrt{\kappa}=0.01°=36"$. When validating against the EKF, UKF, or Gaussian sum filter, the osculating Gaussian (22) is used to convert the input GVM distribution to a Gaussian distribution.

The diffeomorphism describing the non-linear transformation (i.e., input (ii)) is the solution flow (47) induced from the system of ordinary differential equations (2) describing the two-body dynamics of orbital mechanics. (See the discussions in Sections I.A and V.A above) The parameters of the diffeomorphism are the epoch time $t_0$ of the input, the final epoch time t, and the specific forces used to model the perturbations. In simulations, $t_0$ is the J2000 epoch (1 Jan. 2000, 12:00 UTC) and $t-t_0$ is varied from 0.5 to 8 orbital periods. The EGM96 gravity model of degree and order 70 is used to model the perturbations. Though one can include additional non-conservative forces such as atmospheric drag, the non-linearities induced by the gravity alone (especially in LEO) are sufficiently strong to stress the algorithm. Moreover, the initial standard deviation in the semi-major axis of 20 km is pessimistic. It is observed that non-Gaussian effects are accelerated for larger initial uncertainties in the semi-major axis. Finally, the numerical integration of the ordinary differential equations is performed using a Gauss-Jackson method.

I.B. Visualization

The output of the uncertainty propagation algorithm in Section V.C. above is a GVM distribution characterizing the uncertainty of the space object's orbital state at a specified future epoch. In order to visualize this six-dimensional probability density function (PDF), the level curves (i.e., curves of equal likelihood) of the two-dimensional (2D) marginal PDF in the semi-major axis a and mean longitude coordinates l are plotted. This choice is made because it is along this particular 2D slice where the greatest departure from "Gaussianity" and the most extreme "banana" or "boomerang" shaped level curves are observed.

In the panels of FIG. 9, n$\sigma$ level curves (of the marginal PDF in the a and l coordinates) are plotted in half-sigma increments starting at n=½ for various final epoch times t. In order to visualize these marginal PDFs which are defined on a cylinder, the cylinder is cut at $\alpha-\pi$ (where $\alpha$ is the $\alpha$ parameter of the propagated GVM distribution) and rolled out to form a 2D plane. This plane is then rotated so that the semi-major and semi-minor axes of the osculating Gaussian covariance are aligned with the horizontal and vertical. (Any such rotation or rescaling does not exaggerate any non-Gaussian effects or the extremity of the boomerang shape because cumulants of order three and higher are invariant under an affine transformation.) Where appropriate, overlays of the level curves generated from the EKF and UKF are also shown. Additionally, the crosses represent particles generated from a Monte-Carlo based particle filter. If the represented PDF properly characterizes the actual uncertainty, then approximately 99.5% of the particles should be contained within the respective 3$a$ level curve.

I.C. Validation

An inspection of the panels in FIG. 9 provides a simple visual means to assess whether the represented uncertainty properly characterizes the actual uncertainty of the space object's orbital state. "Most" of the particles (crosses) should be contained within the level curves. To quantify uncertainty realism more rigorously and hence validate the prediction steps of the different filters under consideration, the normalized $L_2$ error is studied.

For functions $f$, $g$: $\mathcal{M} \to \mathbb{R}$, the normalized $L_2$ error between $f$ and g is the scalar $$\overline{L}_2(f, g) = \frac{\|f - g\|_{L_2}^2}{\|f\|_{L_2}^2 + \|g\|_{L_2}^2},$$

where $\|\cdot\|_{L_2}$ is the $L_2$ norm:

$$\|f\|_{L_2}^2 = \int_{\mathcal{M}} f(x)^2 dx.$$

By non-negativity of the $L_2$ norm, $\overline{L}_2 \geq 0$ with equality if $f=g$ in the $L_2$ sense. By the triangle inequality, $\overline{L}_2 \leq 1$ with equality if $f$ and g are orthogonal in the $L_2$ sense.

Figure 10:
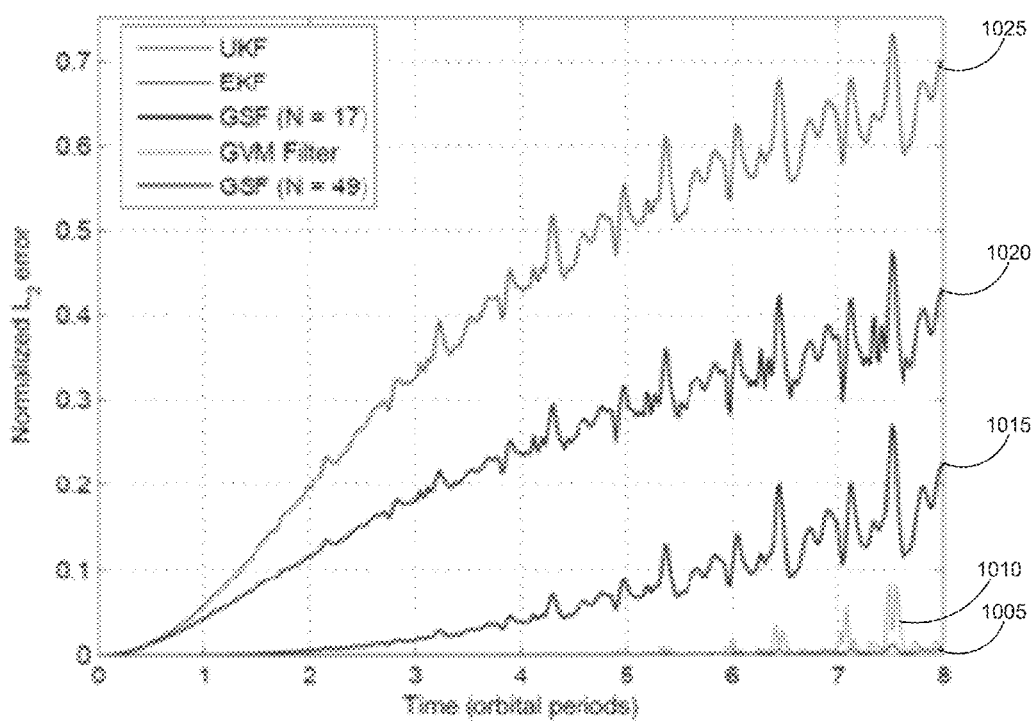
FIG. 10 is a graph showing plots of the normalized $L_2$ error using different methods for uncertainty propagation used in the accompanying EXAMPLE for demonstration according to one embodiment of the present invention.

The validation tests shown in FIG. 10 generate a time history of the normalized $L_2$ error $$\overline{L}_2(p_{approx}(\bullet,t), p_{baseline}(\bullet,t)),$$

where t is the final epoch time. Further, $p_{approx}$(u, t) represents an approximation to the PDF of a space object's orbital state at time t (u represents equinoctial orbital elements) as computed by the prediction step of the GVM filter, EKF, UKF, or a Gaussian sum filter. Moreover, $p_{baseline}$ (u, t) is a high-fidelity approximation to the exact state PDF which serves as a baseline for comparison. This baseline is computed using a high-fidelity GVM mixture distribution using the Gaussian sum refinement scheme of Horwood et al. extended to GVM distributions as described in Section V.F above. Thus, $p_{approx}$ is a good approximation to the actual state PDF if the normalized $L_2$ error between it and the baseline $p_{baseline}$ is zero or "close to zero" for all time.

II. Discussions

As described in Subsection I.B. of the EXAMPLE, the panels in FIGS. 9a-9f show the evolution of a space object's orbital uncertainty (with initial conditions defined in Subsection I.A of the EXAMPLE) computed using the prediction steps of the EKF, UKF, GVM filter, and a particle filter. Each of the six panels of FIGS. 9a-9f shows the respective level curves 925 for EKF, 920 for UKF, and 915 for GVM in the plane of the semi-major axis and mean longitude coordinates at the epochs $t-t_0$=0, 0.5, 1, 2, 4, 8 orbital periods. In each of the six epochs, the level curves 915 produced by the GVM filter correctly capture the actual uncertainty depicted by the particle ensemble. Each set of level curves 915, 920, and 925 is deduced from the propagation of only 13 quadrature nodes (corresponding to a third-order GVM quadrature rule). The computational cost is the same as that of the UKF. For the UKF, its covariance is indeed consistent (realistic) in the sense that it agrees with that computed from the definition of the covariance. Thus, in this scenario, the UKF provides "covariance realism" but clearly does not support "uncertainty realism" since the covariance does not represent the actual banana-shaped uncertainty of the exact PDF. Further, the state estimate produced from the UKF coincides with the mean of the exact PDF. However, the mean is displaced from the mode. Consequently, the probability that the object is within a small neighborhood centered at the UKF state estimate (mean) is essentially zero. The EKF, on the other hand, provides a state estimate coinciding closely with the mode, but the covariance tends to collapse making inflation necessary to begin to cover the uncertainty. In neither the EKF nor UKF case does the covariance actually model the uncertainty. In summary, the GVM filter maintains a proper characterization of the uncertainty, the EKF and UKF do not.

FIG. 10 shows the evolution of the normalized $L_2$ error, as defined in Subsection I.C of the EXAMPLE, computed from the UKF 1025, EKF 1020, the Gaussian sum filter (GSF) with N=17 and N=49 components 1015 and 1005, and the GVM filter 1010. The UKF and EKF quickly break down, but accuracy can be improved by increasing the fidelity of the Gaussian sum. The normalized $L_2$ errors produced from the GVM filter lie between those produced from the 17 and 49-term Gaussian sum. It is noted that the 17-term Gaussian sum requires the propagation of 17×13=221 quadrature nodes. The GVM filter uses 13. In principle, the accuracy of the GVM filter could be further improved by using mixtures of GVM distributions as described in Section V.F above. Notwithstanding these comments, if one deems a normalized $L_2$ error of $\overline{L}_2$=0.05 to signal a breakdown in accuracy, then the UKF and EKF first hit this threshold after about one orbital period. By examining when the normalized $L_2$ error first crosses 0.05 for the GVM filter, it is seen that one can propagate the uncertainty using the GVM filter for about eight times longer than when using an EKF or UKF.

Figure 11:
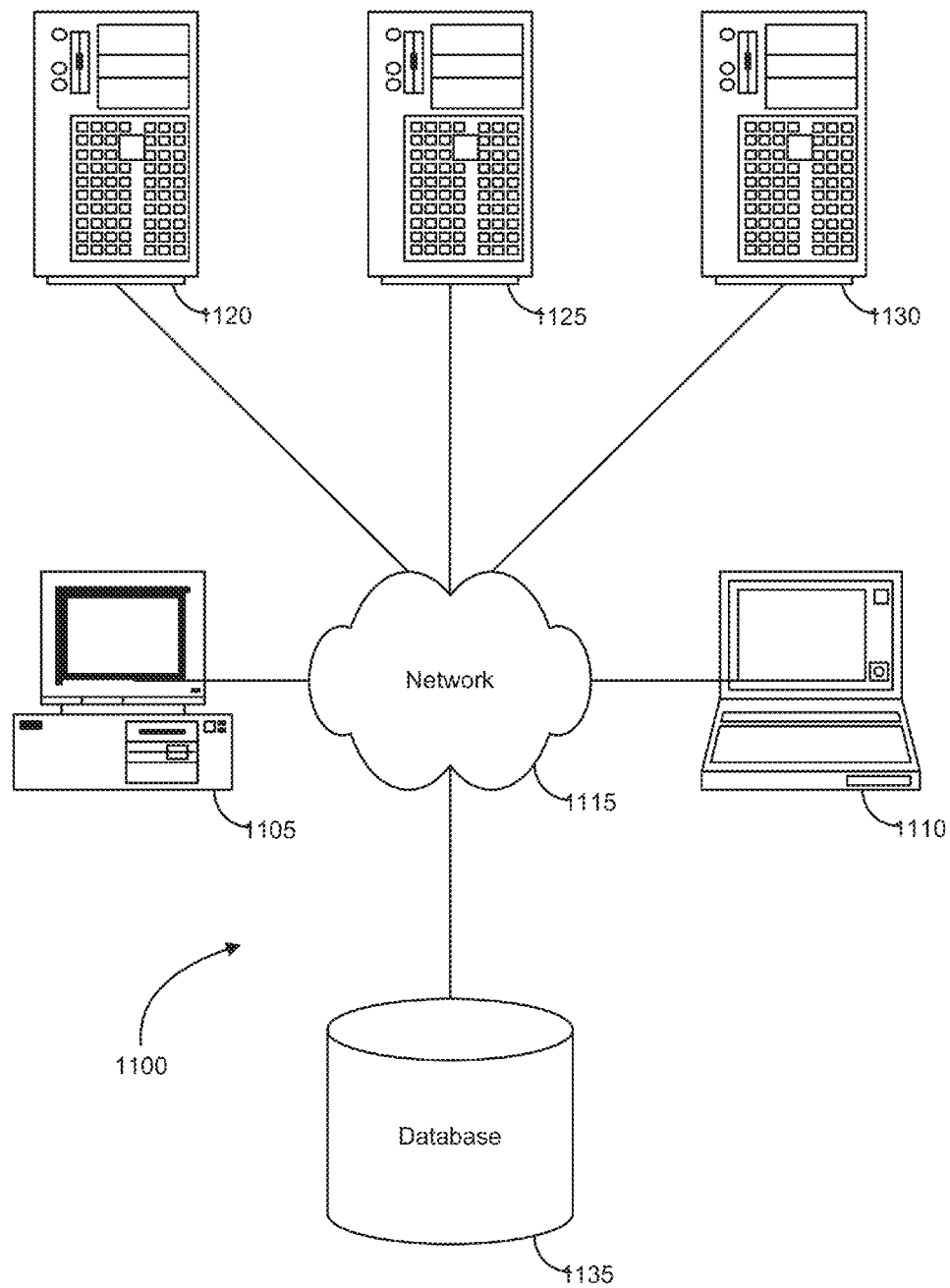
FIG. 11 is a block diagram illustrating components of an exemplary operating environment in which various embodiments of the present invention may be implemented.

FIG. 11 is a block diagram illustrating components of an exemplary operating environment in which various embodiments of the present invention may be implemented. The system 1100 can include one or more user computers 1105, 1110, which may be used to operate a client, whether a dedicate application, web browser, etc. The user computers 1105, 1110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 1105, 1110 may also have any of a variety of applications, including one or more development systems, database client and/or server applications, and web browser applications. Alternatively, the user computers 1105, 1110 may be any other electronic device, such as a thin-client computer, Internet-enabled mobile telephone, and/or personal digital assistant, capable of communicating via a network (e.g., the network 1115 described below) and/or displaying and navigating web pages or other types of electronic documents. Although the exemplary system 1100 is shown with two user computers, any number of user computers may be supported.

In some embodiments, the system 1100 may also include a network 1115. The network can be any type of network familiar to those skilled in the art that can support data communications using any of a variety of commercially-available protocols, including without limitation TCP/IP, SNA, IPX, AppleTalk, and the like. Merely by way of example, the network 1115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 1120, 1125, 1130 which can be general purpose computers and/or specialized server computers (including, merely by way of example, PC servers, UNIX servers, mid-range servers, mainframe computers rack-mounted servers, etc.). One or more of the servers (e.g., 1130) may be dedicated to running applications, such as a business application, a web server, application server, etc. Such servers may be used to process requests from user computers 1105, 1110. The applications can also include any number of applications for controlling access to resources of the servers 1120, 1125, 1130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 1105, 1110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 1105, 1110.

In some embodiments, an application server may create web pages dynamically for displaying on an end-user (client) system. The web pages created by the web application server may be forwarded to a user computer 1105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 1100 may also include one or more databases 1135. The database(s) 1135 may reside in a variety of locations. By way of example, a database 1135 may reside on a storage medium local to (and/or resident in) one or more of the computers 1105, 1110, 1115, 1125, 1130. Alternatively, it may be remote from any or all of the computers 1105, 1110, 1115, 1125, 1130, and/or in communication (e.g., via the network 1120) with one or more of these. In a particular set of embodiments, the database 1135 may reside in a storage-area network ("SAN") familiar to those skilled in the art. Similarly, any necessary files for performing the functions attributed to the computers 1105, 1110, 1115, 1125, 1130 may be stored locally on the respective computer and/or remotely, as appropriate. In one set of embodiments, the database 1135 may be a relational database, such as Oracle 10g, that is adapted to store, update, and retrieve data in response to SQL-formatted commands.

Figure 12:
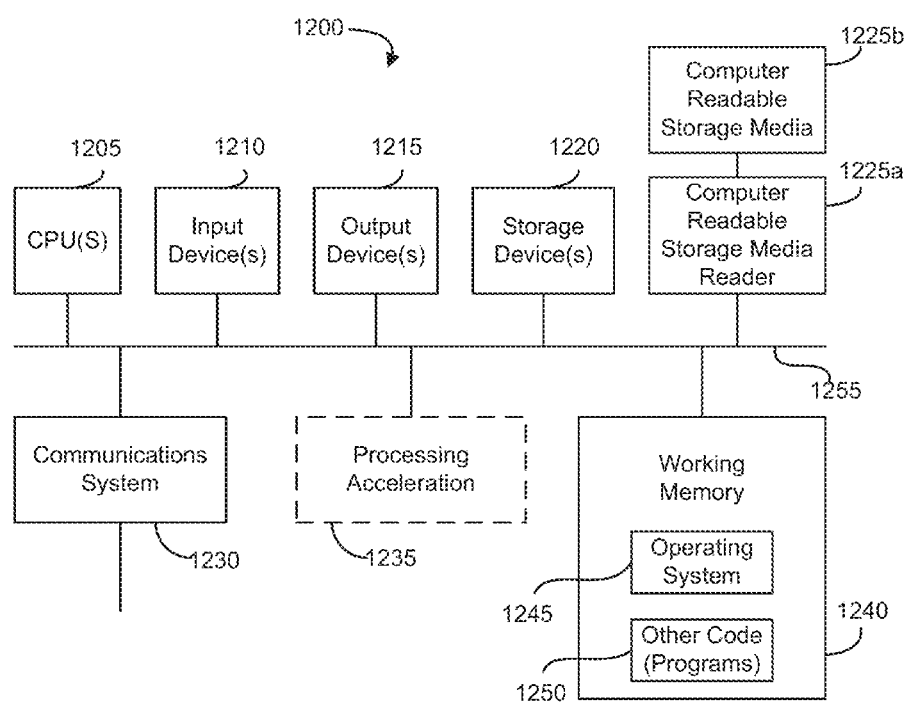
FIG. 12 is a block diagram illustrating an exemplary computer system in which embodiments of the present invention may be implemented.

FIG. 12 illustrates an exemplary computer system 1200, in which various embodiments of the present invention may be implemented. The system 1200 may be used to implement any of the computer systems described above. The computer system 1200 is shown comprising hardware elements that may be electrically coupled via a bus 1255. The hardware elements may include one or more central processing units (CPUs) 1205, one or more input devices 1210 (e.g., a mouse, a keyboard, etc.), and one or more output devices 1215 (e.g., a display device, a printer, etc.). The computer system 1200 may also include one or more storage device 1220. By way of example, storage device(s) 1220 may be disk drives, optical storage devices, solid-state storage device such as a random access memory ("RAM") and/or a read-only memory ("ROM"), which can be programmable, flash-updateable and/or the like.

The computer system 1200 may additionally include a computer-readable storage media reader 1225a, a communications system 1230 (e.g., a modem, a network card (wireless or wired), an infra-red communication device, etc.), and working memory 1240, which may include RAM and ROM devices as described above. In some embodiments, the computer system 1200 may also include a processing acceleration unit 1235, which can include a DSP, a special-purpose processor and/or the like.

The computer-readable storage media reader 1225a can further be connected to a computer-readable storage medium 1225b, together (and, optionally, in combination with storage device(s) 1220) comprehensively representing remote, local, fixed, and/or removable storage devices plus storage media for temporarily and/or more permanently containing computer-readable information. The communications system 1230 may permit data to be exchanged with the network 1220 and/or any other computer described above with respect to the system 1200.

The computer system 1200 may also comprise software elements, shown as being currently located within a working memory 1240, including an operating system 1245 and/or other code 1250, such as an application program (which may be a client application, web browser, mid-tier application, RDBMS, etc.). It should be appreciated that alternate embodiments of a computer system 1200 may have numerous variations from that described above. For example, customized hardware might also be used and/or particular elements might be implemented in hardware, software (including portable software, such as applets), or both. Further, connection to other computing devices such as network input/output devices may be employed. Software of computer system 1200 may include code 1250 for implementing embodiments of the present invention as described herein.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A computer implemented method, comprising fusing a plurality of m≥2 report probability density functions to form an output probability density function, wherein all said probability density functions are defined on a n+1 dimensional cylindrical manifold $\mathbb{R}^n \times \mathbb{S}$, and wherein said reports are constrained by a plurality of diffeomorphisms from $\mathbb{R}^n \times \mathbb{S}$ to $\mathbb{R}^n \times \mathbb{S}$.

2. The method of claim 1, wherein said reports and output probability density functions are represented by Gauss von Mises distributions defined on the manifold $\mathbb{R}^n \times \mathbb{S}$ with respective parameter sets, $(\mu_k, P_k, \alpha_k, \beta_k, \Gamma_k, \kappa_k)$ for k=1, ..., m, and $(\bar{\mu}_m, \tilde{P}_m, \bar{\alpha}_m, \hat{\beta}_m, \bar{\Gamma}_m, \bar{\kappa}_m)$.

3. The method of claim 2, further comprising computing the parameters $\bar{\mu}_m$ and $\bar{\alpha}_m$ by solving a non-linear least squares problem.

4. The method of claim 2, further comprising computing the parameters $\tilde{P}_m$, $\hat{\beta}_m$, and $\bar{\kappa}_m$ from analytical algebraic expressions.

5. The method of claim 2, further comprising computing the parameter $\bar{\Gamma}_m$ by solving a non-linear least squares problem.

6. The method of claim 2, wherein one or more of said report Gauss von Mises distributions are generated from pluralities of radar, electro-optical, or infrared sensor observations.

7. The method of claim 2, wherein one or more of said report Gauss von Mises distributions are generated from Gaussian distributions defined on the manifold $\mathbb{R}^{n+1}$.

8. The method of claim 2, wherein one or more of said report Gauss von Mises distributions are generated by:
receiving an input probability density function defined by a set of parameters ($\mu, P, \alpha, \beta, \Gamma, \kappa$) and representing an uncertainty of the location of the object in a cylindrical multi-dimensional space ($\mathbb{R}^n \times \mathbb{S}$) of the multi-dimensional space and a diffeomorphism ($\Phi$) of the cylindrical multi-dimensional space ($\Phi: \mathbb{R}^n \times \mathbb{S} \to \mathbb{R}^n \times \mathbb{S}$),
generating a transformed probability density function defined by a set of parameters ($\hat{\mu}, \tilde{P}, \hat{\alpha}, \hat{\beta}, \hat{\Gamma}, \hat{\kappa}$) and representing an uncertainty of the location of the object in a cylindrical multi-dimensional space, the transformed probability density function generated from the input probability density function under the diffeomorphism, wherein the input probability density function and the transformed probability density function are both represented by Gauss von Mises distributions defined on the cylindrical multi-dimensional space, and wherein the input Gauss von Mises distribution is generated from a Gaussian distribution defined on the multi-dimensional space, and
providing the set of parameters representing the transformed probability density function as a representation of the predicted location of the object in the multi-dimensional space.

9. The method of claim 2, wherein said diffeomorphisms are solution flows induced from a system of ordinary differential equations describing the two-body dynamics of orbital mechanics.

10. A computer implemented method, comprising fusing a prior probability density function with a plurality of m≥1 reports to form an output probability density function, wherein all said probability density functions are defined on a n+1 dimensional cylindrical manifold $\mathbb{R}^n \times \mathbb{S}$, and wherein said reports are constrained by a plurality of diffeomorphisms from $\mathbb{R}^n \times \mathcal{Y}$ to $\mathbb{R}^n \times \mathbb{S}$.

11. The method of claim 10, wherein said prior and output probability density functions are represented by Gauss von Mises distributions defined on the manifold $\mathbb{R}^n \times \mathbb{S}$ with respective parameter sets $(\hat{\mu}_m, \hat{P}_m, \hat{\alpha}_m, \hat{\beta}_m, \hat{\Gamma}_m, \hat{\kappa}_m)$ and $(\mu_m, P_m, \alpha_m, \beta_m, \Gamma_m, \kappa_m)$, and wherein said reports are vectors $y_k \in \mathbb{R}^p$, for k=1, ..., m, each hypothesized to be a realization of the random vector $h(x_k, \theta_k)+v_k$, wherein $h_k: \mathbb{R}^n \times \mathbb{S} \to \mathbb{R}^p$, for k=1, ..., m, and $(v_1, ..., v_m)$ is a zero-mean pm-dimensional Gaussian random vector with covariance matrix $\mathcal{R}$.

12. The method of claim 11, further comprising computing the parameters $\mu_m, P_m, \alpha_m, \beta_m, \Gamma_m, \kappa_m$ by:
reading, by a computer system, a prior probability density function defined by a set of parameters ($\mu, P, \alpha, \beta, \Gamma, \kappa$)

and representing an uncertainty of the location of the object in a cylindrical multi-dimensional space ($\mathbb{R}^n \times \mathbb{S}$) of the multi-dimensional space and a diffeomorphism ($\Phi$) of the cylindrical multi-dimensional space ($\Phi: \mathbb{R}^n \times \mathbb{S} \to \mathbb{R}^n \times \mathbb{S}$);

generating, by the computer system, a transformed probability density function defined by a set of parameters ($\tilde{\mu}, \tilde{P}, \tilde{\alpha}, \tilde{\beta}, \tilde{\Gamma}, \tilde{\kappa}$) and representing an uncertainty of the location of the object in a cylindrical multi-dimensional space, the transformed probability density function generated from the input probability density function under the diffeomorphism, wherein the input probability density function and the transformed probability density function are both represented by Gauss von Mises distributions defined on the cylindrical multi-dimensional space, and wherein the input Gauss von Mises distribution is generated from a Gaussian distribution defined on the multi-dimensional space; and providing, by the computer system, the set of parameters representing the transformed probability density function as a representation of the predicted location of the object in the multi-dimensional space.

13. The method of claim 11, wherein said prior Gauss von Mises distribution is generated from a plurality of radar, electro-optical, or infrared sensor observations.

14. The method of claim 11, wherein said prior Gauss von Mises distribution is generated from a Gaussian distribution defined on the manifold $\mathbb{R}^{n+1}$.

15. The method of claim 11, wherein said prior Gauss von Mises distribution is generated by:

computing the parameters $\tilde{\mu}$ and $\tilde{P}$ from a sequence of function evaluations $\Phi(x_{\sigma_i}, \theta_{\sigma_i})$, for i=1, ..., N, where $(x_{\sigma_i}, \theta_{\sigma_i})$, for i=1, ..., N, are a chosen sequence of quadrature nodes on $\mathbb{R}^n \times \mathbb{S}$ and wherein the quadrature nodes $(x_{\sigma_i}, \theta_{\sigma_i})$, for i=1, ..., N, are generated from a Gauss von Mises quadrature rule of a chosen order of accuracy in conjunction with the input parameter set ($\mu, P, \alpha, \beta, \Gamma, \kappa$);

selecting $\tilde{\kappa} = \kappa$;

approximating the parameters $\tilde{\alpha}, \tilde{\beta}$, and $\tilde{\Gamma}$ by $\hat{\alpha}, \hat{\beta}$, and $\hat{\Gamma}$, respectively, using expressions depending on the partial derivatives of the diffeomorphism $\Phi$;

selecting the parameters $\tilde{\alpha}, \tilde{\beta}$, and $\tilde{\Gamma}$ according to $$(\tilde{\alpha}, \tilde{\beta}, \tilde{\Gamma}) = \operatorname*{argmin}_{\hat{\alpha}, \hat{\beta}, \hat{\Gamma}} \sum_{i=1}^{N} \left[ \begin{array}{c} M(x_{\sigma_i}, \theta_{\sigma_i}; \mu, P, \alpha, \beta, \Gamma, \kappa) - \\ M(\Phi(x_{\sigma_i}, \theta_{\sigma_i}); \tilde{\mu}, \tilde{P}, \hat{\alpha}, \hat{\beta}, \hat{\Gamma}, \tilde{\kappa}) \end{array} \right]^2,$$

where M is a Mahalanobis von Mises statistic.

16. The method of claim 11, wherein one or more of said reports are generated from radar, electro-optical, or infrared sensors.

17. The method of claim 11, wherein said diffeomorphisms are solution flows induced from a system of ordinary differential equations describing the two-body dynamics of orbital mechanics.

18. A system comprising:

a processor; and a memory coupled with and readable by the processor and having stored therein a sequence of instructions which, when executed by the processor, cause the processor to fuse a plurality of m≥2 report probability density functions to form an output probability density function, wherein all said probability density functions are defined on a n+1 dimensional cylindrical manifold $\mathbb{R}^n \times \mathbb{S}$, and wherein said reports are constrained by a plurality of diffeomorphisms from $\mathbb{R}^n \times \mathbb{S}$ to $\mathbb{R}^n \times \mathbb{S}$.

19. The system of claim 18, wherein said reports and output probability density functions are represented by Gauss von Mises distributions defined on the manifold $\mathbb{R}^n \times \mathbb{S}$ with respective parameter sets, ($\mu_k, P_k, \alpha_k, \beta_k, \Gamma_k, \kappa_k$), for k=1, ..., m, and ($\tilde{\mu}_m, \tilde{P}_m, \tilde{\alpha}_m, \tilde{\beta}_m, \tilde{\Gamma}_m, \tilde{\kappa}_m$).

20. The system of claim 19, further comprising computing the parameters $\tilde{\mu}_m$ and $\tilde{\alpha}_m$ by solving a non-linear least squares problem.

21. The system of claim 19, further comprising computing the parameters $\tilde{P}_m, \tilde{\beta}_m$, and $\tilde{\kappa}_m$ from analytical algebraic expressions.

22. The system of claim 19, further comprising computing the parameter $\tilde{\Gamma}_m$ by solving a non-linear least squares problem.

23. The system of claim 19, wherein one or more of said report Gauss von Mises distributions are generated from pluralities of radar, electro-optical, or infrared sensor observations.

24. The system of claim 19, wherein one or more of said report Gauss von Mises distributions are generated from Gaussian distributions defined on the manifold $\mathbb{R}^{n+1}$.

25. The system of claim 19, wherein one or more of said report Gauss von Mises distributions are generated by:

receiving an input probability density function defined by a set of parameters ($\mu, P, \alpha, \beta, \Gamma, \kappa$) and representing an uncertainty of the location of the object in a cylindrical multi-dimensional space ($\mathbb{R}^n \times \mathbb{S}$) of the multi-dimensional space and a diffeomorphism ($\Phi$) of the cylindrical multi-dimensional space ($\Phi: \mathbb{R}^n \times \mathbb{S} \to \mathbb{R}^n \times \mathbb{S}$), generating a transformed probability density function defined by a set of parameters ($\tilde{\mu}, \tilde{P}, \tilde{\alpha}, \tilde{\beta}, \tilde{\Gamma}, \tilde{\kappa}$) and representing an uncertainty of the location of the object in a cylindrical multi-dimensional space, the transformed probability density function generated from the input probability density function under the diffeomorphism, wherein the input probability density function and the transformed probability density function are both represented by Gauss von Mises distributions defined on the cylindrical multi-dimensional space, and wherein the input Gauss von Mises distribution is generated from a Gaussian distribution defined on the multi-dimensional space, and providing the set of parameters representing the transformed probability density function as a representation of the predicted location of the object in the multi-dimensional space.

26. The system of claim 19, wherein said diffeomorphisms are solution flows induced from a system of ordinary differential equations describing the two-body dynamics of orbital mechanics.

27. A system comprising:

a processor; and a memory coupled with and readable by the processor and having stored therein a sequence of instructions which, when executed by the processor, cause the processor to fuse a prior probability density function with a plurality of m≥1 reports to form an output probability density function, wherein all said probability density functions are defined on a n+1 dimensional cylindrical manifold $\mathbb{R}^n \times \mathbb{S}$, and wherein said reports are constrained by a plurality of diffeomorphisms from $\mathbb{R}^n \times \mathbb{S}$ to $\mathbb{R}^n \times \mathbb{S}$.

28. The system of claim 27, wherein said prior and output probability density functions are represented by Gauss von Mises distributions defined on the manifold $\mathbb{R}^n \times \mathbb{S}$ with respective parameter sets ($\hat{\mu}_m, \hat{P}_m, \hat{\alpha}_m, \hat{\beta}_m, \hat{\Gamma}_m, \hat{\kappa}_m$) and ($\mu_m$, $P_m$, $\alpha_m$, $\beta_m$, $\Gamma_m$, $\kappa_m$), and wherein said reports are vectors $y_k \in \mathbb{R}^p$, for k=1, . . . , m, each hypothesized to be a realization of the random vector $h(x_k, \theta_k) + v_k$, wherein $h_k: \mathbb{R}^n \times \mathbb{S} \to \mathbb{R}^p$, for k=1, . . . , m, and $(v_1, \ldots, v_m)$ is a zero-mean pm-dimensional Gaussian random vector with covariance matrix $\mathcal{R}$.

29. The system of claim 28, further comprising computing the parameters $\tilde{\mu}_m$, $\tilde{P}_m$, $\tilde{\alpha}_m$, $\tilde{\beta}_m$, $\tilde{\Gamma}_m$, $\tilde{\kappa}_m$ by:

reading, by a computer system, a prior probability density function defined by a set of parameters ($\mu$, $P$, $\alpha$, $\beta$, $\Gamma$, $\kappa$) and representing an uncertainty of the location of the object in a cylindrical multi-dimensional space ($\mathbb{R}^n \times \mathbb{S}$) of the multi-dimensional space and a diffeomorphism ($\Phi$) of the cylindrical multi-dimensional space ($\Phi: \mathbb{R}^n \times \mathbb{S}^n \to \mathbb{R}^n \times \mathbb{S}$);

generating, by the computer system, a transformed probability density function defined by a set of parameters ($\tilde{\mu}$, $\tilde{P}$, $\tilde{\alpha}$, $\tilde{\beta}$, $\tilde{\Gamma}$, $\tilde{\kappa}$) and representing an uncertainty of the location of the object in a cylindrical multi-dimensional space, the transformed probability density function generated from the input probability density function under the diffeomorphism, wherein the input probability density function and the transformed probability density function are both represented by Gauss von Mises distributions defined on the cylindrical multi-dimensional space, and wherein the input Gauss von Mises distribution is generated from a Gaussian distribution defined on the multi-dimensional space; and providing, by the computer system, the set of parameters representing the transformed probability density function as a representation of the predicted location of the object in the multi-dimensional space.

30. The system of claim 28, wherein said prior Gauss von Mises distribution is generated from a plurality of radar, electro-optical, or infrared sensor observations.

31. The system of claim 28, wherein said prior Gauss von Mises distribution is generated from a Gaussian distribution defined on the manifold $\mathbb{R}^{n+1}$.

32. The system of claim 28, wherein said prior Gauss von Mises distribution is generated by:

computing the parameters $\tilde{\mu}$ and $\tilde{P}$ from a sequence of function evaluations $\Phi(x_{o_i}, \theta_{o_i})$, for i=1, . . . , N, where $(x_{o_i}, \theta_{o_i})$, for i=1, . . . , N, are a chosen sequence of quadrature nodes on $\mathbb{R}^n \times \mathbb{S}$ and wherein the quadrature nodes $(x_{o_i}, \theta_{o_i})$, for i=1, . . . , N, are generated from a Gauss von Mises quadrature rule of a chosen order of accuracy in conjunction with the input parameter set ($\mu$, $P$, $\alpha$, $\beta$, $\Gamma$, $\kappa$);

selecting $\tilde{\kappa} = \kappa$;

approximating the parameters $\tilde{\alpha}$, $\tilde{\beta}$, and $\tilde{\Gamma}$ by $\hat{\alpha}$, $\hat{\beta}$, and $\hat{\Gamma}$, respectively, using expressions depending on the partial derivatives of the diffeomorphism $\Phi$;

selecting the parameters $\tilde{\alpha}$, $\tilde{\beta}$, and $\tilde{\Gamma}$ according to $$(\tilde{\alpha}, \tilde{\beta}, \tilde{\Gamma}) = \underset{\hat{\alpha}, \hat{\beta}, \hat{\Gamma}}{\mathrm{argmin}} \sum_{i=1}^{N} \left[ \frac{M(x_{\sigma_i}, \theta_{\sigma_i}; \mu, P, \alpha, \beta, \Gamma, \kappa) -}{M(\Phi(x_{\sigma_i}, \theta_{\sigma_i}); \tilde{\mu}, \tilde{P}, \hat{\alpha}, \hat{\beta}, \hat{\Gamma}, \tilde{\kappa})} \right]^2,$$

where M is a Mahalanobis von Mises statistic.

33. The system of claim 28, wherein one or more of said reports are generated from radar, electro-optical, or infrared sensors.

34. The system of claim 28, wherein said diffeomorphisms are solution flows induced from a system of ordinary differential equations describing the two-body dynamics of orbital mechanics.

35. A computer-readable memory having stored therein a sequence of instructions which, when executed by a processor, cause the processor to fuse a plurality of m≥2 report probability density functions to form an output probability density function, wherein all said probability density functions are defined on a n+1 dimensional cylindrical manifold $\mathbb{R}^n \times \mathbb{S}$, and wherein said reports are constrained by a plurality of diffeomorphisms from $\mathbb{R}^n \times \mathbb{S}$ to $\mathbb{R}^n \times \mathbb{S}$.

36. The computer-readable memory of claim 35, wherein said reports and output probability density functions are represented by Gauss von Mises distributions defined on the manifold $\mathbb{R}^n \times \mathbb{S}$ with respective parameter sets, ($\mu_k$, $P_k$, $\alpha_k$, $\beta_k$, $\Gamma_k$, $\kappa_k$), for k=1, . . . , m, and ($\tilde{\mu}_m$, $\tilde{P}_m$, $\tilde{\alpha}_m$, $\tilde{\beta}_m$, $\tilde{\Gamma}_m$, $\tilde{\kappa}_m$).

37. The computer-readable memory of claim 36, further comprising computing the parameters $\tilde{\mu}_m$ and $\tilde{\alpha}_m$ by solving a non-linear least squares problem.

38. The computer-readable memory of claim 36, further comprising computing the parameters $\tilde{P}_m$, $\tilde{\beta}_m$, and $\tilde{\kappa}_m$ from analytical algebraic expressions.

39. The computer-readable memory of claim 36, further comprising computing the parameter $\tilde{\Gamma}_m$ by solving a non-linear least squares problem.

40. The computer-readable memory of claim 36, wherein one or more of said report Gauss von Mises distributions are generated from pluralities of radar, electro-optical, or infrared sensor observations.

41. The computer-readable memory of claim 36, wherein one or more of said report Gauss von Mises distributions are generated from Gaussian distributions defined on the manifold $\mathbb{R}^{n+1}$.

42. The computer-readable memory of claim 36, wherein one or more of said report Gauss von Mises distributions are generated by:

receiving an input probability density function defined by a set of parameters ($\mu$, $P$, $\alpha$, $\beta$, $\Gamma$, $\kappa$) and representing an uncertainty of the location of the object in a cylindrical multi-dimensional space ($\mathbb{R}^n \times \mathbb{S}$) of the multi-dimensional space and a diffeomorphism ($\Phi$) of the cylindrical multi-dimensional space ($\Phi: \mathbb{R}^n \times \mathbb{S} \to \mathbb{R}^n \times \mathbb{S}$), generating a transformed probability density function defined by a set of parameters ($\tilde{\mu}$, $\tilde{P}$, $\tilde{\alpha}$, $\tilde{\beta}$, $\tilde{\Gamma}$, $\tilde{\kappa}$) and representing an uncertainty of the location of the object in a cylindrical multi-dimensional space, the transformed probability density function generated from the input probability density function under the diffeomorphism, wherein the input probability density function and the transformed probability density function are both represented by Gauss von Mises distributions defined on the cylindrical multi-dimensional space, and wherein the input Gauss von Mises distribution is generated from a Gaussian distribution defined on the multi-dimensional space, and providing the set of parameters representing the transformed probability density function as a representation of the predicted location of the object in the multi-dimensional space.

43. The computer-readable memory of claim 36, wherein said diffeomorphisms are solution flows induced from a system of ordinary differential equations describing the two-body dynamics of orbital mechanics.

44. A computer-readable memory having stored therein a sequence of instructions which, when executed by a processor, cause the processor to fuse a prior probability density function with a plurality of m≥1 reports to form an output probability density function, wherein all said probability density functions are defined on a n+1 dimensional cylindrical manifold $\mathbb{R}^n \times \mathbb{S}$, and wherein said reports are constrained by a plurality of diffeomorphisms from $\mathbb{R}^n \times \mathbb{S}$ to $\mathbb{R}^n \times \mathbb{S}$.

45. The computer-readable memory of claim 44, wherein said prior and output probability density functions are represented by Gauss von Mises distributions defined on the manifold $\mathbb{R}^n \times \mathbb{S}$ with respective parameter sets $(\hat{\mu}_m, \hat{P}_m, \hat{\alpha}_m, \hat{\beta}_m, \hat{\Gamma}_m, \hat{\kappa}_m)$ and $(\mu_m, P_m, \alpha_m, \beta_m, \Gamma_m, \kappa_m)$, and wherein said reports are vectors $y_k \in \mathbb{R}^p$, for $k=1, \ldots, m$, each hypothesized to be a realization of the random vector $h(x_k, \theta_k) + v_k$, wherein $h_k: \mathbb{R}^n \times \mathbb{S} \to \mathbb{R}^p$, for $k=1, \ldots, m$, and $(v_1, \ldots, v_m)$ is a zero-mean pm-dimensional Gaussian random vector with covariance matrix $\mathcal{R}$.

46. The computer-readable memory of claim 45, further comprising computing the parameters $\mu_m, P_m, \alpha_m, \beta_m, \Gamma_m, \kappa_m$ by:
- reading, by a computer system, a prior probability density function defined by a set of parameters $(\mu, P, \alpha, \beta, \Gamma, \kappa)$ and representing an uncertainty of the location of the object in a cylindrical multi-dimensional space ($\mathbb{R}^n \times \mathbb{S}$) of the multi-dimensional space and a diffeomorphism ($\Phi$) of the cylindrical multi-dimensional space ($\Phi: \mathbb{R}^n \times \mathbb{S} \to \mathbb{R}^n \times \mathbb{S}$);
- generating, by the computer system, a transformed probability density function defined by a set of parameters ($\tilde{\mu}, \tilde{P}, \tilde{\alpha}, \tilde{\beta}, \tilde{\Gamma}, \tilde{\kappa}$) and representing an uncertainty of the location of the object in a cylindrical multi-dimensional space, the transformed probability density function generated from the input probability density function under the diffeomorphism, wherein the input probability density function and the transformed probability density function are both represented by Gauss von Mises distributions defined on the cylindrical multi-dimensional space, and wherein the input Gauss von Mises distribution is generated from a Gaussian distribution defined on the multi-dimensional space; and
- providing, by the computer system, the set of parameters representing the transformed probability density function as a representation of the predicted location of the object in the multi-dimensional space.

47. The computer-readable memory of claim 45, wherein said prior Gauss von Mises distribution is generated from a plurality of radar, electro-optical, or infrared sensor observations.

48. The computer-readable memory of claim 45, wherein said prior Gauss von Mises distribution is generated from a Gaussian distribution defined on the manifold $\mathbb{R}^{n+1}$.

49. The computer-readable memory of claim 45, wherein said prior Gauss von Mises distribution is generated by:
- computing the parameters $\tilde{\mu}$ and $\tilde{P}$ from a sequence of function evaluations $\Phi(x_{o_i}, \theta_{o_i})$, for $i=1, \ldots, N$, where $(x_{o_i}, \theta_{o_i})$, for $i=1, \ldots, N$, are a chosen sequence of quadrature nodes on $\mathbb{R}^n \times \mathbb{S}$ and wherein the quadrature nodes $(x_{o_i}, \theta_{o_i})$, for $i=1, \ldots, N$, are generated from a Gauss von Mises quadrature rule of a chosen order of accuracy in conjunction with the input parameter set $(\mu, P, \alpha, \beta, \Gamma, \kappa)$;
- selecting $\tilde{\kappa} = \kappa$;
- approximating the parameters $\tilde{\alpha}, \tilde{\beta}$, and $\tilde{\Gamma}$ by $\hat{\alpha}, \hat{\beta}$, and $\hat{\Gamma}$, respectively, using expressions depending on the partial derivatives of the diffeomorphism $\Phi$;
- selecting the parameters $\tilde{\alpha}, \tilde{\beta}$, and $\tilde{\Gamma}$ according to $$(\tilde{\alpha}, \tilde{\beta}, \tilde{\Gamma}) = \operatorname*{argmin}_{\hat{\alpha}, \hat{\beta}, \hat{\Gamma}} \sum_{i=1}^{N} \left[ \begin{array}{l} M(x_{\sigma_i}, \theta_{\sigma_i}; \mu, P, \alpha, \beta, \Gamma, \kappa) - \\ M(\Phi(x_{\sigma_i}, \theta_{\sigma_i}); \tilde{\mu}, \tilde{P}, \hat{\alpha}, \hat{\beta}, \hat{\Gamma}, \tilde{\kappa}) \end{array} \right]^2,$$

where M is a Mahalanobis von Mises statistic.

50. The computer-readable memory of claim 45, wherein one or more of said reports are generated from radar, electro-optical, or infrared sensors.

51. The computer-readable memory of claim 45, wherein said diffeomorphisms are solution flows induced from a system of ordinary differential equations describing the two-body dynamics of orbital mechanics.

* * * * *